(12) United States Patent
Mola et al.

(10) Patent No.: US 10,185,645 B2
(45) Date of Patent: Jan. 22, 2019

(54) RESOURCE LIFETIME ANALYSIS USING A TIME-TRAVEL TRACE

(71) Applicant: Microsoft Technology Licensing, LLC, Redmond, WA (US)

(72) Inventors: Jordi Mola, Bellevue, WA (US); Kenneth Walter Sykes, Oakton, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/631,872

(22) Filed: Jun. 23, 2017

(65) Prior Publication Data
US 2018/0260302 A1 Sep. 13, 2018

Related U.S. Application Data

(63) Continuation-in-part of application No. 15/591,521, filed on May 10, 2017, now Pat. No. 9,983,978.
(Continued)

(51) Int. Cl.
*G06F 17/30* (2006.01)
*G06F 9/44* (2018.01)
*G06F 11/36* (2006.01)

(52) U.S. Cl.
CPC .... *G06F 11/3636* (2013.01); *G06F 17/30979* (2013.01); *G06F 17/30991* (2013.01)

(58) Field of Classification Search
CPC ............. G06F 11/3636; G06F 11/3476; G06F 11/3466; G06F 11/3612; G06F 21/577;
(Continued)

(56) References Cited

U.S. PATENT DOCUMENTS

| 5,870,607 A | 2/1999 | Netzer |
| 6,018,786 A | 1/2000 | Krick et al. |

(Continued)

FOREIGN PATENT DOCUMENTS

JP  2005222422 A  8/2005

OTHER PUBLICATIONS

Mace et al., Pivot tracing: dynamic causal monitoring for distributed systems, 16 pages (Year: 2015).*
(Continued)

*Primary Examiner* — Thuy Dao
(74) *Attorney, Agent, or Firm* — Workman Nydegger

(57) ABSTRACT

Querying resource lifetime using a trace of program execution. An embodiment includes identifying a query expression targeted at least a portion of the trace of program execution. The query expression specifies at least (i) a data object representing a plurality of events identified in the trace, each event associated with one or more attributes relating to resource lifetime, and (ii) one or more conditions matching the one attributes relating to resource lifetime. In response to receiving the query expression, the query expression is processed based at least on an analysis of an identified subset of the trace. Based on processing the query expression, a result data set that includes or identifies at least one of the plurality of events that meets the one or more conditions is presented.

16 Claims, 19 Drawing Sheets

Related U.S. Application Data which is a continuation-in-part of application No. 15/453,060, filed on Mar. 8, 2017, now Pat. No. 9,959,194, and a continuation-in-part of application No. 15/453,008, filed on Mar. 8, 2017, now Pat. No. 9,934,127.

(58) Field of Classification Search
CPC .. G06F 11/3664; G06F 11/323; G06F 3/0488; G06F 17/30979; G06F 17/30991; G06F 17/30864; G06F 17/30477; G06F 21/6227; G06F 21/31; H04L 63/0815
See application file for complete search history.

(56) References Cited

U.S. PATENT DOCUMENTS

| | | | |
|---|---|---|---|
| 6,145,121 A | 11/2000 | Levy et al. | |
| 6,795,836 B2 | 9/2004 | Arnold et al. | |
| 6,892,325 B2 | 5/2005 | Bates et al. | |
| 6,901,581 B1 | 5/2005 | Schneider | |
| 7,209,058 B2 | 4/2007 | Swoboda | |
| 7,284,052 B1 | 10/2007 | Anderson | |
| 7,392,514 B2 | 6/2008 | Edwards | |
| 7,454,407 B2* | 11/2008 | Chaudhuri | G06F 17/30474 |
| 7,620,938 B2 | 11/2009 | Edwards et al. | |
| 7,681,182 B1 | 3/2010 | Nistry et al. | |
| 7,739,664 B2 | 6/2010 | Bates et al. | |
| 7,757,065 B1 | 7/2010 | Jourdan et al. | |
| 7,814,486 B2 | 10/2010 | Papakipos et al. | |
| 7,996,686 B2 | 8/2011 | LeGendre et al. | |
| 8,015,552 B1 | 9/2011 | Lindahl et al. | |
| 8,037,285 B1 | 10/2011 | Thalk et al. | |
| 8,108,844 B2 | 1/2012 | Crutchfield et al. | |
| 8,132,159 B1 | 3/2012 | Lindahl et al. | |
| 8,166,348 B1 | 4/2012 | Kulkami et al. | |
| 8,276,127 B2 | 9/2012 | Rydh et al. | |
| 8,364,691 B2 | 1/2013 | Kennedy et al. | |
| 8,375,368 B2 | 2/2013 | Tuck et al. | |
| 8,423,965 B2 | 4/2013 | Goel et al. | |
| 8,429,617 B2 | 4/2013 | Demetriou et al. | |
| 8,443,349 B2 | 5/2013 | Papakipos et al. | |
| 8,448,156 B2 | 5/2013 | Demetriou et al. | |
| 8,521,765 B2 | 8/2013 | George et al. | |
| 8,522,047 B2 | 8/2013 | Eker et al. | |
| 8,522,176 B2 | 8/2013 | Ho et al. | |
| 8,555,385 B1* | 10/2013 | Bhatkar | G06F 21/556 726/22 |
| 8,612,939 B2 | 12/2013 | Marenco | |
| 8,719,796 B2* | 5/2014 | Rosu | G06F 11/302 717/128 |
| 8,719,800 B2 | 5/2014 | Chow et al. | |
| 8,745,591 B2 | 6/2014 | De Smet et al. | |
| 8,751,466 B1 | 6/2014 | Tsay | |
| 8,910,120 B2 | 12/2014 | Srinivasa et al. | |
| 8,924,912 B2 | 12/2014 | Ho et al. | |
| 8,935,673 B1 | 1/2015 | Ashkenazi et al. | |
| 8,938,720 B2 | 1/2015 | Meijler et al. | |
| 8,997,057 B1 | 3/2015 | Diwan et al. | |
| 9,020,939 B2 | 4/2015 | Brodsky et al. | |
| 9,122,795 B1 | 9/2015 | Daudel et al. | |
| 9,129,058 B2 | 9/2015 | Cui et al. | |
| 9,189,254 B2 | 11/2015 | Kushman et al. | |
| 9,195,562 B2 | 11/2015 | Luo et al. | |
| 9,223,677 B2 | 12/2015 | Swaine et al. | |
| 9,251,364 B2 | 2/2016 | Ture et al. | |
| 9,262,538 B2 | 2/2016 | Melman | |
| 9,329,975 B2* | 5/2016 | Park | G06F 11/3636 |
| 9,424,162 B2* | 8/2016 | Sivathanu | G06F 11/3485 |
| 9,436,588 B2* | 9/2016 | Koren | G06F 11/3466 |
| 9,467,437 B2 | 10/2016 | Krishnaprasad et al. | |
| 9,477,576 B2 | 10/2016 | Granshaw et al. | |
| 9,501,383 B2 | 11/2016 | Bolignano | |
| 9,588,870 B2* | 3/2017 | Marron | G06F 11/362 |
| 9,612,938 B2* | 4/2017 | Binns | G06F 11/3636 |
| 9,632,914 B2 | 4/2017 | Cheng et al. | |
| 9,652,101 B2 | 5/2017 | McMillen et al. | |
| 9,916,232 B2* | 3/2018 | Voccio | G06F 11/3612 |
| 9,934,126 B1* | 4/2018 | Mola | G06F 11/3636 |
| 9,934,127 B1 | 4/2018 | Mola et al. | |
| 9,940,369 B1 | 4/2018 | Mola | |
| 9,959,194 B1 | 5/2018 | Mola | |
| 9,983,978 B1 | 5/2018 | Mola et al. | |
| 10,013,331 B2* | 7/2018 | Brodsky | G06F 11/3624 |
| 10,031,833 B2 | 7/2018 | Mola et al. | |
| 2002/0129343 A1 | 9/2002 | Pinter et al. | |
| 2003/0191783 A1 | 10/2003 | Wolczko et al. | |
| 2004/0221115 A1 | 11/2004 | Sahin et al. | |
| 2004/0243894 A1* | 12/2004 | Smith | G06F 11/364 714/724 |
| 2005/0097100 A1 | 5/2005 | Galindo-Legaria et al. | |
| 2006/0036579 A1* | 2/2006 | Byrd | G06Q 10/10 |
| 2006/0074622 A1 | 4/2006 | Scott et al. | |
| 2006/0129871 A1 | 6/2006 | Smith | |
| 2006/0129893 A1* | 6/2006 | Smith | G06F 11/3476 714/38.14 |
| 2006/0212688 A1 | 9/2006 | Chaudhry et al. | |
| 2007/0168989 A1 | 7/2007 | Edwards et al. | |
| 2008/0155342 A1 | 6/2008 | O'Callahan | |
| 2008/0270482 A1 | 10/2008 | Hillberg et al. | |
| 2008/0288741 A1 | 11/2008 | Lee et al. | |
| 2009/0199163 A1 | 8/2009 | Soroker et al. | |
| 2009/0265402 A1 | 10/2009 | Dussud et al. | |
| 2009/0328002 A1* | 12/2009 | Lin | G06F 11/3604 717/120 |
| 2010/0049938 A1 | 2/2010 | Izumi et al. | |
| 2010/0180263 A1 | 7/2010 | Lee et al. | |
| 2010/0299654 A1 | 11/2010 | Vaswani et al. | |
| 2010/0306588 A1 | 12/2010 | Hamilton et al. | |
| 2011/0087926 A1 | 4/2011 | Arnold et al. | |
| 2011/0167412 A1 | 7/2011 | Kahlon et al. | |
| 2011/0314264 A1 | 12/2011 | Horley et al. | |
| 2012/0110589 A1 | 5/2012 | Ghosh et al. | |
| 2012/0185675 A1 | 7/2012 | Kim et al. | |
| 2012/0324236 A1 | 12/2012 | Srivastava et al. | |
| 2013/0036403 A1 | 2/2013 | Geist | |
| 2013/0066927 A1 | 3/2013 | Hillberg et al. | |
| 2013/0104107 A1 | 4/2013 | DeSmet et al. | |
| 2013/0117848 A1* | 5/2013 | Golshan | G06F 21/566 726/23 |
| 2013/0218315 A1 | 8/2013 | Jaeger | |
| 2014/0108463 A1 | 4/2014 | Gagliardi et al. | |
| 2014/0165023 A1* | 6/2014 | Ho | G06F 11/362 716/136 |
| 2014/0282418 A1 | 9/2014 | Wood et al. | |
| 2015/0026666 A1 | 1/2015 | Tojo et al. | |
| 2015/0066881 A1 | 3/2015 | Sundaram et al. | |
| 2015/0143344 A1 | 5/2015 | Davis | |
| 2015/0378870 A1* | 12/2015 | Marron | G06F 11/362 717/128 |
| 2016/0041894 A1 | 2/2016 | Reid et al. | |
| 2016/0292061 A1 | 10/2016 | Marron et al. | |
| 2016/0364325 A1 | 12/2016 | Ouzzani et al. | |
| 2018/0260299 A1 | 9/2018 | Mola et al. | |

OTHER PUBLICATIONS

Gu et al., Reusing debugging knowledge via trace-based bug search, 16 pages (Year: 2012).*

Office Action cited in U.S. Appl. No. 15/453,060 dated Oct. 17, 2017.

Guo, et al: "Accurately Choosing Execution Runs for Software Fault Localization", In Journal of International Publishers, Inc. San Francisco, Jul. 8, 2009, 1 pages.

Roychoudhury, Abhik, "Embedded Systems and Software Valdiation", Chapter 5, Section 1, In Publication of Morgan Kaufmann Publishers Inc. San Francisco, Jul. 8, 2009, p. 199.

Roychoudhury, et al; "Formula-Based Software Debugging", In Journal of Communications of the ACM, vol. 59, Issue 7, Jul. 2016, 11 pages.

Sumner, et al: "Selecting Peers for Execution Comparison", In Proceedings of the International Symposium on Software Testing and Analysis, Jul. 17, 2011, pp. 309-319.

(56) References Cited

OTHER PUBLICATIONS

Le, et al: "Lecture 11. Applications of Program Analysis", http://web.cs.iastate.edu/~weile/cs641/11.ApplicationsOfProgramAnalysis.pdf, Published on: Dec. 2014, 13 pages.
Roychoudhury, Abhik, "Debugging as a Science, that too, when your Program is Changing", In Journal of Electronic Notes in Theoretical Computer Science, vol. 266, Oct. 12, 2010, pp. 1-12.
Office Action cited in U.S. Appl. No. 15/453,008 dated Oct. 19, 2017.
Office Action cited in U.S. Appl. No. 15/591,521 dated Oct. 20, 2017.
Notice of Allowance cited in U.S. Appl. No. 15/591,706 dated Nov. 27, 2017.
Visan, et al., "Temporal Debugging: Automating Time Travel Debugging with URDB", http://www.ccs.neu.edu/home/xindong/oopsla10.pdf, Published on: Mar. 26, 2010, 1-12 pages.
Barr, et al., "TARDIS: Affordable Time-Travel Debugging in Managed Runtimes", In Proceedings of the ACM International Conference on Object Oriented Programming Systems Languages & Applications, Oct. 20, 2014, 16 pages.
Jensen, et al., "MemInsight: Platform-Independent Memory Debugging for JavaScript", In Proceedings of the 2015 10th Joint Meeting on Foundations of Software Engineering, Aug. 30, 2015, 12 pages.
Hicks James E., "Compiler-Directed Storage Reclamation Using Object Lifetime Analysis", In Technical Report of MIT/LCS/TR-555, Oct. 1992, 183 pages.
King, et al., "Debugging operating systems with time-traveling virtual machines", In Proceedings of the USENIX Annual Technical Conference, Apr. 10, 2005, 22 pages.
Bhansali, et al. "Framework for Instruction-level Tracing and Analysis of Program Executions", In Proceedings of the 2nd international conference on Virtual execution environments, Jun. 14, 2006,. pp. 154-163.
"Chronon Tim Travelling Debugger", http://chrononsystems.com/products/chronon-time-travelling-debugger, Retrieved on: Nov. 28, 2016, 4 pages.
K, Anand, "Microsoft Time Travel Tracing Diagnostic Tool", http://www.thewindowsclub.com/microsoft-time-travel-tracing-diagnostic, Published on: Jul. 21, 2013, 3 pages.
Lewis, Bill, "Debugging Backwards in Time", In Proceedings of the Fifth International Workshop on Automated Debugging, Sep. 2003, pp. 225-235.
Booth, et al., "Walk Backwards to Happiness—Debugging by Time Travel", In Technical Report CSM-143, Jul. 1997, 14 pages.
Phang, et al., "EXPOSITOR: Scriptable Time-Travel Debugging with First-Class Traces", In Proceedings of 35th International Conference on Software Engineering, May 18, 2013, pp. 352-361.
Pothier, et al., "Summarized Trace Indexing and Querying for Scalable Back-in-Time Debugging", In Proceedings of 25th European Conference on Object-Oriented Programming, Jul. 25, 2011, 558-582 pages.

"Elm's Time Traveling Debugger", https://web.archive.org/web/20140416213617/http:/debug.elm-lang.org/, Published on: Apr. 16, 2014, 4 pages.
Argelius, Andreas, "Time Travel in React Redux apps using the Redux DevTools", https://onsen.io/blog/react-redux-devtools-with-time-travel/, Published on: Jun. 13, 2016, 13 pages.
Bowman, et al., "Optimization of Query Streams Using Semantic Prefetching", In Journal of ACM Transactions on Database Systems, vol. 30 issue 4, Jun. 13, 2004, 12 pages.
Wang, et al., "An Effective Reversible Debugger of Cross Platform Based on Virtualization", In Proceedings of International Conference on Embedded Software and Systems, May 25, 2009, pp. 448-453.
Weiss, et al: ROOT: Replaying Multithreaded Traces with Resource-Oriented Ordering, Nov. 2013, 15 pages.
Wu, et al: "Elastic and scalable tracing and accurate replay of non-deterministic events," Jun. 2013, 10 pages.
Bravo, et al: "Towards effective and efficient search-based deterministic replay," Nov. 2013, 6 pages.
Notice of Allowance cited in U.S. Appl. No. 15/453,060 dated Dec. 29, 2017.
Albert, et al., "Verifying trace inclusion between an experimental frame and a model", In Proceedings of the Spring Simulation Multiconference, Apr. 1, 2010, 8 Pages.
Barr, et al., "Time-Travel Debugging for JavaScript/Node.js", In Proceedings of the ACM International Symposium on the Foundations of Software Engineering, Sep. 12, 2016, 5 Pages.
Cutulenco, et al., "Mining timed regular expressions from system traces", In Proceedings of the 5th International Workshop on Software Mining, Sep. 3, 2016, 8 Pages.
Deutch, et al., "Type inference and type checking for queries on execution traces", In Proceedings of the VLDB Endowment, vol. 1, Issue 1, Aug. 1, 2008, 12 Pages.
Dietrich, et al., "Learning effective query transformations for enhanced requirements trace retrieval", In Proceedings of the 28th IEEE/ACM International Conference on Automated Software Engineering (ASE), Nov. 11, 2013, 6 Pages.
Goldsmith, et al., "Relational Queries over Program Traces", In Proceedings of the 20th Annual ACM SIGPLAN Conference on Object-Oriented Programming, Systems, Languages, and Applications, Oct. 16, 2005, 18 Pages.
"International Search Report and Written Opinion Issued in PCT Application No. PCT/US2018/020829", dated Jul. 6, 2018, 14 Pages.
"International Search Report and Written Opinion Issued in PCT Application No. PCT/US2018/020830", dated Jun. 29, 2018, 14 Pages.
"Ex-Parte Quayle Action Issued in U.S. Appl. No. 15/917,323", dated Sep. 11, 2018, 5 Pages.
"Notice of Allowance Issued in U.S. Appl. No. 15/917,323", dated Oct. 26, 2018, 8 Pages.

\* cited by examiner

_1500_

_⌒ 1501_

CandidateIDs = select ID from MemoryEvents
  where ID not in (select ID from MemoryEvents where Event = 'deleted')

_⌒ 1502_

LifetimeResults = select * from Lifetime(select * from MemoryEvents
  where ID in CandidateIDs)

_⌒ 1503_ select Event, Time, Value from LifetimeResults
  where ID in (select ID from LifetimeResults where Event = 'orphaned')
  order by ID, Time

_⌒ 1504_

MemoryEvents = select * from Normalize(select * from TTD_Calls
  where Function in TTD_MemoryApis)

KernelEvents = select * from Normalize(select * from TTD_Calls where
  Function in TDD_KernelHandleApis)

_⌒ 1507_

HandleID = select top(1) ID from KernelEvents where ID in (select ID
  from KernelEvents where Value = 0x1234)
  where Event = 'created' and Time <= current_time
  order by Time descending

_⌒ 1508_

Select min(Time) StartingTime, max(Time) EndingTime from
  KernelEvents
  where ID = HandleID
  group by Time

FIG. 15B

RESOURCE LIFETIME ANALYSIS USING A TIME-TRAVEL TRACE

CROSS-REFERENCE TO RELATED APPLICATIONS

This application is a continuation in part of, and claims the benefit of, U.S. patent application Ser. No. 15/591,521, filed May 10, 2017 and titled "QUERYING AN INDEXED TIME-TRAVEL TRACE," which is a continuation-in-part of U.S. patent application Ser. No. 15/453,060, filed Mar. 8, 2017 and titled "INDEXING A TRACE BY INSERTION OF MEMORY SNAPSHOTS FOR REPLAY RESPONSIVENESS," and U.S. patent application Ser. No. 15/453,008, filed Mar. 8, 2017 and titled "INDEXING A TRACE BY INSERTION OF KEY FRAMES FOR REPLAY RESPONSIVENESS." The entire contents of each of foregoing applications are incorporated herein by reference in their entireties.

BACKGROUND

When writing code during the development of software applications, developers commonly spend a significant amount of time "debugging" the code to find runtime and other source code errors. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

During recording/tracing, a "time travel" debugger may take approaches to recording trace files that increase the practical amount of time that a program can be traced, that reduce the impact on the program being traced, and/or that reduce utilization of resources on the computer system(s) on which the traced program executes. For example, rather than storing a full record of memory addresses/values read and written during execution, some debuggers may record only the memory values that are consumed (read) by the program's code instructions. Additionally, rather than tracking each code instruction that was executed, some debuggers record only data relating to a small subset of these code instructions (e.g., the side effects of their execution, the register values supplied as inputs). Then, during replay, the programs' code is re-executed while being supplied with the traced memory and register values, which causes the program to re-execute in substantially the same manner that it did when it was traced—including reproducing the same memory state, processor register state, etc. at discrete points in time.

However, while the forgoing techniques can provide significant benefits during tracing (e.g., small trace files, low-overhead of tracing, etc.), the trace files they produce may not be optimally suited for a responsive debugging experience. For example, obtaining program state (e.g., memory and register values) at given points in time may involve replaying significant portions of program execution. This can provide an undesirable user experience, since it may take a debugger long periods of time to respond to a given user query (e.g., to replay to a given breakpoint and provide program state at that breakpoint).

For example, in order to respond to inquiries, existing time travel debuggers replay the entire trace in response to the inquiry. This involves the debugger single-stepping through each instruction, while keeping meticulous bookkeeping about the instructions executed. Then, the debugger uses this bookkeeping to produce a response to the inquiry. Thus, for example, if an existing time travel debugger were to receive an inquiry for functions that allocated memory, but did not later de-allocate that memory, the debugger would single-step through the entire trace in response to the inquiry, while keeping bookkeeping for each function called (e.g., their memory allocations and frees), and then use this bookkeeping information to form a response to the inquiry. The time needed for the debugger to replay the entire trace in response to a given inquiry can be substantial, often being on the order of hours to days for mere seconds of traced execution time.

BRIEF SUMMARY

Embodiments herein expand the utility of time travel debuggers by leveraging recoded trace file data to enable queries based on the lifetime of objects of the program upon which the recoded trace file data is based. For example, embodiments may enable queries based on resource(s) identifiable in the trace file data, and which include one or more conditions based on lifetime of those resource(s). Some embodiments enable application programming interfaces (APIs) used into the trace to be normalized to events that are selected from a standard set of events. Other embodiments enable machine learning and/or statistical analysis on query results to facilitate refinement and analysis of the results.

In some embodiments, a method includes querying resource lifetime using a trace of program execution. The method includes identifying a query expression targeted at least a portion of the trace of program execution. The query expression specifies at least (i) a data object representing a plurality of events identified in the trace, each event associated with one or more attributes relating to resource lifetime, and (ii) one or more conditions matching the one attributes relating to resource lifetime. The method also includes, in response to receiving the query expression, processing the query expression based at least on an analysis of an identified subset of the trace. The method also includes based on processing the query expression, presenting a result data set that includes or identifies at least one of the plurality of events that meets the one or more conditions.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 15A and 15B illustrate example queries that operate on the concept of resource lifetime;

DETAILED DESCRIPTION

Figure 1:
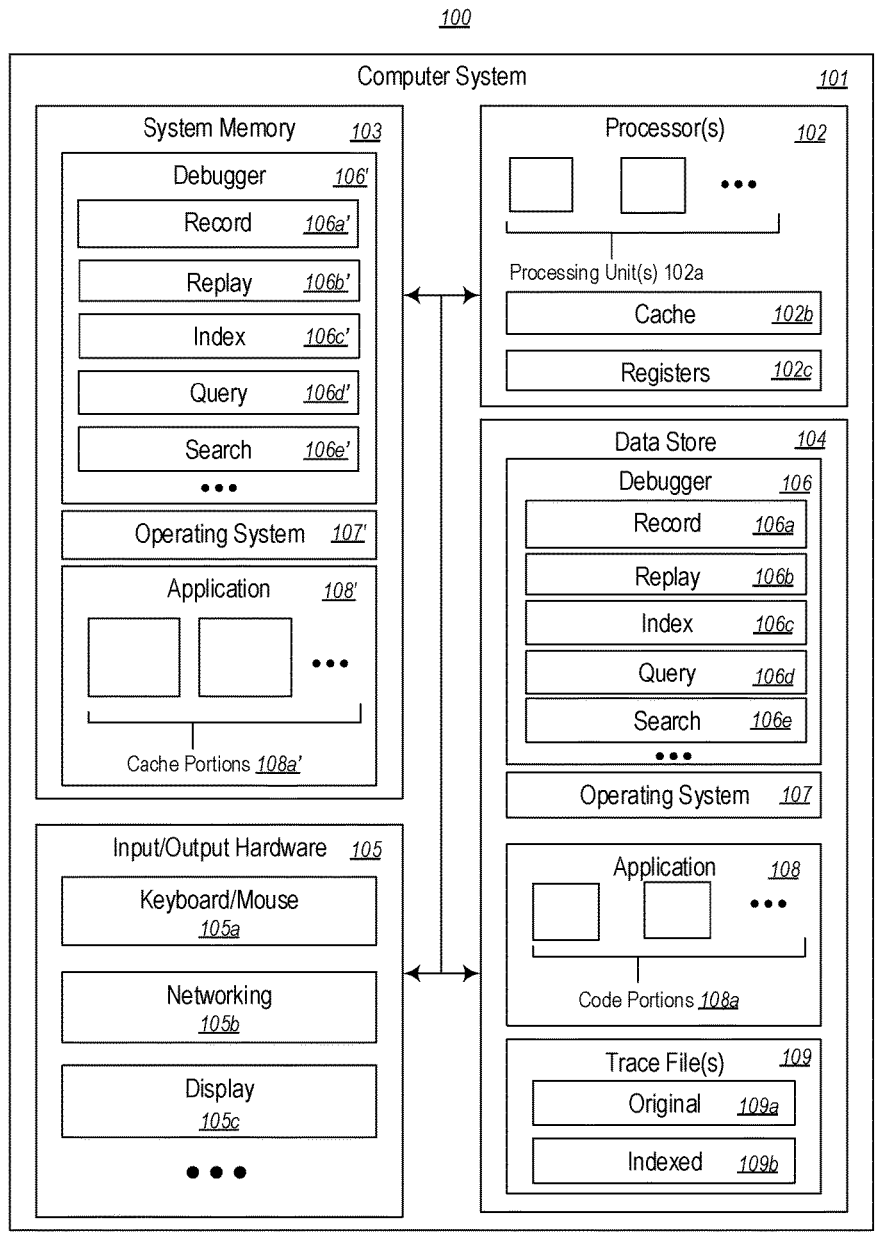
FIG. 1 illustrates an example computing environment that facilitates time-travel debugging.

Embodiments herein expand the utility of time travel debuggers by leveraging recoded trace file data to enable queries based on the lifetime of objects of the program upon which the recoded trace file data is based. For example, embodiments may enable queries based on resource(s) identifiable in the trace file data, and which include one or more conditions based on lifetime of those resource(s). Some embodiments enable application programming interfaces (APIs) used into the trace to be normalized to events that are selected from a standard set of events. Other embodiments enable machine learning and/or statistical analysis on query results to facilitate refinement and analysis of the results.

Additionally, other embodiments address differences between performance and resource utilization goals during trace recording vs. trace replay are addressed by indexing trace files for responsive replay—including replaying data stream(s) from a trace file that was generated at trace time, while recording an indexed trace file with characteristics that account for the performance and resource utilization goals of replay (and, potentially, the replay computing environment to be used) to provide a responsive debugging experience.

Additionally, in some embodiments, recording this indexed trace file includes breaking trace data stream(s) into a plurality of sections through the insertion of key frames at identified points of interest—in which each section is defined by its bounding beginning and ending key frames. The points of interest are identified based on program characteristics that are of general interest during debugging (e.g., function boundaries, exceptions, etc.), as well as target section execution times (i.e., ensuring that each section is of a size that will execute within a target execution time range). As such, a debugger has access to a granular set of trace sections that can each be replayed (starting their beginning key frame) in order to reproduce program state at interesting points in program execution, avoiding the need to replay large portions of program execution.

Additionally, in other embodiments, recording this indexed trace file includes pre-calculating memory addresses and values that are encountered during execution of different sections of a trace data stream, and storing an additional trace data stream, including storing memory snapshot data structures that include these pre-calculated memory addresses and values. As such, using these memory snapshots, a debugger can quickly return memory state at many points in the trace, further avoiding the need to replay large portions of program execution.

Additionally, in other embodiments, recording this indexed trace file includes generating reverse lookup data structures, and inserting them as one or more additional data streams into the indexed trace file. Reverse lookup data structures associate attributes observed during trace replay (e.g., memory addresses accessed, return values observed, etc.) with the trace section(s) during which they were observed at replay, or during which there is a certain probability they were observed. These data structures facilitate quick and efficient inquires over the indexed trace, in many cases decreasing the time and processing resources it takes to process an inquiry by many orders of magnitude.

Other embodiments utilize indexed trace files to quickly and efficiently process and respond to inquiries. One such form of inquiry is a structured query, which returns a result set based on building an internal representation of the query and evaluating individual portions of that representation in a desired order. Another form of inquiry is a search, which returns ranked results based on a more unstructured search expression, and which results are based on machine learning and ranking of different attributes.

To the accomplishment of the foregoing, FIG. 1 illustrates an example computing environment 100 that facilitates time-travel debugging. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiments, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

The data store 104, which typically comprises durable storage, can store computer-executable instructions and/or data structures representing application code such as, for example, a debugger 106 (including, for example, a record component 106a, a replay component 106b, an indexing component 106c, a query component 106d, a search component 106e, etc.), an operating system 107, and an application 108 (including portions of executable code 108a of the application 108). The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime debugger data 106' (runtime record data 106a', runtime replay data 106b', runtime indexing data 106c', runtime query component data 106d', runtime search component data 106e', etc.), runtime operating system data 107', and runtime application data 108' (including, for example, runtime variables, data structures, etc. of application 108 as it executes, as well as runtime code portions 108a' which are in-memory copies of code portions 108a).

While the record component 106a, replay component 106b, indexing component 106c, query component 106d, and search component 106e are depicted as being part of debugger 106, it will be appreciated that one more of these components could be a standalone application, or part of some other application. The record component 106a is usable to trace execution of an application, such as application 108 (including its executable code portions 108a), and to store trace data in the trace file(s) 109. The record component 106a may, in some embodiments, be integrated into the operating system 107, itself, into a hypervisor, or into some other runtime or virtualization technology. The record component 106a may also exist at an entirely different computer system. Thus, the record component 106a may trace execution of code at another computer system. Then, the trace file(s) 109 resulting from that tracing can be transferred (e.g., using the networking hardware 105b) to the computer system 101 for indexing by the indexing component and/or replay by the replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes processing unit(s) 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more virtual processing units 102a presented by that single physical processing unit.

Each processing unit 102a executes processor instructions that are defined by applications (e.g., debugger 106, operating system 107, application code portions 108a, etc.), and which instructions are selected from among a predefined processor instruction set architecture. The particular instruction set architecture of a given processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108a of application 108, the shared cache 102b stores a subset of the runtime code portions 108b' in a code cache section of the shared cache 102b, and stores other runtime application data 108' (e.g., variables, data structures, etc.) in a data cache section of the shared cache 102b. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

The replay component 106b replays one or more trace file(s) 109 by executing the code of the executable entity upon which the trace file(s) 109 are based at the processor(s) 102, while supplying that code with traced data (e.g., register values, memory values, etc.) from the trace file(s) 109 at appropriate times. Thus, for example, the record component 106a may record execution of one or more code portions 108a of application 108 at the processor(s) 102, while storing trace data (e.g., memory values read by code instructions, register values supplied code instructions, etc.) in the trace files(s) 109. Then, the replay component 106b can re-execute the code portion(s) 108a at the processor(s) 102, while supplying that code with the trace data from the trace files(s) 109 so that the code is executed in the same manner that it was at trace time.

According the embodiments herein, the indexing component 106c may take as input one or more trace file(s) 109 (e.g., original trace file(s) 109a), and record one or more trace file(s) 109 (e.g., indexed trace file(s) 109b). As outlined previously, original trace file(s) 109a may have been recorded by the record component 106a (at this computer system 101 or an entirely different computer system) with characteristics consistent with performance and resource utilization goals applicable to low-overhead and efficient recording, while the indexed trace file(s) 109b are recorded by the indexing component 106c with characteristics that account for the performance and resource utilization goals of replay. For example, the original trace file(s) 109a may have been recorded with an emphasis on reduced file size and low recording overhead, which may have the tradeoff(s) of requiring a runtime reproduction of memory and/or of providing a coarse set of key frames from which a replay can be initiated (which may limit the degree to which replay can be parallelized). The indexed trace file(s) 109b, on the other hand, may be recorded by the indexing component 106c with an emphasis on responsive replay (including the ability for replay to be significantly parallelized), which may have the tradeoff of a larger trace file size. Notably, the indexing component 106c may be configured to take as input a variety of formats of original trace file(s) 109a, including taking as input original trace file(s) 109a from entirely different vendors than a vendor of the record component 106a.

The query component 106d and the search component 106e conduct searches using the indexed trace file(s) 109b in order to respond to user inquiries. In particular, the query component 106d conducts searches over the indexed trace file(s) 109b, and uses the replay component 106b to replay select portions of the indexed trace file(s) 109b in order to return a data set that is responsive to a user's query. The search component 106e further applies rules and machine learning of past queries and/or searches to filter a data set in order to return ranked results that attempt to surface the more relevant results responsive to a user's search.

While FIG. 1 illustrates original trace file(s) 109a and indexed trace file(s) 109b as being separate, it will be appreciated that they could actually be the same file. For example, rather than recording an entirely new file, the indexing component 106c may update/augment the input trace file with indexing data. For example the indexing component 106c may update existing data streams of an input trace file, insert additional data streams into an input trace file, append data to the end of an input trace file, prepend data to the beginning of an input trace file, etc.

Figure 2:
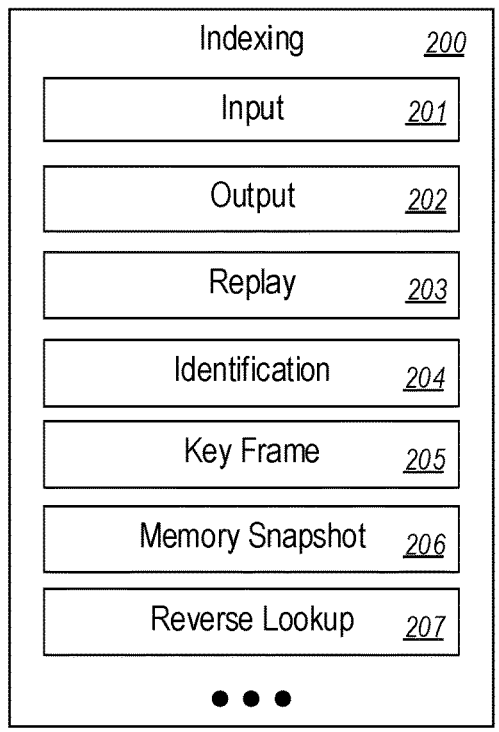
FIG. 2 illustrates an example of an indexing component.

FIG. 2 illustrates an example of an indexing component 200, which may correspond, for example, to the indexing component 106c of FIG. 1. As depicted, indexing component 200 includes a number of sub-components, such as, for example, an input component 201, an output component 202, a replay component 203, an identification component 204, a key frame component 205, a memory snapshot component 206, and/or a reverse lookup component 207. The depicted identity and arrangement of sub-components 201-207 are merely one example as an aide in description, and one of ordinary skill in the art will recognize that the particular identity and number of sub-components of the indexing component 200 can vary greatly based on implementation (e.g., as indicated by the ellipses).

In general, the input component 201 accesses/receives a trace generated during a trace recording. For example, the input component 201 may access one or more original trace files(s) 109a, which are to be indexed by the indexing component 200, from the data store 104, from system memory 103, and/or using network hardware 105b.

The output component 202 outputs an indexed trace recording that is generated based on the trace recording received at the input component 201. For example, in parallel with and/or after operation of other components (e.g., replay component 204, identification component 204, key frame component 205, memory snapshot component 206, etc.) on the input trace recording, the output component 202 can output/record an indexed trace recording (i.e., indexed trace file(s) 109b) to the data store 104, to system memory 103, and/or using network hardware 105b. As indicated above, this indexed trace file could be an entirely new trace file, but it may alternatively be the original trace file itself. Thus, as used in the disclosure herein and in the claims, an "indexed trace file" can be construed to be an entirely new trace file, or an original trace file that has been augmented with indexing data. In this latter circumstance, outputting/recording an indexed trace file could therefore include augmenting the file that was input by the input component 201 (e.g., by modifying existing data streams, adding new data streams, appending/prepending data to the file, etc.).

The replay component 203 replays the original trace files(s) 109a received at the input component 201, so that they can be optimized/indexed by the identification component 204, key frame component 205, memory snapshot component 206, etc. In some embodiments, the replay component 203 calls or otherwise utilizes replay component 106b of FIG. 1, though replay component 203 could be entirely separate from replay component 106b, a derivative of replay component 106b, etc.

The identification component 204 identifies replay goals and/or code characteristics that are used as part of generating a trace that emphasizes facilitating a responsive replay. Examples of these goals/characteristics are provided hereinafter in connection with specific embodiments using the goals/characteristics.

The key frame component 205 utilizes goals/characteristics identified by the identification component 204 in order to insert new key frames into the indexed trace file(s) 109b. These embodiments are discussed primarily in connection with FIGS. 5 and 6.

The memory snapshot component 206 utilizes goals/characteristics identified by the identification component 204 in order to generated one or more additional data streams into the indexed trace file(s) 109b, which contain a plurality of memory snapshots. These embodiments are discussed primarily in connection with FIGS. 7-9.

The reverse lookup component 207 augments the indexed trace files(s) 109b with reverse lookup data structure(s) based on attributes that are observed during replay of the original trace files(s) 109a (or even a replay of the indexed trace file(s) 109b). In general, reverse lookup data structures are structures that associate attribute(s) with the trace sections(s) (e.g., trace sections created by the insertion of key frames by the key frame component 205) with which the attribute(s) were the observed during replay. The reverse lookup component 207 may also utilize goals/characteristics identified by the identification component 204 to generate reverse lookup data structure(s) that further responsiveness goals (e.g., by adjusting a granularity of the reverse lookup data structure(s)). These embodiments are discussed primarily in connection with FIGS. 10 and 11.

Figure 3:
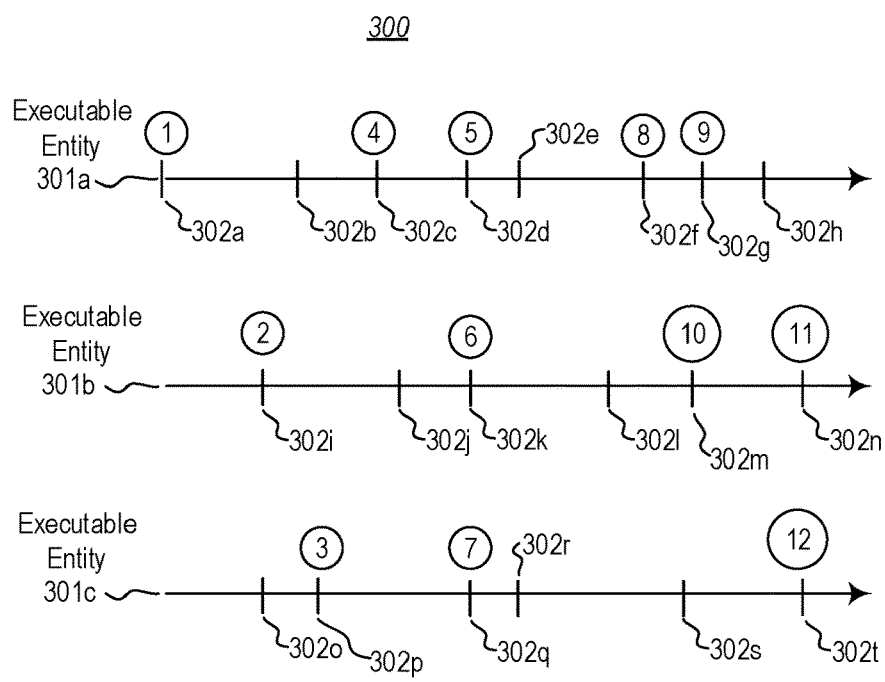
FIG. 3 illustrates an example timing diagram representing a portion of execution of three executable entities.

FIG. 3 illustrates an example timing diagram 300 representing a portion of execution of three executable entities 301a-301c (e.g., as observed during recording/tracing by the record component 106a), with execution commencing at the left end of the arrow, and proceeding to the right. For example, executable entities 301a-301c may correspond to threads of application 108a that execute code from one or more of code portions 108a. In another example, executable entities 301a-301c may correspond to threads of a kernel of the operating system 107. In FIG. 3, the executable entities 301a-301c execute in parallel (e.g., concurrently, each at a different physical or virtual processing unit 102a), though the indexing embodiments herein can operate in environments in which the executable entities 301a-301c execute "single threaded," sharing time at a single processing unit.

In FIG. 3, individual events occur along each arrow. For example, in general these events correspond to individual processor instructions executed as part of each executable entity. Since, on modern processors, these events can easily number in the billions for mere seconds of execution, they are not expressly depicted in FIG. 3. However, FIG. 3 does identify several events across the entities (i.e., events 302a-302t) that may be of particular interest to during debugging. For example, they may correspond to instructions associated with interesting memory accesses (e.g., those that would be the basis of an orderable event, as discussed later), instructions associated with certain logical boundaries (e.g., a call to or an exit from a function, a module, a kernel transition, etc.), instructions associated with exceptions, instructions associated with cache flushes, instructions associated with input/output operations (e.g., disk accesses, network accesses, etc.), instructions associated with activity of a runtime environment (e.g., a garbage collection activity), etc. Events may also be associated with data obtained from replay of the entit(ies), such as an amount of elapsed time (e.g., "wall clock" time), an amount of processing time (e.g., processor cycles used), reaching a particular instruction count, etc. While events 302a-302t are depicted as having occurred, it is noted that the record component 106a may not actually recognize each of them as being interesting events.

Figure 4:
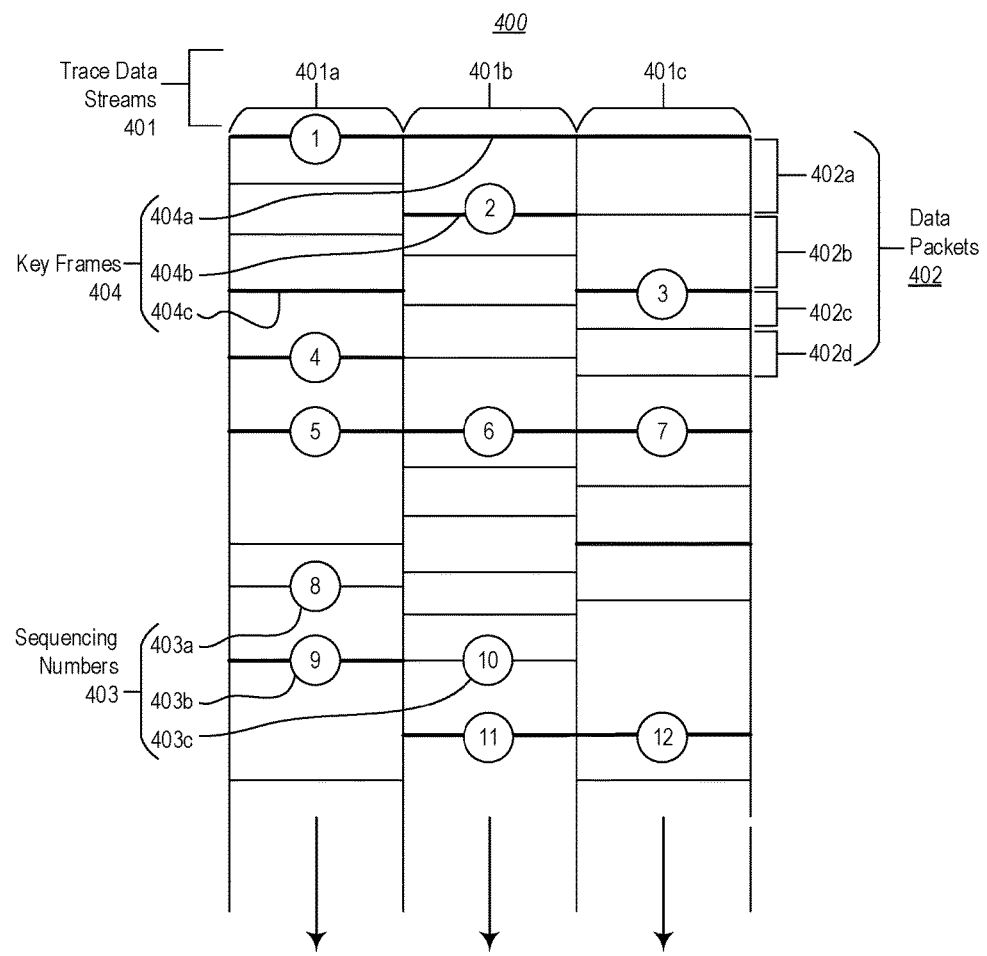
FIG. 4 illustrates an example of a trace file recorded based on the timing diagram of FIG. 3.

In view of FIG. 3, FIG. 4 illustrates one example of a trace file 400 that might be generated by the record component 106a based on the execution of the executable entities 301a-301c depicted in FIG. 3. In FIG. 4, which is based on a parallel execution of executable entities 301a-301c, the trace file 400 independently stores a different data stream recording data representing execution of a corresponding entity. Thus, in FIG. 4, the trace file 400 includes three trace data streams 401a-401c (referred to generally as trace data streams 401), each recording a trace of execution of one of executable entities 301a-301c. It will be appreciated that the trace file 400 could include any number of trace data streams 401, depending on a number of processing units 102a available at the computer system 101 and/or a number of executable entities produced by the program being traced (e.g., application 108). It will also be appreciated that the trace data streams 401 may be included in a single file trace file, or may each be stored in different related files.

Each trace data stream 401 includes a plurality of data packets storing trace data that is usable by the replay component 106b to reproduce execution of its corresponding executable entity, by supplying appropriate recorded state data (e.g., register values, memory addresses and values, etc.) to executable code of the executable entity at appropriate times. Thus, using the information in the data streams 401, and using the actual executable code of the application whose execution was traced, a full reproduction of execution of that code can be reproduced by the replay component 106b. In some embodiments, each data packet could potentially represent the execution of a plurality of code instructions. For example, a data packet may record information that identifies a code instruction to be executed, and its inputs. Then, the replay component 106b may replay a series of instructions, where each instruction in the series is dependent only on the outputs of the prior instruction(s) to it in the series, and/or other program state (e.g., register values, memory values, etc. that were established as part of replaying prior data packet(s) in the same trace data stream 401.

FIG. 4 depicts data packets as being bounded by the horizontal lines in each data stream. Four data example packets 402 in data stream 401c are expressly labeled as data packets 402a-402d. As depicted, individual data packets may be of differing sizes, depending on trace file implementation and on the particular data stored in each packet. Example data that may be included in a data packet includes information for identifying a code instruction executed (e.g., a count of instructions executed since the last logged code instruction, a processor instruction counter value, etc.), register value(s) provided to that code instruction, memory address(es)/value(s) read, any side effects of executing the code instruction (e.g., resulting register values), etc.

The trace file 400 includes standard data packets (which are a depicted as beginning with a light horizontal line), as well as key frames 404 (which are a depicted as beginning with heavy horizontal lines). A key frame is a type of data packet that stores sufficient information to begin replay execution of an executable entity from the point of the key frame onward without the need of having execution/replay state from packets prior to the key frame. For example, a key frame may store values for all relevant processor registers, information necessary to reproduce memory values from that point onward, etc.

The trace file 400 includes a key frame at the beginning of each trace data stream 401 (which enables the replay component 106b to begin replay of each trace data stream), as well as additional key frames appearing throughout each trace data steam 401. Three example key frames are expressly labeled in FIG. 4 as key frame 404a (which occurs at the beginning of trace data stream 401b), key frame 404b (which occurs in connection with an orderable event, which are discussed later), and key frame 404c. In general, the record component 106a can record a key frame at any point in a data stream 401. As depicted, they need not occur at the same time across data streams, or at any particular frequency.

As mentioned above, key frames enable the replay component 106b to initiate replay of each trace data stream 401 at various points. For example, referring to data stream 401a, the replay component 106b can use key frames to initiate execution at different parts in the stream, including at the start of the data stream, at sequencing numbers 4, 5, and 9 (which, as depicted, each corresponds with a key frame), and at key fame 404c. Thus, key frames define different independently repayable trace sections (or segments), with each section being bounded on both ends by a key frame.

In some embodiments, when using the example format of trace file 400, the record component 106a records each data stream 401 generally independently from the other data streams during parallel execution of the code being traced. In doing so, record component 106a does not generally record the actual timing execution of events by one entity versus the timing of execution of events by another entity, since code instruction executed by one entity generally doesn't affect code instructions executing another entity. Thus, the data packets in one trace data stream 401 can generally be replayed independent of the data packets in another trace data stream 401.

The trace file 400 does, however, include some data packets identifying events that are "orderable" across the entities/data streams. These orderable events generally correspond to events that are performed by one executable entity that could affect execution of another entity, such as accessing memory shared by the entities. In FIGS. 3 and 4, orderable events are represented with a "sequencing number" that defines the order in which these events occurred across the entities relative to each other. Thus, in some embodiments, the sequencing number which is a monotonically incrementing number ("MIN"), that is guaranteed to not repeat. For example, the trace file 400 includes twelve sequencing numbers (depicted as circled numerals 1-12), each defining the order in which different orderable events executed across entities 301a-301c relative to each other.

In some embodiments, orderable events are identified based on a "trace memory model" that defines whether to treat events as orderable or non-orderable based on their interactions across executable entities. For example, orderable and/or non-orderable events may be defined based on how the threads interact through shared memory, their shared use of data in the shared memory, etc. Depending on implementation, a trace memory model used by the record component 106a may be weaker or stronger than a memory model used by the processor 102. The trace memory model used may be a memory model defined by a programming language used to compile code (e.g., C++ 14), or some other memory model defined expressly for purposes of tracing.

A first example trace memory model may treat as orderable only kernel calls (from user mode), traps, and exceptions. This trace memory model would have low overhead, since these operations are relatively "expensive" is their own right, they are likely tracked anyway and provide a very coarse grained overview of ordering. A second example trace memory model may treat as orderable full fences (i.e., operations that are have both acquire & release semantics). Examples of such operations may include INTEL's "locked" instructions, kernel calls, exceptions, and traps. This memory model would provide enough ordering for nearly all cross-thread communication that happens in the process when the code uses "interlocked" types of primitives to communicate cross threads, which is common in operating such as WINDOWS from MICROSOFT CORPORATION). A third example trace memory model may treat all acquires and releases as orderable. This memory model may be suitable for processors based ARM instruction sets, because ARM does not treat most loads and stores as acquires or releases. On other architectures, such as from INTEL (in which a majority of memory accesses are acquires or releases), this would equate to ordering almost all memory accesses. A fourth example trace memory model may treat as orderable all memory loads. This would provide for strong ordering but may lead to decreased performance as compared to the other example memory models. The foregoing memory models have been presented as examples only, and one of ordinary skill in the art will recognize, in view of the disclosure herein, a vast variety of memory models may be chosen.

In view of the foregoing discussion of trace file 400, it will be appreciated that key frames enable the replay component 106b to initiate replay of different sections of the same trace data stream, and thus enable the replay component 106b to replay these different sections of the same trace data stream 401 independently and in parallel. Additionally, with the trace data streams 401 being recorded independently, and with the timing of events in one trace data stream being generally independent from the timing of events in another trace data stream, the replay component 106b can replay sections from different trace data streams 401 independently and in parallel.

Sequencing numbers then enable the replay component 106b to combine the results of parallel replay of these individual sections to present an accurate representation of how the entities actually executed when they were recorded. In particular, the sequencing numbers (which, as discussed above, define the relative order of orderable events across the trace data streams) enable the replay component 106b to choose an ordering among the different trace sections to define a total ordering of all instructions in the trace file 400 that can be used to present results at the debugger 106. Such an ordering enables the 106 debugger to present a consistent view of program state (e.g., memory and registers) at all points in the trace, and no matter how the replay component 106b actually arrived at that point in execution (e.g., what order in which it executed individual trace sections).

A valid ordering places the trace sections in an order that would ensure that sequencing events are presented in proper order (i.e., in their monotonically increasing order). However, a valid ordering does not need to reproduce the exact order in which all instructions executed relative to each other at trace time. For example, in reference to FIG. 3, a valid ordering needs to ensure that an orderable event at sequencing number three is presented has having occurred prior to an orderable event at sequencing number four. However, the ordering does not need to ensure that a non-orderable event executed just after sequencing number three by entity 301c is presented prior to a non-orderable event executed just after sequencing number four by entity 301a, since these events are non-orderable events at different entities.

Valid orderings need not include sections from all trace data streams (e.g., because execution of one thread may not be relevant to obtaining desired data at a given point of interest), and multiple valid orderings could be chosen. For example, suppose that reverse breakpoint on the event at sequencing number 8 is being requested. One valid ordering of sections to reach this breakpoint using only trace data streams 401a and 401c could include:
1. A section on trace 401a starting at the key frame at sequencing number 1, and ending at an instruction just prior to the key frame at sequencing number 4, then
2. A section on trace 401c starting its beginning key frame, and ending at an instruction at the key frame at sequencing number 3, then
3. A section on trace 401a starting at the key frame at sequencing number 4, and ending at an instruction just prior to the key frame at sequencing number 5, then
4. A section on trace 401c starting at an instruction just after the key frame at sequencing number 3, and ending at an instruction just prior to the key frame at sequencing number 7, and then
5. A section on trace 401a starting at the key frame at sequencing number 5, and ending at an instruction just prior to the key frame at sequencing number 9. Note that this section includes sequencing number 8 between sequencing numbers 5 and 9.

If these sections are viewed as having been replayed linearly, in the order specified, then all the instructions on trace 401a up to (but not including) sequencing number 9 are replayed, all of the instructions on trace 401c up to (but not including) sequencing number 7 are replayed, and each orderable event that was replayed is viewed as being replayed in the correct order (i.e., 1, 3, 4, 5, and 8).

Another valid ordering using all the trace data streams that could be chosen to arrive at sequencing event 8 could include:
1. A section on trace 401a starting at the key frame at sequencing number 1, and ending at an instruction just prior to the key frame at sequencing number 4, then
2. A section on trace 401b starting its beginning key frame, and ending at an instruction just prior to the key frame at sequencing number 2, then
3. A section on trace 401c starting its beginning key frame, and ending at an instruction just prior to the key frame at sequencing number 3, then
4. A section on trace 401b starting at the key frame at sequencing number 2, and ending at an instruction just prior to the key frame at sequencing number 6, then
5. A section on trace 401c starting at an instruction at the key frame at sequencing number 3, and ending at an instruction just prior to the key frame at sequencing number 7, then
6. A section on trace 401a starting at the key frame at sequencing number 4, and ending at an instruction just prior to the key frame at sequencing number 5, then
7. A section on trace 401a starting at the key frame at sequencing number 5, and ending at an instruction just prior to the key frame at sequencing number 9. Note again that this section includes sequencing number 8 between sequencing numbers 5 and 9.

Similarly, if these sections are viewed has having been replayed linearly, in the order specified, all the instructions on trace 401a up to (but not including) sequencing number 9 are replayed, all of the instructions on trace 401b up to (but not including) sequencing number 6 are replayed, and all of the instructions on trace 401c up to (but not including) sequencing number 7 are replayed, and each orderable event that was replayed is viewed as being replayed in the correct order (i.e., 1, 2, 3, 4, 5, and 8).

The replay component 106b need not actually perform the replay of the sections according to this determined ordering. Instead, replay component 106b can replay the sections in any order, so long as the results obtained by the replay are presented according to the constraints of the determined ordering. Thus, the replay component 106b can queue the trace sections for replay in any order, and can replay them in any order at one or more processing units 102a, so long as the results are presented in a valid ordering.

Recall that FIG. 3 identified several events across the entities (i.e., events 302a-302t) that may be of particular interest to during debugging, and further that, while events 302a-302t did occur during execution, the record component 106a may not have actually recognized each of them as being interesting events. This is reflected in the trace file 400 of FIG. 4. In particular, the trace file 400 includes a record of all the orderable events (i.e., sequencing numbers 1-12, corresponding to events 302a, 302i, 302p, 302c, 302d, 302k, 302q, 320f, 302g, 302m, 302n, and 302t, respectively). In addition, the record component 106a included a key frame at many of these sequencing numbers. In addition, drawing a comparison between FIGS. 3 and 5, it can also be observed that the record component 106b recorded key frame 404c at event 302b. However, there are several other events (e.g., events 302e, 302f, 302h, 302j, 302l, 302m, 302o, 302r, and 302s) for which there are no key frames. These events may be of particular interest during debugging (and thus may be the subject of breakpoints), but using trace file 400 the replay component 106*b* may need to replay large sections of different trace data streams 401 in order to reach those points of execution, leading to an unresponsive debugging experience.

Figure 5:
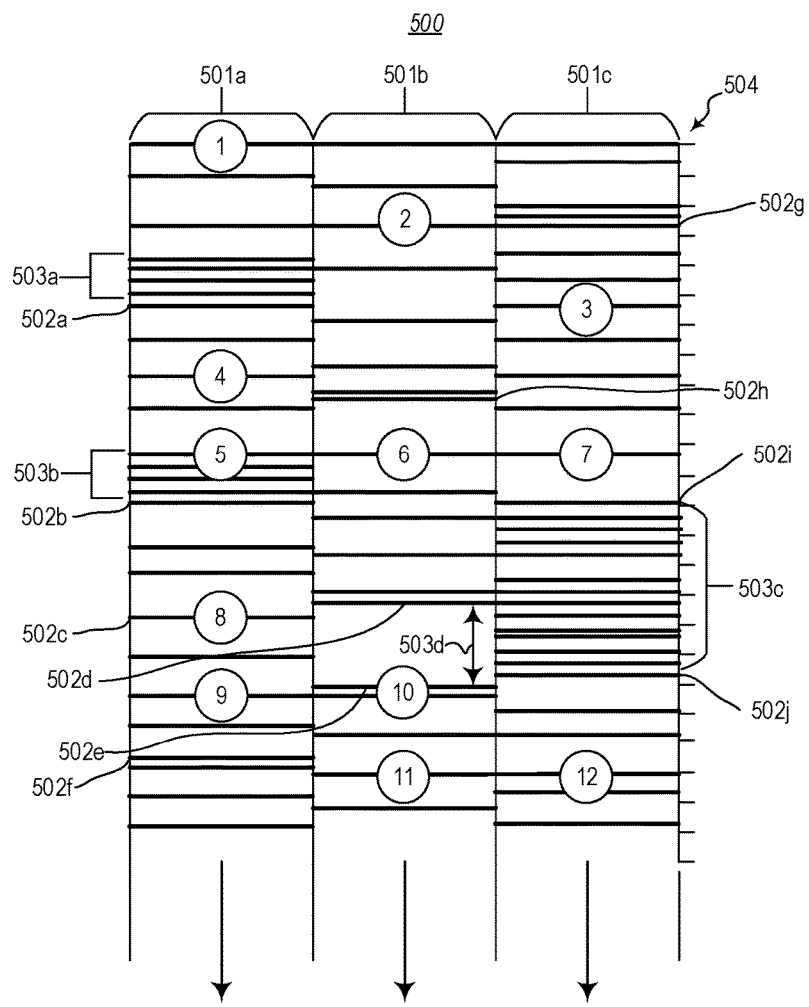
FIG. 5 illustrates an example of an indexed trace file, generated based on the trace file of FIG. 4, and which includes additional key frames based on replay goals and identified points of interest.

FIG. 5, on the other hand illustrates an example of a trace file 500 that might be generated by the indexing component 200, based on receiving trace file 400 as input. For clarity, FIG. 5 shows only key frames and sequencing numbers, not individual data packets. In FIG. 5, trace file 500 that includes additional key frames, that are inserted by the indexing component 200 based on identified responsiveness goals for trace replay, and based identified points of interest in execution of executable entities 301*a*-301*c*. More particularly, the trace file 500 is generated based upon the input component 201 receiving/reading trace file 400 and the replay component 203 replaying the trace file 400. In connection with replay of trace file 400, the identification component 204 identifies different locations to insert new key frames by the key frame component 205 while writing trace file 500 with the output component 202.

In some embodiments, a responsiveness goal used by the identification component 204 may be a target amount of time it should typically take for a debugger to return a result. Based on this goal, the identification component can determine an average granularity with which to divide each trace data stream 501 into different sections using key frames. For example, it is generally recognized that most humans are unable to perceive time periods of about 50 milliseconds (ms) or less. Thus, if a computer user interface takes about 50 ms or less to respond to a user's input, that response is generally perceived by a human user as being instantaneous.

As such, the identification component 204 makes a goal that the trace file 500 generated by the indexing component 200 enable the replay component 106*b* to replay to arbitrary points in a trace within about 50 ms, for at least a desired percentage (e.g., 95%) of queries. In doing so, the identification component 204 may identify attributes of a target environment for replay, such as a number and/or speed of processing units anticipated to be 102*a* available for replay. In addition, the identification component 204 may identify an amount of trace data that is typically replayed (e.g., 95% of the time) in order to reach arbitrary points in most traces. This identification may be based on a statistical analysis of past usage of the debugger 106 at this computing system 101 and/or at other computing systems. Based on the foregoing (and potentially other) factors, the identification component 204 can identify a target time it should take an individual processing unit 102*a* to replay a single section of the trace file 500.

As an example only, in one computing environment having four processing units 102*a*, the identification component 204 could perhaps determine that in order to return a result within 50 ms for about 95% of queries, each trace section should take about 5 ms for an individual processing unit to replay (enabling each processing unit to replay about 10 sections in order to return a result). The identification component 204 may also identify a maximum and a minimum target replay time, such as between 4.5 and 5.5 ms. Then, the identification component 204 cause the key frame component 205 to insert key frames at locations in each trace data stream 501 that would hit these targets.

Thus, in FIG. 5, the trace file 500 includes many additional key frames that are placed semi-regularly based on target time intervals that have been estimated by the identification component 204 to enable each individual trace section (i.e., sections bounded by two key frames) to be replayed within a target time range. Target time intervals 504 are represented in FIG. 5 as ticks to the right of the trace file 500 and could, for example, delineate 5 ms intervals for use in a goal of having a key frame every 4.5-5.5 ms. It is noted that, due to the differing nature of the instructions being executed, it may not be possible to insert key frames at exact intervals, and thus the use of ranges and targets.

Another responsiveness goal used by the identification component 204 could be to enable efficient replay at and around identified points of interest. For example, as part of reading trace file 400 by the input component 201 and/or as part of replay of trace file 400 by the replay component 205, the identification component 204 may identify points of interest in execution of traced entities, such as events 302*a*-302*t* in entities 301*a*-301*b*. Depending on the nature of each event, the identification component 204 can cause the key frame component 205 to insert additional key frame(s) at, before, and/or after the event. In addition, depending on the nature of an event, the identification component 204 may prevent the key frame component 205 from inserting key frames where it may have otherwise inserted them based on other goals.

For example, FIG. 5 illustrates additional key frames that have been inserted by the key frame component 205 in connection with the events from FIG. 3 that has no specific key frames in the trace file 400 of FIG. 4. For example, key frame 502*b* corresponds with event 302*e*, key frame 502*c* corresponds with event 302*f* (sequencing number 8), key frame 502*d* corresponds with event 302*l*, key frame 502*e* corresponds with event 302*m* (sequencing number 10), key frame 502*f* corresponds with event 302*h*, key frame 502*g* corresponds with event 302*o*, key frame 502*h* corresponds with event 302*j*, key frame 502*i* corresponds with event 302*r*, and key frame 502*j* corresponds with event 302*s*. Depending on the type of event the key frames occur at the corresponding event, or at an event just before or after the corresponding event.

The key frame component 205 may insert key frames surrounding an event. For example, in FIG. 5, the key frame component 205 has inserted additional key frames 503*a* and 503*b* before key frames 502*a* (event 302*b*) and 502*b* (event 302*e*). For example, the identification component 204 may have identified these events as being exceptions encountered during execution. Since exceptions are generally an interesting place to investigate during debugging, additional key frames prior to these events can enable quicker and more granular debugging performance around these exceptions.

As another example, in FIG. 5 the key frame component 205 has inserted an additional key frame after key frame 502*f* (event 302*h*), and has inserted additional key frames before key frames 502*g* and 502*h* (events 302*o* and 302*j*). For example, the identification component 204 may have identified these events as function calls, and inserted key frames before the function calls (events 302*o* and 302*j*) or after exiting the function call (e.g., 302*h*). Since function call boundaries are also generally an interesting place to investigate during debugging, additional key frames prior to the function, or after the function returns, can also enable quicker and more granular debugging performance around these exceptions.

As another example, in FIG. 5 the key frame component 205 has inserted an additional key frames 503*c* between key frames 502*i* (event 302*r*) and 502*j* (event 302*s*). In this case, event 302*r* may, for example, correspond to a call to a function or module of particular interest, and event 302*s* may correspond to a return from the function or module. As such, additional key frames 503*c* have been inserted to facilitate responsive debugging of this function/module. On the other hand, key frames 502d and 502f (events 302l and 302m) may also represent a call to and return from a function or module. In this case, however, the key frame component 205 has refrained from inserting any key frames in the trace section 403d corresponding to execution of the function/module (even key frames that would appear at a regular interval). This may be because the code being executed between events 302l and 302m is not likely to be the subject of debugging. For example, this code may correspond to third party code, a well-tested function, etc.

It will be appreciated that the insertion of key frames based on identified points of interest may affect the particular locations in which key frames are inserted based on sections that will execute within goal time periods. For example, if a key frame inserted based on identified points of interest falls within the goal time period for inserting a semi-regular key frame, that key frame may be also used as the semi-regular key frame, rather than inserting an additional key frame meet time period goals.

Figure 6:
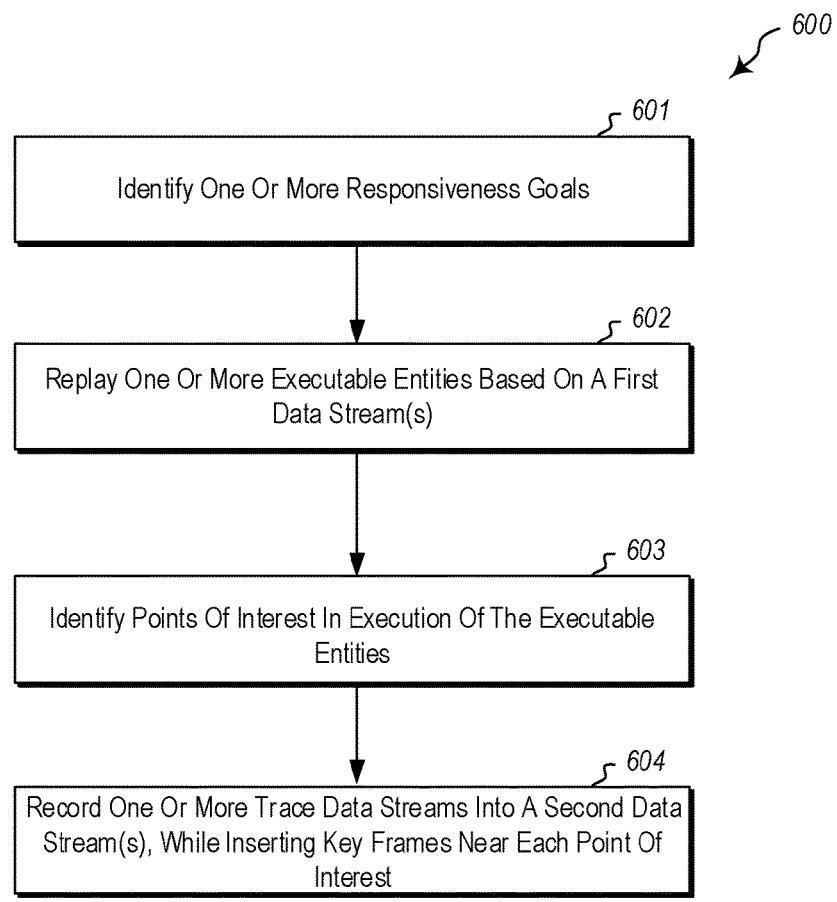
FIG. 6 illustrates a flowchart of an example method for inserting key frames during indexing of a trace for responsive trace replay.

In view of the foregoing, FIG. 6 illustrates an example of a method 600 for inserting key frames during indexing of a trace for responsive trace replay. Method 600 is described in connection FIGS. 1-5. While method 600 is presented as a series of acts, it will be appreciated that the particular number and ordering of the acts shown is only example of inserting key frames during indexing of a trace consistent to the embodiments herein.

As depicted, method 600 includes an act 601 of identifying one or more responsiveness goals. In some embodiments, act 601 comprises identifying one or more responsiveness goals for trace replay, including identifying a target trace section replay time. For example, based on receiving/loading one or more input original trace file(s) 109a at the input component 201 of indexing component 200, the identification component 204 of indexing component 200 identifies one or more responsiveness goals for creating one or more indexed trace file(s) 109b based on the input file(s) 109a. The particular number and type of responsiveness goals may vary but may include a target amount of time it should typically take for a debugger to return a result, including an average granularity with which to divide each trace data stream from original trace file(s) 109a the into different sections using key frames. Thus, in this example, a responsiveness goal includes identifying a target trace section replay time. In one example, the original trace file(s) 109a may be formatted as shown in trace file 400 of FIG. 4, although the indexing component 200 may be capable of inputting a variety of different trace file formats.

In some embodiments, identifying responsiveness goals can comprise identifying a target physical computing environment for replay of the indexed trace file. For example, the identification component 204 may identify an estimated speed and/or number of processing units 102a that will be available, memory resources (e.g., system memory 103) that are anticipated to be available, disk storage resources (e.g., data store 104) that are anticipated to be available, network storage resources (e.g., using networking hardware 105b) that are anticipated to be available, etc. The identification component 204 can then adjust goals based on these resources.

Method 600 also includes an act 602 of replaying one or more executable entities based on first trace data streams(s). In some embodiments, act 602 comprises replaying at least a portion of execution of one or more executable entities based on one or more first trace data streams. For example, the replay component 203 of indexing component 200 (e.g., replay component 106b, in some embodiments) replays one or more trace data streams, each corresponding to a different traced executable entity.

If the original trace file(s) 109a included the trace file 400 of FIG. 4, then act 602 may comprise replaying execution of one or more of entities 301a, 301b, and/or 301c (as shown in FIG. 3) based on trace data streams 401a, 401b, and/or 401c of FIG. 4. Note that, since in the example trace file 400 trace data streams 401a, 401b, and/or 401c were recorded independently, the replay component 203 need not necessarily replay the trace data streams 401a, 401b, and/or 401c at the same time.

Method 600 also includes an act 603 of identifying points of interest in execution of the executable entities. In some embodiments, act 603 comprises, while replaying execution of the one or more executable entities, and based at least on the identified target trace section replay time, identifying a plurality of points of interest in execution of the one or more executable entities. For example, during replay by the replay component 203 of trace data streams in the original trace file(s) 109a, the identification component 204 of the indexing component 200 can identify target key frame insertion points that would create trace sections that can be replayed within a goal time period. For example, in FIG. 5, the identification component 204 has identified target time intervals 504, and which correspond to points near which a key frame could be inserted to ensure that most trace sections replay within the goal time period.

Additionally, the identified points of interest may include interesting events that occurred during execution, and that may be of interest during debugging of the entity that was traced, such as orderable events, function boundaries, module boundaries, exceptions, kernel transitions, runtime environment activity, cache flushes, input/output activity, etc. For example if the original trace file(s) 109a included the trace file 400 of FIG. 4, then act 603 may comprise identifying one or more of events 302a-302t. As discussed in connection with FIG. 4, while some of these events are reflected directly in trace file 400 (e.g., some of the orderable events key fames, and the orderable events being identified with sequencing numbers), many others of the events (e.g., functions boundaries, exceptions, module boundaries, etc.) are not reflected directly in trace file 400.

As discussed previously, the original trace file(s) 109a may not specifically log some events because of certain goals being used by the record component 106a at record time, such as to minimize recording overhead, to minimize trace file size, etc. Additionally or alternatively, the original trace file(s) 109a may not specifically log some events because whatever program created the original trace file(s) 109a is not capable of identifying these events, and/or because the trace file format of the original trace file(s) 109a is not capable of representing these events.

Method 600 also includes an act 604 of recording one or more trace data streams into second trace data stream(s), while inserting key frames near each point of interest. In some embodiments, act 604 comprises recording one or more second trace data streams, including inserting a key frame into the one or more second trace data streams at, or near, each of the identified plurality of points of interest, to create a plurality of trace sections, each key frame enabling replay of at least one of the one or more executable entities beginning at the key frame. For example, the output component 202 of indexing component 200 can output one or more indexed trace file(s) 109b, while the key frame component 205 of the indexing component inserts key frames at, or near, the identified points of interest. As discussed in connection with FIG. 5, these key frames can create sections that are generally of a size that is repayable within a goal time frame, and can include one or more key frames at, before, and/or after identified events of interest (e.g., a key frame at the instruction corresponding to an event of interest, and/or at an instruction before or after the instruction corresponding to the event of interest).

It will be appreciated that inserting key frames at an instruction before/after the instruction corresponding to the event of interest could comprise inserting an instruction immediately before/after the instruction corresponding to the event of interest. Alternatively, inserting key frames at an instruction before/after the instruction corresponding to the event of interest could comprise inserting an instruction near the instruction corresponding to the event of interest (e.g., there could be one or more instructions between the key frame and the instruction corresponding to the event of interest). In some embodiments, it may be desirable to insert a key frame immediately before/after an instruction that transitions to/from a module, and to insert a key frame near an exception.

FIG. 5 illustrates one example of an indexed trace file 109b, which includes new key frames placed regularly based on target time intervals 504; new key frames at orderable events (e.g., key frames 502c and 502e); new key frames at and around exceptions (e.g., key frames 503a before event 302 and key frames 502b/503b at and before event 302e); new key frames at, in, and/or around function/module boundaries (e.g., key frames 502d, 502f, 502g, 502h, 502i, 502j, 503c), etc.

In some embodiments, recording one or more second trace data streams (e.g., into indexed trace file(s) 109b) comprises converting a trace file format of the one or more first trace data streams (e.g., from original trace file(s) 109a). For example, if the original trace file(s) 109a were created with software other than the record component 106a (e.g., a debugger from a different inventor, a different version of record component 106a, etc.), the output component 202 can nonetheless record the new trace data streams in a format used by the record component 106a (e.g., the format of trace files 400, 500, 800, etc.).

Accordingly, some of the embodiments herein index trace files according to performance and resource utilization goals for replay, while potentially considering the specific replay computing environment used, by inserting new key frames into trace files. These key frames may be inserted at semi-regular intervals in order to meet a goal replay time for each trace section created by the key frame, and/or may be inserted at, before, and/or after specifically-identified events of interest.

In some embodiments, the indexing component 200 also stores into trace file 500 aggregate and/or statistical information for individual trace sections. For example, the indexing component 200 may record data such as memory addresses accessed by a trace section, functions called during a trace section, return values seen during a trace section, function input values used during a trace section, the number of exceptions encountered in the trace section, etc. The debugger 106 can then use this data to identify specific trace sections to replay in order to produce requested results. In some embodiments, the indexing component 200 may utilize the reverse lookup component 207 to store some of this data in one or more reverse lookup data structures, as discussed in more detail later.

In some embodiments, at least a portion of this aggregate data comprises memory snapshots. Thus, FIG. 2 illustrates that the indexing component 200 includes a memory snapshot component 206, which can be used to create and insert memory snapshots into an indexed trace file 109b in connection with replay of an input original trace file 109a. Memory snapshots may be inserted in parallel with the insertion of key frames, or may be inserted as a separate indexing pass. Additionally, depending on replay goals, indexing component 200 could insert memory snapshots without inserting new key frames. The particular replay goals and/or the particular locations in which to insert memory snapshots may be determined by the identification component 204.

In general, a memory snapshot is a data structure that stores summary information about the memory addresses and/or values that were encountered during execution of one or more sections of an entity. These snapshots can then be used by the debugger 106 to identify which trace sections should be replayed in order to obtain a specific value of memory at a given point of time. The particular data structure(s) use or storing memory snapshots can vary, but could include, for example, binary trees (e.g., B, B+, B*), hash tables, etc.

It is noted that while key frames may, in some embodiments, store memory values, memory snapshots are distinct from key frames. For example, if a key frame stores memory values, it stores those values that enable replay of an executable entity to be started at the key frame, such as memory values (if any) that would be supplied to the particular processor instruction that executes at the key frame. Memory snapshots, on the other hand, store a summary of memory addresses and/or values that were accessed by a plurality of instructions during one or more sections of execution. Additionally, key frames are stored within the trace data streams while, as discussed later, memory snapshots are typically stored as one or more separate data stream(s) altogether.

The particular data stored in a memory snapshot can vary based on implementation and replay goals, but some embodiments store which memory addresses were encountered when replaying one or more corresponding sections of a trace, along with the most recent value seen at each address. With such structures, the debugger 106 can determine which trace section(s) touched identified memory location(s), and replay only those trace sections in order to return the memory values stored at those identified locations at various times during execution. Additionally, if memory values at the time of a snapshot are requested, they may potentially be returned directly from the snapshot without any replay.

Depending on implementation and trace replay goals snapshots could store additional information as well, such as the number of times each memory location was accessed, an instruction count or some other timestamp identifying when the memory location was accessed, the value of each access, the type of each access (e.g., read or write), etc. Similar to the insertion of key frames, the content and frequency of memory snapshots may be based on replay goals, including the target replay environment. For example, an analysis may be made by the indexing component 200 of desired replay responsiveness versus acceptable trace file size for the indexed trace file(s) 109. It will be appreciated that, in general, a trace file with a greater number of memory snapshots facilitates a more responsive replay, but also results in lager trace file size. Thus, an analysis of replay goals may consider available storage and/or memory resources at a replay computing environment, a total duration of traced execution (e.g., a greater number of snapshots may be inserted for traces having a shorter overall duration), a number of executable entities represented (e.g., a greater number of snapshots may be inserted for traces representing a fewer number of executable entities), etc. It is noted that these factors can also be a consideration for determining how many key frames to insert, since they also directly affect trace file size.

Figure 7:
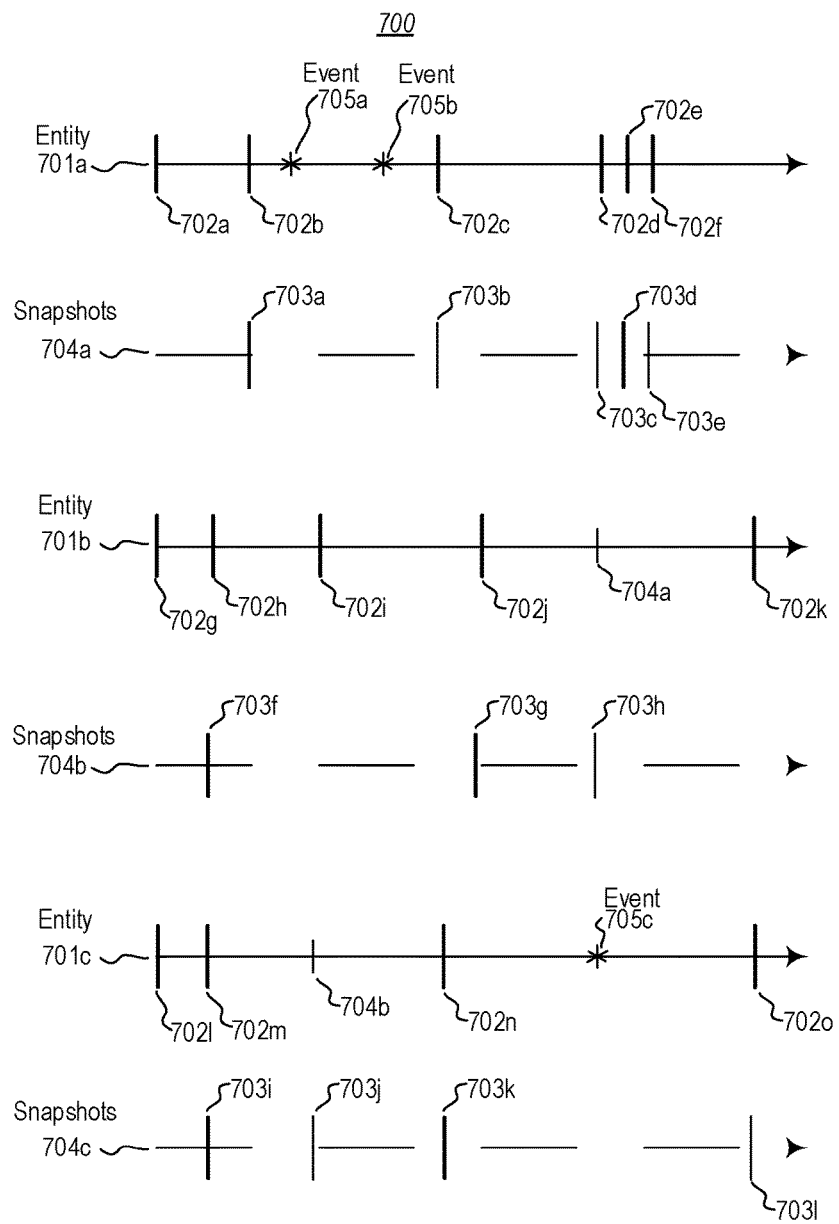
FIG. 7 illustrates an example timing diagram representing a portion of execution of three executable entities, along with corresponding memory snapshots.

To help illustrate the concept of memory snapshots, FIG. 7 illustrates an example timing diagram 700 representing a portion of execution of three executable entities (701a-701c). In FIG. 7, the timeline of execution of executable entities 701a-701c may, for example, represent a view of program execution as seen by the replay component 203 of the indexing component 200 when replaying an original trace file 109a. In FIG. 7, the execution timelines include the locations of a plurality of key frames 702a-702o. These key frames could, for example, correspond to key frames that were already recorded in an original trace file 109a, and/or correspond to new key frames that have been, or will be, inserted into an indexed trace file 109b by the key frame component 205 of the indexing component 200 as discussed above in connection with FIG. 5. The execution timelines for entities 701b and 701c also include the identity of other events 703a and 703b for which there is no key frame. These could, for example, correspond to orderable events for which the indexing component 200 did not insert a key frame.

FIG. 7 also represents three timelines representing the storage of memory snapshots (704a-704c), each corresponding to one of executable entities (701a-701c). As mentioned above, each memory snapshot (703a-703l) comprises a summary of memory addresses and/or values that were encountered during a corresponding section of execution. Thus for example, referring to entity 701a and snapshots 704b, snapshot 703a comprises a summary of memory addresses and/or values that were encountered during execution of entity 701a between key frames 702a and 702b, snapshot 703b comprises a summary of memory addresses and/or values that were encountered during execution of entity 701a between key frames 702b and 702c, and so on to snapshot 703e corresponding to the section between key frames 702e and 702f. Similarly, snapshots 704b capture memory addresses/values encountered during corresponding sections of execution of entity 701b, and snapshots 704c capture memory addresses/values encountered during corresponding sections of execution of entity 701c.

While key frames are a natural location in a trace to record memory snapshots, memory snapshots can be recorded at any time, such as the depicted snapshots 703h and 703j that correspond to events 704a and 704b (e.g., orderable events) on entities 701b and 701c that lack key frames. Similarly, memory snapshots need not occur with each key frame. For example, key frames 702i and 702k on entity 701b each lack a corresponding memory snapshot. Additionally, key frames 702a, 702g, and 702l, which each corresponds to the start of execution each entity, also lacks a snapshot (e.g., because that snapshot would be empty, as no instructions have yet executed).

As mentioned above, some embodiments store memory snapshots comprising the memory addresses that were encountered when replaying one or more corresponding sections of a trace, along with the most recent value seen at each address. Thus, for example, suppose that the same particular memory location is written to at each of events 705a-705c. Here, memory snapshot 703b may indicate that this particular memory location was written to during the section on entity 701a between key frame 702b and 702c, and that the most recent value was the value that was written at event 705b. Likewise, memory snapshot 703l may indicate that the particular memory location also written to during the section on entity 701c between key frame 702n and 702o, and that the most recent value was the value that was written at event 705c. Later, if a request for program state at key frame 702c or at key frame 702o were requested at the debugger 106, then the debugger 106 could simply report the values from snapshots 703b or 703l. If, on the other hand, a request for all writes to the particular memory location were to be made (e.g., as part of watch on a variable or return value), the debugger 106 could use memory snapshots 703b and 703l to identify that the particular memory location was accessed during the section between key frame 702b and 702c and the section between key frames 702n and 702o. The debugger could then replay those sections, starting with key frames 702b and 702n, in order to identify the value that was written by each event 705.

In some embodiments, a given memory snapshot captures aggregate data for only the section of the trace between itself and a prior memory snapshot. For example, in these embodiments, memory snapshot 703b may store data relating only to the section between key frames 702b and 702c. In other embodiments, however, the memory snapshots provide access to memory values relevant to other trace sections. For example, a memory snapshot may store at least a portion of the data from one or more prior memory snapshots, or may refer back to one or more prior snapshots.

For example, in FIG. 7, memory snapshots 703a-703l are represented using a combination of heavy and light line weights. In this notation, memory snapshots denoted with a heavy line weight represent "full" memory snapshots, while memory snapshots denoted with a light line weight represent "differential" memory snapshots. Thus, for example, memory snapshots timeline 704a includes two full memory snapshots (i.e., memory snapshots 703a and 703d), and three differential memory snapshots (i.e., memory snapshots 703b, 703c, and 703e), memory snapshots timeline 704b includes two full memory snapshots (i.e., memory snapshots 703f and 703g), and one differential memory snapshot (i.e., memory snapshot 703h), etc.

In general, a full memory snapshot stores a record of all memory addresses/values known at the time of the snapshot, whereas a differential memory snapshot stores a record of any memory addresses/values that have changed or been discovered since the prior memory snapshot (whether that be a full memory snapshot or a differential memory snapshot). A differential memory snapshot can then store pointer(s) back to the prior snapshot(s) to that the replay component 106b can later traverse the snapshots to obtain memory values.

In some embodiments, memory snapshots are stored on the basis of different ranges of memory addresses. For example, a memory snapshot may comprise a different data structure for each range of memory addresses, or may comprise a data structure with a different node for each range of memory addresses. In one embodiment, for example, each range of addresses corresponds to a fixed amount of memory, such as one kilobyte. In other embodiments, each range of addresses may correspond to a different amount of memory. Whether to use fixed or variable memory ranges may depend on factors such as memory access locality (e.g., to make regions correspond to sections of memory that are frequently accessed), or a desired memory lookup complexity during replay (e.g., fixed memory ranges may enable a single-step lookup since the appropriate memory range structure to use to find a particular memory location can be computed in a straightforward manner, while variable memory ranges may involve an additional step to determine which memory range structure stores a particular memory location).

When storing memory snapshots based on ranges of memory addresses, each range of addresses may individually be the subject of full and differential snapshots. Thus, rather than storing full and differential memory snapshots of the entire memory space available to each entity, embodiments may divide that memory space into different ranges (whether those ranges be fixed in size or variable in size) and perform full and differential snapshots on each of those memory ranges, as needed. Thus, while for simplicity of illustration, each memory snapshot in FIG. 7 is depicted as being either a full snapshot or a differential snapshot, it may be that snapshot at a particular point in the trace may actually comprise both full snapshots for some memory ranges, and differential snapshots for other memory ranges. In one example, a differential snapshot stores memory values that have changed in a given memory range since the last snapshot, along with pointers back to prior snapshots for values that have not changed.

Additionally, the memory snapshots at each memory location need not store snapshot data relating to all memory ranges. For example, while memory snapshot 703a may include full snapshots for memory ranges A and B, differential snapshot 703b may store snapshot data relating to memory range A but not memory range B (e.g., since the trace section between key frames 702b and 702c accessed memory addresses in range A but not in range B), and differential snapshot 703c may store differential snapshot data relating to memory range B but not memory range A (e.g., since the trace section between key frames 702c and 702d accessed memory addresses in range B but not in range A).

When determining whether to store a full or differential snapshot for a given address range, the indexing component 200 (e.g., the identification 204 and/or memory snapshot 206 component) may weigh replay responsiveness and/or computational cost for each option, versus the amount of space that each option would occupy on the indexed trace file 109b. For example, depending on the number memory locations that have changed for a memory range since the last snapshot, the indexing component 200 may determine that it will actually take less storage to store a full snapshot for that memory page, versus storing a series of pointers back to prior snapshots. In another example, while it may take more trace file space for a given memory range to store a full snapshot versus a differential snapshot, if there is already an extensive chain of differential snapshots the indexing component 200 may determine that it is more desirable for replay to use the space on the trace file versus requiring a long traversal of snapshots at replay time. In another example, the indexing component 200 may determine whether traversal of a chain of differential snapshots would cause a disk read at replay (e.g., since the chain of differential snapshots would occupy more than the size of one disk page). In this case, the indexing component 200 may determine that it is more desirable for replay to store a full snapshot for the range than to store another differential snapshot.

Figure 8:
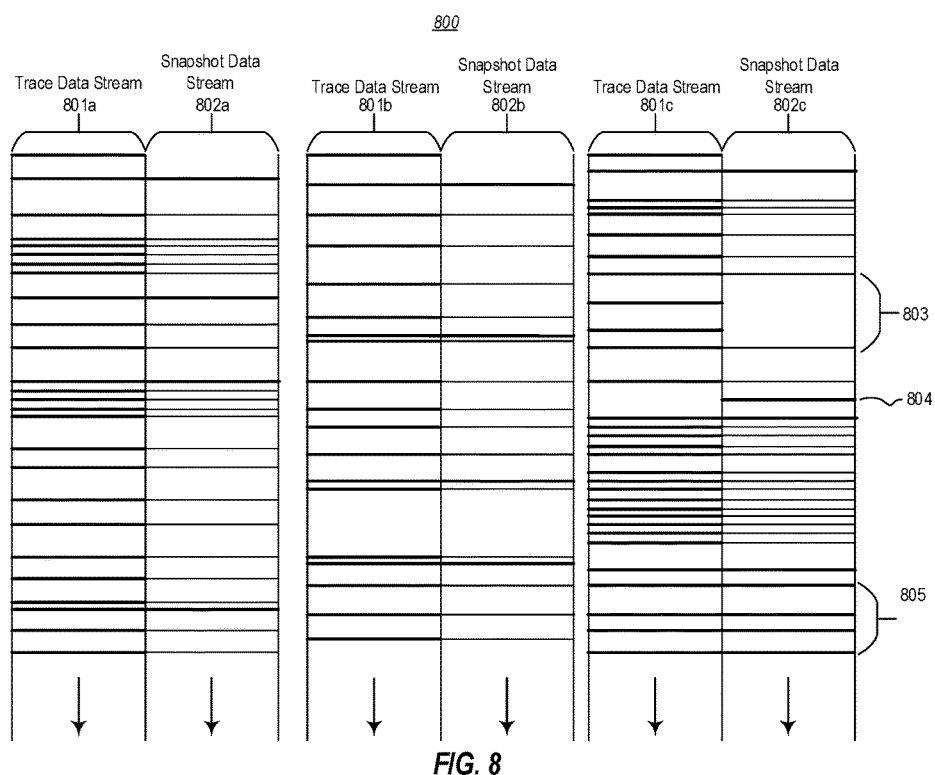
FIG. 8 illustrates an example of an indexed trace file, generated based on the trace file of FIG. 4, and which includes memory snapshots based on replay goals.

In view of the foregoing, FIG. 8 illustrates an example indexed trace file 800 that includes memory snapshots. In FIG. 8, trace data streams 801a-801c correspond, respectively, to trace data streams 501a-501c. Each trace data stream 801 includes the key frames depicted in FIG. 5. Trace file 800, however, also includes snapshot data streams 802a-802c, each of which corresponds to one of the trace data streams, as depicted. While the snapshot data streams 802 are depicted for clarity as being separate data streams, it will be appreciated that they could actually be embodied in a single snapshot data stream.

In FIG. 8, each snapshot data stream 802 includes a plurality of memory snapshots (depicted as horizontal lines), which generally correspond to the key frames in their corresponding trace data stream 801. However, as discussed above, memory snapshots need not occur at each key frame, and can occur at points other than key frames. Thus, for example, each snapshot data stream 802 lacks a memory snapshot corresponding to the key frame beginning each trace data stream 801. In addition, in region 803, snapshot data stream 802c lacks memory snapshots corresponding to key frames occurring in trace data stream 801c during the same time period. Further, snapshot data stream 802c also includes a memory snapshot 804 that does not correspond to any key frame in trace data stream 801c.

Similar to FIG. 7, the snapshot data streams 802 may include a combination of full and differential memory snapshots (also depicted with heavy versus light line weight). As seen by snapshots 805, differential snapshots need not follow full snapshots. In fact, the snapshot data streams 802 could, in some embodiments, include only full memory snapshots.

Figure 9:
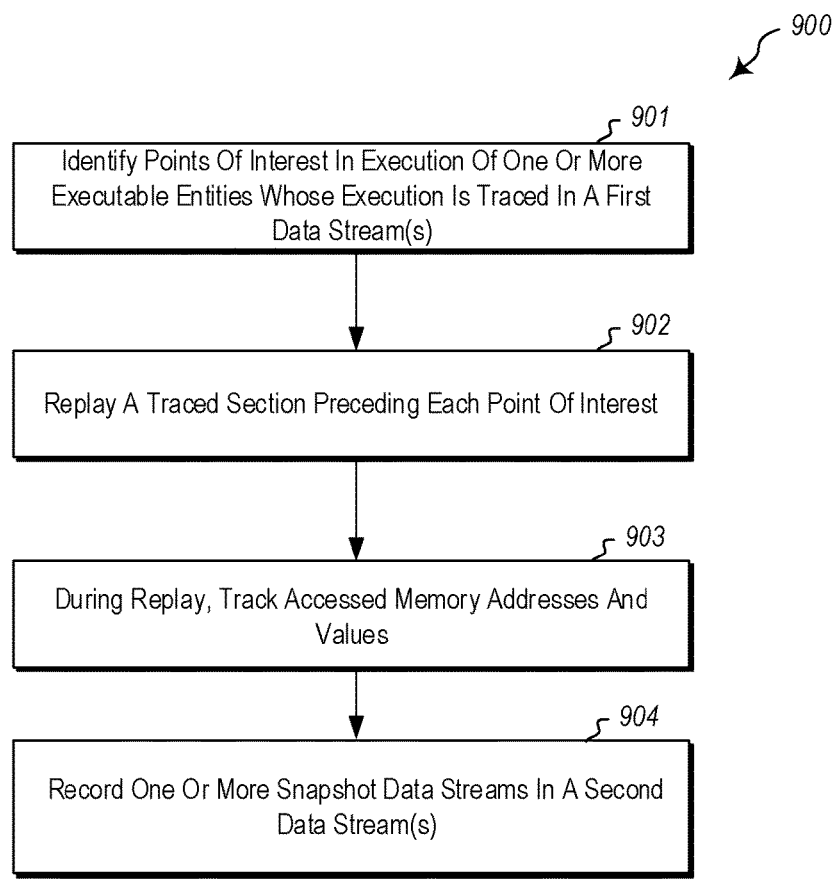
FIG. 9 illustrates a flowchart of an example method for inserting memory snapshots during indexing of a trace for responsive trace replay.

In view of the foregoing, FIG. 9 illustrates an example of a method 900 for inserting memory snapshots during indexing of a trace for responsive trace replay. Method 900 is described in view of FIGS. 1-8. While method 900 is presented as a series of acts, it will be appreciated that the particular number and ordering of the acts shown is only example of inserting memory snapshots during indexing of a trace consistent to the embodiments herein.

As depicted, method 900 includes an act 901 of identifying points of interest in execution of one or more executable entities whose execution is traced in first trace data stream(s). In some embodiments, act 901 comprises identifying a plurality of points of interest in execution of one or more executable entities whose execution is traced in one or more first data streams. For example, referring to FIG. 2, the identification component 204 can identify points of interest in an original trace file 109a that is being replayed by the replay component 203, which points are suitable for recording memory snapshots to provide for a responsive replay. For example, as explained in connection with FIGS. 7 and 8, points of interest may correspond to key frames, sequencing numbers, or other points in execution that a user may be interested in during debugging. In some embodiments, the points of interest may correspond, at least in part, to those points of interest that have been identified for the insertion of key frames (i.e., as described generally in connection with FIGS. 3-6). Referring to FIG. 8, for example, points of interest for recording memory snapshots may correspond, at least in part, to key frames in trace data streams 801a-801c. These key frames may, in turn, correspond to potentially interesting events, such as function boundaries, module boundaries, exceptions, kernel calls, runtime environment activity, cache flushes, or input/output activity.

In some embodiments, the plurality of points of interest are identified based, at least in part, on one or more responsiveness goals and/or one or more storage utilization goals. For example the, identification component 204 may determine a frequency with which to record memory snapshots based on balancing target replay responsiveness with storage utilization goals (i.e., trace file size). Thus, for example, if responsiveness is preferred over efficient storage utilization, the points of interest may include a relatively large number of key frames/sequencing numbers. If, on the other hand, efficient storage utilization is preferred over responsiveness, the points of interest may include a relatively few number of key frames/sequencing numbers. In some embodiments, the responsiveness and/or storage utilization goals are based, at least in part on a target replay computing environment.

Method 900 also includes an act 902 of replaying a traced section preceding each point of interest. In some embodiments, act 902 comprises, based on the one or more first data streams, replaying a traced section of execution of the one or more executable entities preceding each point of interest. For example, the replay component 203 can replay one or more sections of execution leading up each point identified for recording a memory snapshot. In some embodiments, this replay corresponds to a replay that is performed for identifying locations for inserting key frames (for example, replay of an original trace file 109*a*). In other embodiments, this replay may be separate from that replay, such as one that occurs after key frames have already been inserted into an indexed trace file 109*b*. In this situation, replay of each traced section may comprise a replay of the indexed trace file 109*b*, including replaying from a key frame preceding the memory snapshot recording location.

Method 900 also includes an act 903 of, during replay, tracking accessed memory addresses and values. In some embodiments, act 903 comprises, during replay of each traced section of execution, tracking which memory addresses are accessed by the one or more executable entities during replay of the section, and at least a most recent value encountered at each memory address during replay of the section. For example, the memory snapshot component 206 can track which memory addresses are accessed (e.g., read from or written to) during replay of each trace section, along with one or more memory values seen during the access.

Method 900 also includes an act 904 of recording one or more snapshot data streams in second trace data stream(s). In some embodiments, act 904 comprises recording one or more second data streams, including recording a plurality of memory snapshots in connection with the plurality of points of interest into the one or more second data streams, each memory snapshot summarizing memory addresses and values encountered in at least one section of execution preceding each point of interest. For example, the memory snapshot component 206 can insert one or more additional data streams into the indexed trace file 109*b* written by the output component 202. These data streams can record one or more memory snapshots at each of these points of interest summarizing at least memory addresses/values encountered during replay of the preceding section. For example, FIG. 8 illustrates an example of a trace file 800 that includes snapshot data streams 802*a*-802*c* that record memory snapshots corresponding to trace data streams 801*a*-801*c*.

As discussed above, memory snapshots may be full memory snapshots, or may be differential memory snapshots. Additionally, while memory snapshots could be based on an entity's entire memory space, in some embodiments that are more granularly based on smaller memory regions (which could be fixed or variable in size).

Accordingly, some of the embodiments herein index trace files according to performance and resource utilization goals for replay, while potentially considering the specific replay computing environment used, by inserting memory snapshots into trace files. These memory snapshots may be inserted occasionally (e.g., at key frames, sequencing number, etc.) in order to prove a more responsive replay, with the tradeoff of an increased trace file size.

As mentioned briefly above, some embodiments augment indexed trace files 109 with one or more reverse lookup data structures. These data structures are indexed by attributes observed during code execution, and for each attribute (or range of attributes) identify trace section(s) during which the attribute(s) were observed (or may have been observed, in some embodiments) at replay. Reverse lookup data structures are usable during a query or a search in order to quickly return results to the query/search, since they are usable to quickly, efficiently, and (in many cases) drastically narrow the amount of a trace that needs to be replayed in order to respond to a query.

Reverse lookup data structures enable the query component 106*d* and/or the search component 106*e* to respond to an inquiry by replaying only those trace sections that were known to (or were likely to within a defined margin of error, in some embodiments) have performed an operation relevant to responding to the inquiry, rather than requiring a replay of the entire trace while keeping meticulous bookkeeping. This reduces the amount of time and processing resources needed to respond to an inquiry by many orders of magnitude, since it frequently decreases the search space (i.e., amount of trace data to be replayed) by many orders of magnitude. For example, inquiries that may have taken hours to days to perform using prior trace files lacking reverse lookup data structures may be performed in milliseconds using indexed trace files augmented with reverse lookup data structures.

Figure 10:
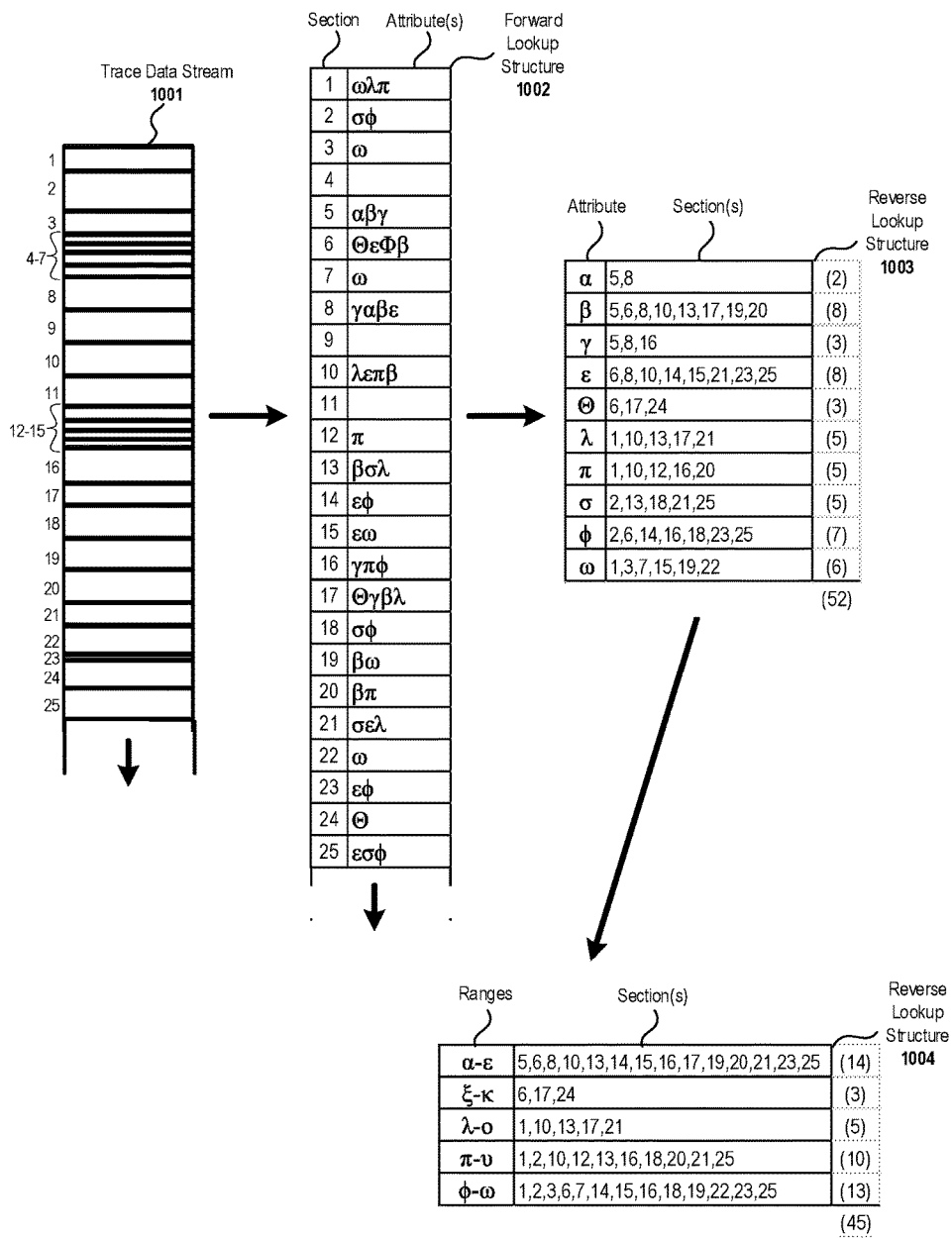
FIG. 10 illustrates an example of generation of a reverse lookup data structure from a trace data stream.

In order to provide an understanding of these concepts, FIG. 10 illustrates an example 1000 of generation of a reverse lookup data structure from a trace data stream. In particular, FIG. 10 depicts a trace data stream 1001 (which corresponds generally to trace data stream 801*a* of FIG. 8, but which could be any trace data stream indexed into independently replay-able sections—such as key frames—consistent with the disclosure herein). In FIG. 10, each section of trace data stream 1001 is associated with an identifier (an integer between 1 and 25 in this example, though real-world embodiments may use much more complicated identification schemes, such as a hash, a Globally Unique IDentifier ("GUID"), etc.).

In order to generate a reverse lookup data structure, the reverse lookup component 207 tracks attributes that occur during replay of the sections of trace data stream 1001, associating them with the trace section during which they were observed. This may be done as part of a replay during which the key frame component 205 inserts new key frames, as part of a replay during which the memory snapshot component 206 generates snapshot data streams (e.g., 802*a*-802*c*), or as part of some other replay.

There are many different types of attributes that the key frame component 205 could track, and they may be selected from any type of data that can be observed during execution of code instructions as part of replay. However, some examples that may be particularly useful for processing later inquiries may be selected from among memory addresses accessed during replay of the trace sections, memory values encountered during replay of the trace sections (e.g., values read from or written to memory), functions called during replay of the trace sections, return values and/or input parameters encountered when executing functions, and the like. When tracking memory addresses accessed, this could include one or more of tracking (i) memory addresses read from by the code instructions being replayed (e.g., in a data processor cache), (ii) memory addresses written to by the code instructions being replayed (e.g., in a data processor cache), and/or (iii) the memory addresses corresponding to code instructions being replayed (e.g., in a code processor cache). When tracking functions called, this could include tracking an entry point memory address of each function, a function name, etc.

In FIG. 10, attributes are depicted as being tracked in forward lookup structure 1002. This structure is keyed by trace section (i.e., 1-25) and the value of each key includes any attributes that were observed during replay of that trace section. While forward lookup structure 1002 is depicted (for ease in description) as a table, it will be appreciated that forward lookup structure 1002 could track attributes using a variety of data structure types (e.g., tree structures, hash-based structures, linked lists, etc.). The reverse lookup component 207 may track multiple types of attributes at once. In these cases, depending on the type of data structure being used, the reverse lookup component 207 may potentially maintain separate forward lookup structures for each attribute type.

In forward lookup structure 1002, attributes are symbolically represented by Greek letters, in which different Greek letters correspond to different attribute values. Thus, for example, if forward lookup structure 1002 tracks attributes comprising memory addresses accessed, then each different Greek letter may correspond to a different particular memory addresses. As another example, if forward lookup structure 1002 tracks attributes comprising return values encountered, then each different Greek letter may correspond to a different particular value (e.g., integer value, string value, etc.). Accordingly, in the example, in which forward lookup structure 1002 tracks attributes comprising memory addresses accessed, trace section 1 of trace data stream 1001 is depicted in forward lookup structure 1002 as having accessed three different memory addresses (λ, ω, and π), trace section 2 is depicted as having accessed two different memory addresses (σ and Φ, etc.), etc. Not all sections need have corresponding attributes. For example, trace sections 4, 9, and 11 are depicted as having no attributes associated therewith.

Note that in FIG. 10 some of the same particular memory addresses are accessed by multiple trace sections. For example, memory address α is accessed by each of trace sections 5 and 8, memory address β is accessed by each of trace sections 13, 17, 19, and 20, etc. Accordingly, by identifying which trace sections share an attribute's value in common, the key frame component 205 can develop reverse lookup structure 1003. Opposite forward lookup structure 1002, reverse lookup structure 1003 is keyed by attributed value, and the value of each key includes any trace section (i.e., 1-25) during which that value was observed during replay. While reverse lookup structure 1003 is depicted (for ease in description) as a table, it will be appreciated that reverse lookup structure 1003 could comprise a variety of data structure types (e.g., tree structures, hash-based structures, linked lists, etc.).

FIG. 10 illustrates another reverse lookup structure 1004 that is derived from reverse lookup structure 1003. In reverse lookup structure 1004, the reverse lookup component 207 has decreased the granularity of the index. Doing so can decrease the size of reverse lookup structure 1004 as compared to reverse lookup structure 1003, with the tradeoff of causing some "false positives" when using reverse lookup structure 1004. In particular, FIG. 10 illustrates that, rather then indexing by individual attribute value as in reverse lookup structure 1003, reverse lookup structure 1004 indexes by ranges of attribute values. For example, reverse lookup structure 1004 indexes five ranges (α-ε, ζ-κ, λ-ο, π-υ, and φ-ω) that are based on the ordering of letters in the Greek alphabet, rather than based on ten individual values as in reverse lookup structure 1003. Note that the ranges need not be equal in size. For example, ranges α-ε, ζ-κ, λ-ο, and π-υ each cover five letters (i.e., α, β, γ, δ, and ε; ζ, η, θ, ι, and κ; λ, μ, υ, ξ, and ο; and π, ρ, σ, τ, and υ), while range φ-ω only covers four letters (i.e., φ, χ, ψ, and ω). While, in the depicted example, the size reduction is somewhat modest (52 trace sections specified across ten indexed entries in reverse lookup structure 1003, versus 45 trace sections specified across five indexed entries in reverse lookup structure 1004), depending on the distribution of individual attribute values across trace sections, this could result in a significant reduction in reverse lookup structure size.

As a more concrete example, some embodiments that index attributes comprising memory addresses may decrease granularity by indexing memory address ranges, rather than individual memory addresses. For example, reverse lookup structure 1003 may index individual addressable memory locations (e.g., byte-level), while reverse lookup structure 1004 may index ranges of addressable memory locations, such as 16-byte ranges, 32-byte ranges, 64-byte ranges, kilobyte ranges, megabyte ranges, etc. It will be appreciated that indexing by memory ranges and can lead to significant reductions in reverse lookup structure size, particularly if the program that is being traced exhibits high levels of code locality (i.e., accessing memory addresses near each other in the total memory space). For example, code locality may be exhibited based on accesses to a program's stack, accesses to data structures, etc. Further reductions in size can be achieved by the reverse lookup component 207 recognizing this code locality, and using variable-sized index ranges that align with frequent memory accesses. For example, reverse lookup structure 1004 could index some more frequently accessed memory ranges at a more granular level (e.g., 16-byte, 32-byte, etc.), while it indexes other less frequently accessed ranges at a less granular level (e.g., kilobyte, megabyte, etc.).

As another concrete example, some embodiments that index attributes comprising actual values (e.g., integers, strings, etc.) may decrease granularity by indexing a portion of a binary representation of the value, rather than the entire value. For example, reverse lookup structure 1004 could index based on only the lower "n" (e.g., 8, 16, etc.) bytes of a binary representation of a value.

As an additional or alternative mechanism for decreasing granularity (again, with the tradeoff of creating false positives), some embodiments may specify trace sections as ranges. For example, as represented in reverse lookup structure 1003, value ε was encountered in each of trace sections 6, 8, 10, 14, 15, 21, 23, and 25. Some embodiments could less granularly specify these sections as, for example, 6-15 and 20-25. In another example, as represented in reverse lookup structure 1004, values in the range α-ε may have been encountered in trace sections 5, 6, 8, 10, 13, 14, 17, 19, 20, 21, 23, and 25. Some embodiments could less granularly specify these sections as, for example, 5-25.

Note that each time granularity is decreased, the probability of false positives during use of reverse lookup structures may increase when entries that are merged into a single entry reference different sets of trace sections. For example, an inquiry for the value δ on reverse lookup structure 1004 would signal a possibility that δ was observed in one or more of trace sections 5, 6, 8, 10, 13, 14, 17, 19, 20, 21, 23, and 25, even though it was not actually observed in any of them. Thus, the query component 106d and/or the search component 106e may replay one or more of these sections to reply to the inquiry, even though no data related to the value δ would be found in these trace sections.

Accordingly, when merging entries to decrease the granularity of a reverse lookup structure, the reverse lookup component 207 may account for various factors, and tradeoffs between these factors. For example, the reverse lookup component 207 may balance how much of a reverse lookup structure size decrease would be achieved by a given granularity reduction with an anticipated increased false positive rate that would result from that reduction. The reverse lookup component 207 may also consider other factors such as whether the size of the reverse lookup component 207 would allow it to be contained entirely in memory during an inquiry (or if it would need to be read from disk), how long it generally takes to replay each trace section—and thus the performance penalty for a false positive (i.e., based on the analysis and performance goals identified by the identification component 204 and the resulting insertion of key frames by key frame component 205), etc.

In some embodiments, the reverse lookup component 207 can perform an analysis on any reverse lookup structures that it has generated, and create telemetry metadata comprising statistics about the reverse lookup structure. For example, reverse lookup component 207 can develop statistics about the distribution of different values in the reverse lookup structures (e.g., the frequency of occurrence of common values such as one or zero), a granularity information about the reverse lookup structure, anticipate false positive rate for the reverse lookup structure, a number of entries in the reverse lookup structure, etc.

The reverse lookup component 207 can store any generated reverse lookup structures, along with any generated metadata, in one or more data streams of indexed trace file(s) 109*b*. For example, just as the memory snapshot component 206 created snapshot data streams (e.g., 802*a*-802*c* in FIG. 8), the reverse lookup component 207 can generate one or more additional data steams storing various reverse lookup structures for different trace data streams and/or for different types of tracked attributes.

In some embodiments, indexing may include use of symbols to help translate memory addresses to user-friendly names. For example, symbols may map memory addresses of executable code to the name of a function that corresponds to that executable code. As such, creation of reverse lookup data structures may include creating reverse lookup data structures that include symbol data, or that include symbols in some data stream of the indexed trace file(s) 109(*b*).

Figure 11:
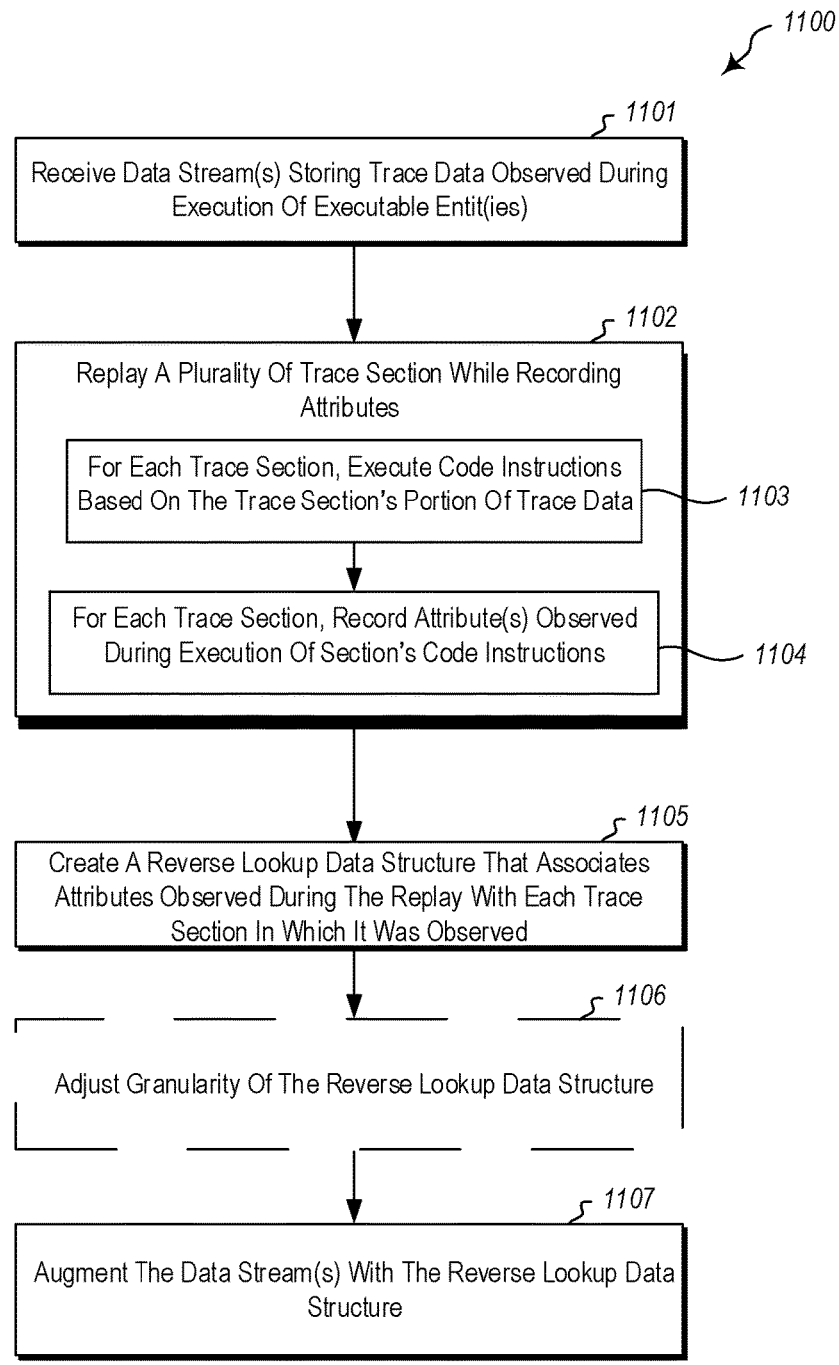
FIG. 11 illustrates a flowchart of an example method for augmenting a trace with at least one reverse lookup data structure during indexing of the trace.

In view of the foregoing, FIG. 11 illustrates an example of a method 1100 for augmenting a trace with at least one reverse lookup data structure during indexing of the trace. Method 800 is described in view of FIGS. 1-10. While method 1100 is presented as a series of acts, it will be appreciated that the particular number and ordering of the acts shown is only example of inserting memory snapshots during indexing of a trace consistent to the embodiments herein.

As depicted, method 1100 includes an act 1101 of receiving data stream(s) storing trace data observed during execution of executable entit(ies). In some embodiments, act 1101 comprises receiving one or more first data streams that store trace data observed during execution of one or more executable entities, the trace data enabling the execution of the one or more executable entities to be replayed. For example, the indexing component may receive a trace file 109 (such as original trace file 109*a* or indexed trace file 109*b*) that records execution of application 108. The indexing component 200 can then utilize the reverse lookup component 206 to process one or more trace data streams in the trace file 109 for augmenting them with reverse lookup structures. In some embodiments, the reverse lookup component 207 may operate directly on the received trace file 109, while in other embodiments it may operate on data streams output by other sub-component(s) of the indexing component 200, such as the key frame component 205, the output component 202, etc.

Method 1100 also includes an act 1102 of replaying a plurality of trace sections while recording attributes. In some embodiments, act 1102 comprises replaying a plurality of trace sections of the one or more first data streams, each trace section comprising a different portion of the trace data, while recording attributes observed during the replay of the plurality of trace sections. For example, as illustrated conceptually in FIG. 10, the reverse lookup component 207 may cause the replay component 203 to replay one or more trace data streams (e.g., 1001). In other embodiments the replay may be performed in connection with operations of other indexing components, such as identification component 204, key frame component 205, and/or memory snapshot component 206.

Act 1102 includes an act 1103 of, for each trace section, executing code instructions based on the trace section's portion of trace data. In some embodiments, act 1103 comprises, for each trace section, executing a plurality of code instructions of the one or more executable entities based on the trace section's portion of the trace data. For example, for each section of trace data stream 1001, the replay component 203 can replay code instructions based on trace data in that section of trace data stream 1001.

Act 1102 also includes an act 1104 of, for each trace section, recording attribute(s) observed during execution of section's code instructions. In some embodiments, act 1104 comprises, for each trace section, recording one or more attributes observed during the execution of the plurality of code instructions based on the trace section's portion of the trace data, along with an identity of the trace section. For example, FIG. 10 depicts forward lookup structure 1002, in which the reverse lookup component 207 has recorded individual attributes (i.e., represented as Greek letters) observed during replay of each section of trace data stream 1001.

Method 1100 also includes an act 1105 of creating a reverse lookup data structure that associates attributes observed during the replay with each trace section in which it was observed. In some embodiments, act 1105 comprises, based at least on recording the attributes observed during the replay of the plurality of trace sections, create at least one reverse lookup data structure, the reverse lookup data structure associating each of at least a subset of the attributes observed during the replay of the plurality of trace sections with the identity of each trace section in which it was observed. For example, FIG. 10 depicts reverse lookup structure 1003, in which the reverse lookup component 207 has created an as an index comprising values observed, and in which associates each value with the trace section(s) during which it was observed. Thus, act 1105 may comprise identifying at least one attribute that was observed during replay of two or more of the plurality of trace sections, and storing that attribute as a key in the reverse lookup data structure, and storing an identity of each of the two or more trace sections from which it was observed as a value associated with the key in the reverse lookup data structure.

Method 1100 may optionally include an act 1106 of adjusting granularity of the reverse lookup data structure. In some embodiments, act 1106 comprises merging a plurality of key/value pairs in the reverse lookup data structure into a single key/value pair. For example, FIG. 10 depicts reverse lookup structure 1004, in which the reverse lookup component 207 has merged entries in the reverse lookup structure 1003 into single entries in the reverse lookup structure 1004.

Method 1100 also includes an act 1107 of augmenting the data stream(s) with the reverse lookup data structure. In some embodiments, act 1107 comprises storing the reverse lookup data structure as part of one or more second data streams. For example, the reverse lookup component 207 may instruct the output component 202 to insert one or more additional data streams comprising reverse lookup data structures (and potentially associated metadata) into indexed trace file(s) 109*b*.

Accordingly, some of the embodiments herein index trace files by augmenting them (e.g., as one or more additional data streams) that include reverse lookup data structures. These data structures enable other components to quickly and efficiently locate trace sections for which particular attributes were observed (or may have been observed) to facilitate quick and efficient inquires (searches and/or queries) over the indexed trace file.

In some embodiments, indexing may also include annotating functions identified in a trace file 109 with information usable for contract verification. For example, the index component 106*c* might use a source code annotation language to annotate functions identified in the trace file 109 with information specifying a contract for the function (i.e., how the function is permitted to be used and behave—such as specifying which parameters are input only, which parameters are output-only, that an array is fully filled in on a successful return, etc.). These annotations may be generated based on user input, static code analysis, etc. Then, violations of these contracts could be identified and surfaced to a user during replay or as part of a search/query. In some embodiments, during replay a user may supply inputs to a function that are known to violate that function's contract (e.g., based on inputs identified from an error report) to facilitate efficient diagnosis and debugging of an error report.

As mentioned earlier, embodiments include performing inquires against the indexed trace file(s) 109*b*. Some embodiments provide inquiries in the form of a query (e.g., using query component 106*d*). In general, a query returns result sets for given query patterns, in which an entire trace of program execution is the available search space against which the query is run. As such, the target of a query may be a trace data stream, a portion of a trace (i.e., a sub-trace), or an aggregation of query targets (e.g., a plurality of sub-traces of one or more trace data streams, a plurality of trace data streams, a plurality of traces, etc.).

In some embodiments, queries operate based on "concepts" (i.e., program code concepts), and "operations" on those concepts. A concept may comprise any type of code-related information that a user may want to construct a query around. Examples of concepts can include functions, modules (e.g., shared libraries), stacks, variables, return values, function parameters, data types, events, processes, and the like. Since queries are conducted over traced program execution, each of these concepts can be inherently associated with time. Operations express actions that can be performed in relation concepts, relationships between concepts, attributes of concepts, etc. Examples of operations can include pairing, joining, lifetime, resource operations (e.g., create, close/destroy, copy, move, rename, allocation, deallocation, reallocation, etc.), and the like. Unlike queries in many other computing contexts, the queries described herein operate within the context of time—i.e., the time during which a program executed. Additionally, the queries described herein operate with knowledge of lifetime—e.g., that a local variable could only exist if the function that defines or declares it is has been or is being executed, etc.

In general, embodiments receive and parse a query expression, build a data structure representing the query expression, and then evaluate the elements of the data structure using trace data to develop a result set. The data structure may be used to identify one or more ways to reduce the amount of work to perform in responding to the query. For example, trace indexes may be used to narrow the search space to only trace sections that are predicted to have likely encountered the concept(s) upon which the query is based.

Figure 12:
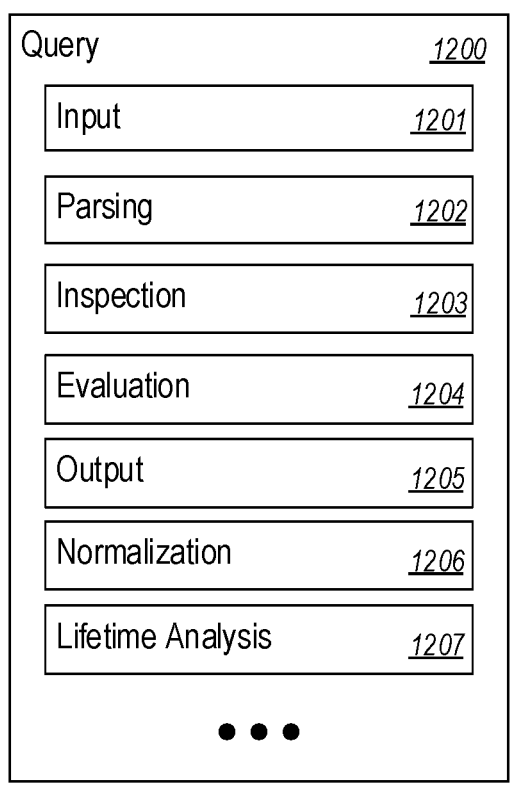
FIG. 12 illustrates an example of a query component.

To facilitate further understanding of these concepts, FIG. 12 illustrates an example 1200 of a query component (e.g., corresponding to query component 106*d* of FIG. 1). As depicted, query component 1200 includes a number of sub-components, such as, for example, an input component 1201, a parsing component 1202, an inspection component 1203, an evaluation component 1204, an output component 1205, a normalization component 1206, and/or a lifetime analysis component 1207. The depicted identity and arrangement of sub-components 1201-1207 are merely one example as an aide in description, and one of ordinary skill in the art will recognize that the particular identity and number of sub-components of the query component 1200 can vary greatly based on implementation (e.g., as indicated by the ellipses).

In general, the input component 1201 receives a query that is to be performed against an indexed trace file 109*b*. For example, a query may be received based on user input at a user interface of debugger 106. The parsing component 1202 parses the query, and builds a structural representation of the query. For example, the parsing component 1202 may build a structural representation that includes a plurality of related data elements, in which each data element represents a concept and/or operation in the query that needs to be evaluated against the indexed trace file 109*b* in order to develop a result set in response to the query. In some embodiments (and as illustrated in the examples hereafter in connection with FIGS. 13A-13C) the structural representation comprises a hierarchical tree data structure comprising a plurality of nodes, though other types of structures may be used.

The inspection component 1203 uses the structural representation of the query to identify an ordering in which to evaluate the structural representation's data elements at the evaluation component 1204. In some embodiments, the inspection component 1203 may order the data elements based on semantics of the structural representation itself (e.g., an associativity among the data elements). However, this may result in inefficient orderings in which substantial portions of a trace (often the entire trace) is replayed. In other embodiments, however, the identification component 1203 leverages indexing information (e.g., reverse lookup data structures) in the indexed trace file(s) 109*b* to intelligently locate data elements for which indexing information is available and evaluate those data elements first. As will become clear in the examples below, this can significantly reduce/narrow the search space, and therefore drastically decrease the amount of processing resources and time it takes to evaluate the query.

The evaluation component 1204 does the work of evaluating the data elements of the structural representation of the query, based on the ordering identified by the inspection component 1203. In general, the evaluation component 1204 leverages the replay component 106*b* to reply sections of trace data that yield results, which are then compiled into a result set. In performing evaluations, the evaluation component 1204 may leverage indexing data (e.g., reverse lookup data structures) in order to narrow the number of trace sections that are replayed. In addition, the evaluation component 1204 may distribute the work of evaluation to other computer systems (e.g., by distributing data elements and/or trace sections to other computer systems for processing). If the evaluation component 1204 distributes the work of evaluation, it may also merge results obtained from those other computer systems.

The output component 1205 conveys result sets for consumption. This may include passing a result set to another component for further processing. For example, the debugger 106 may include one or more components that filter or otherwise prepare results sets for presentation to a user. In another example, a result set may be conveyed to the search component 106*e* for use in formulating search results. Conveying a result set may also include conveying a result set for display at a user interface, such as a user interface at the debugger 106. In some embodiments, the output component 1205 may be capable of conveying partial result sets (i.e., before the evaluation component 1204 has completed the work of evaluating the data elements of the structural representation), which can facilitate users performing iterative queries based on partial results.

The normalization component 1206 converts events identified in a trace file 109 (i.e., events relating to memory resources, file handle resources, etc.) to a corresponding event selected from a standard set of events. This can simplify queries by enabling queries to use standard events as query conditions, rather than particular APIs used by the application 108 being traced. Thus, the same query can be used as new APIs are developed, or existing APIs undergo revisions, and the query is capable of returning results that are based on code using the new/revised APIs.

The lifetime analysis component 1207 analyzes identified events to determine a lifetime of a resource (e.g., memory resource, file handle resource, etc.) associated with the event. For example, the lifetime analysis component 1207 may utilize the replay component 106*b* to replay one or more portions of a trace file 109 to observe program execution behavior in connection with the event.

As will be discussed later, the normalization component 1206 and the lifetime analysis component 1207 may implement one or more functions that are usable within queries that are based on resource lifetime. In some embodiments, these components 1206, 1207 are user-extensible, allowing them to support new programming languages, APIs, etc. The normalization component 1206 and the lifetime analysis component 1207 are discussed in more detail in connection with FIGS. 15A-16.

Figure 13A:
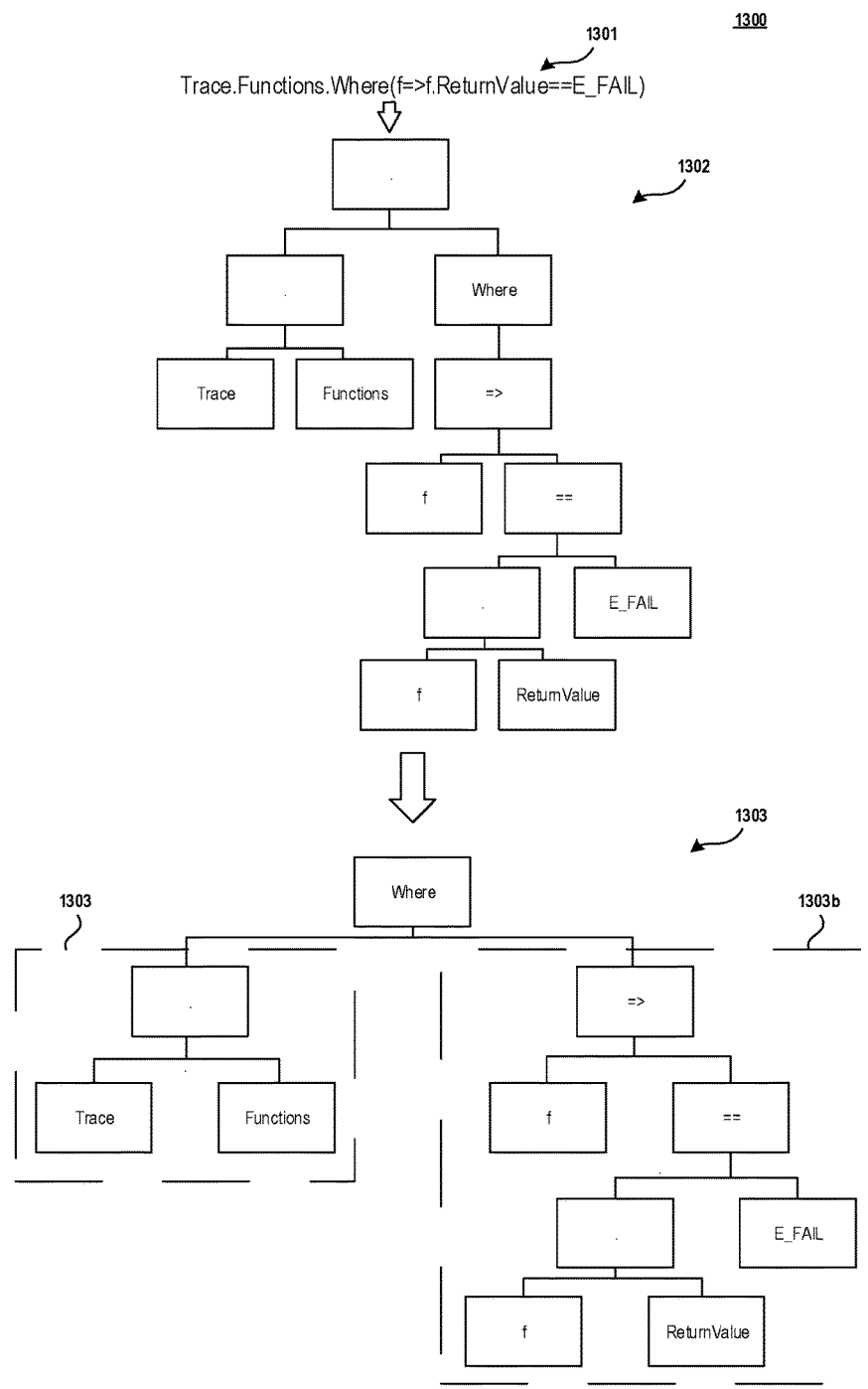
FIGS. 13A-13C illustrate examples of conversion of query expressions to corresponding data structure representations, and evaluation of those data structure representations.
Figure 13B:
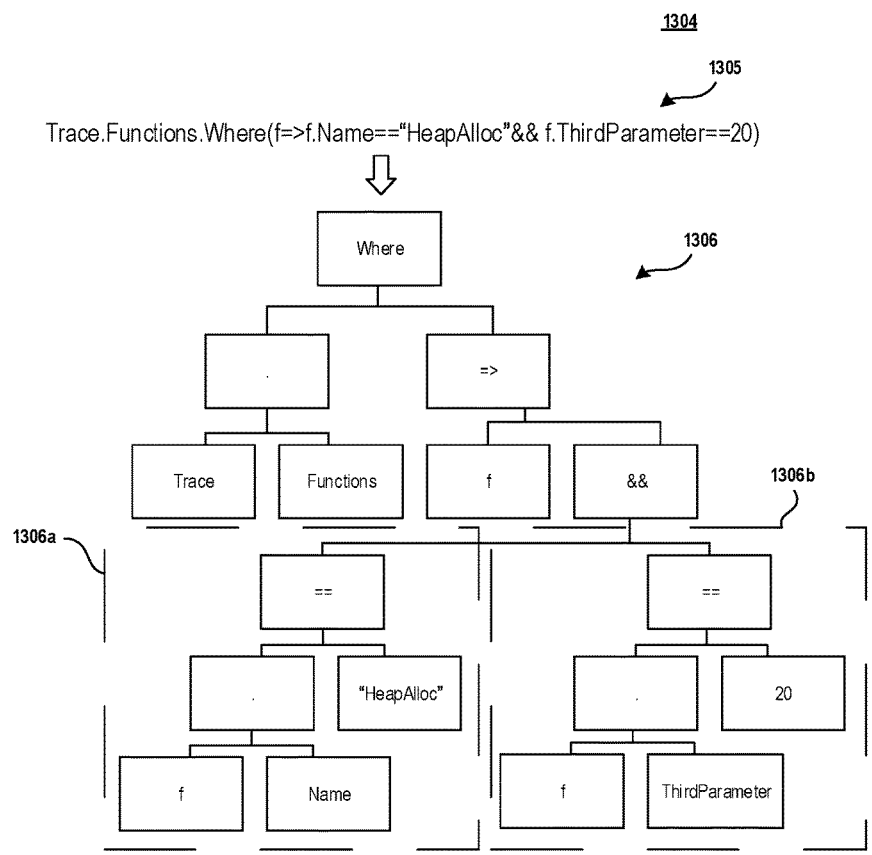
Figure 13C:
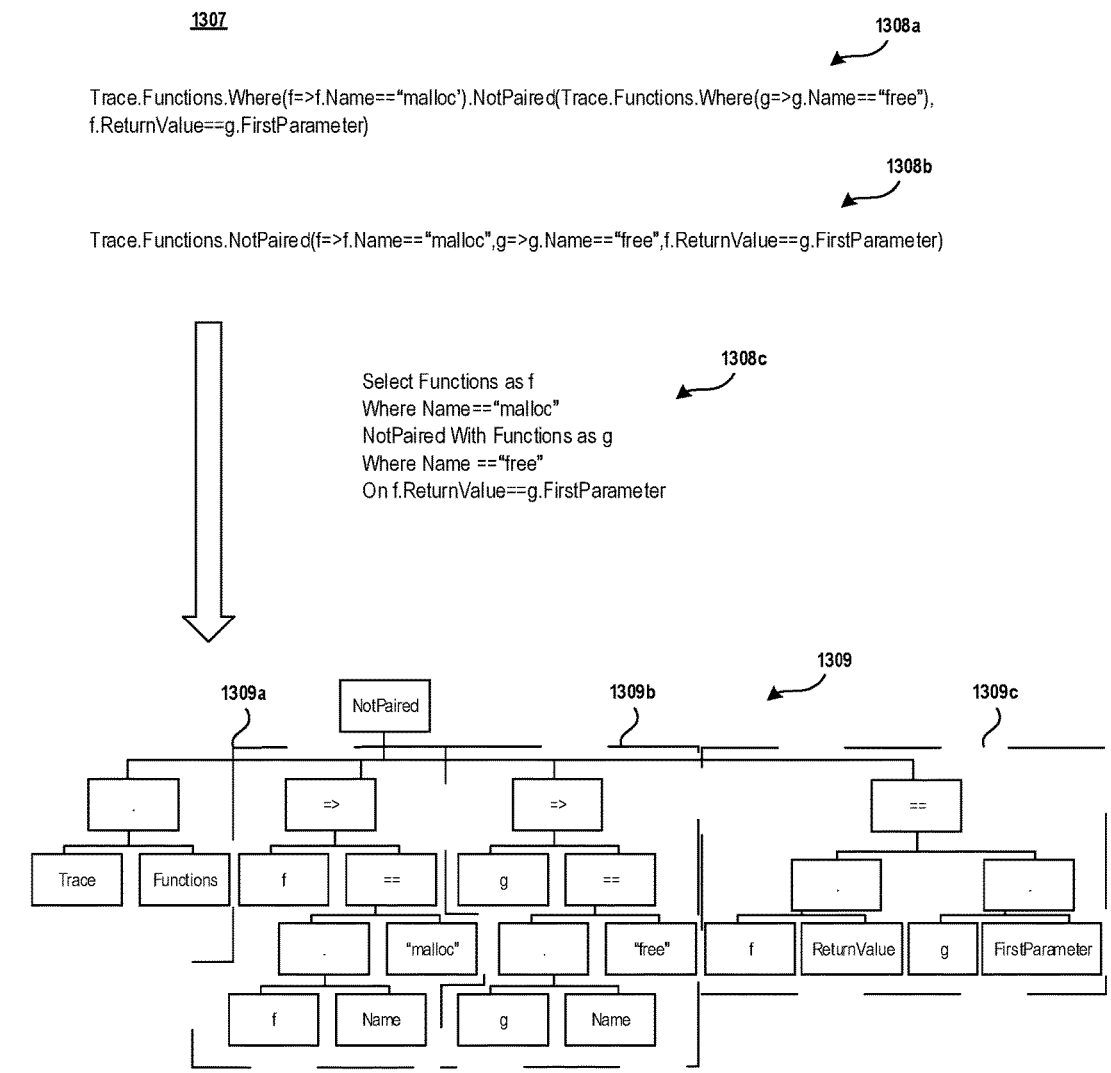

FIGS. 13A-13C illustrate some concrete examples 1300, 1304, and 1307 of conversion of queries to corresponding data structure representations, and evaluation of those data structure representations. Note that the syntax of the queries shown in examples 1300, 1304, and 1307 are just some example syntaxes that could be used, and the embodiments herein are not limited to the syntax shown. Additionally, the structural representations of these queries are also just some examples of data structures that could be used, and the embodiments herein are not limited to these structures.

FIG. 13A provides an example 1300 of a query 1301 that has one condition. In FIG. 13A, sample query 1301 requests all the functions that returned E_FAIL (i.e., an unspecified failure in WINDOWS' API's). In particular, query 1301 specifies a collection of function invocations (i.e., "Trace.Functions") in the trace that is the target of the query, and places a condition (i.e., "Where( . . . )") on that collection. This condition is expressed as a lambda expression, which specifies an input parameter (i.e., a given function invocation "f") on the left side of the lambda operator (=>), and an expression (i.e., "f.ReturnValue==E_FAIL") to be evaluated on the right side of the lambda operator. Thus, the lambda expression takes a function invocation f, accesses its return value, and compares it against the value of E_FAIL. The lambda expression evaluates true if E_FAIL is the return value of the invocation f, and evaluates false otherwise. Note that the lambda expression is evaluated for each function invocation (as opposed to each function) in the trace, since the same function can return different values at different times and in different situations (e.g., different input parameters).

In some embodiments, query 1301 returns a collection of "function invocation objects" that represent the function invocations in the trace that returned E_FAIL. These function invocation objects can then be further operated on, such as to examine each invocation's start time, its run time, its input parameters (e.g., number, types, and/or values), etc. For example, if the result set from query 1301 is assigned to a variable (e.g., "$myVar"), this variable might then be operated on to order the collection by their start times, and to get the first item in that ordered collection (e.g., "$myVar.OrderBy(f=>f.startTime).First( )"). This is also conceptually equivalent to "Trace.Functions.Where (f=>f.ReturnValue==E_FAIL).OrderBy(f=>StartTime).First( )," except that the latter query may give the inspection component 1203 and/or the evaluation component 1204 the opportunity to process the query more efficiently. This is because once a potential answer is found, there is no need to look at later times in the trace. In contrast, the former query may need to return the entire collection of function invocation objects before searching for the first start time.

FIG. 13A depicts an example tree data structure 1302 comprising a first possible structural representation of query 1301 (e.g., as generated by the parsing component 1202), as well as a second possible tree data structure 1303 comprising an equivalent collapsed form of tree data structure 1302. In order to evaluate tree data structure 1303, the inspection component 1203 may take a naïve approach (e.g., ordering the nodes based on a semantic left-to-right order) which would first cause the evaluation component 1204 to evaluate the tree to the left of the "where" node (i.e., node group 1303*a*) in order to create an iterable collection of function objects. Then, for each of those function objects, the identification component 1203 may cause the evaluation component 1204 to evaluate the tree to the right side of the "where" node (i.e., node group 1303*b*). This would involve the evaluation component 1204 calculating the return value for each function in the collection (i.e., by replaying the trace) to compare it with E_FAIL. As such, taking this naïve approach could require replaying substantially the entirety of the subject trace.

Alternatively, the inspection component 1203 may pre-inspect the nodes of tree data structure 1303 to see if any nodes could be evaluated based on data that has been indexed by indexing component 200, and cause the evaluation component 1204 to evaluate those nodes first. Note initially that in this example the type of f inside the Where expression is of the same type as whatever is to the left of the Where operator (i.e., a function invocation). Thus, the inspection component 1203 implicitly knows that f is of the type function invocation, and that query 1301 is accessing the return value of a function. Accordingly, the inspection component 1203 can determine if return values have been indexed.

For example, the indexed trace file(s) 109b may include reverse lookup data structures(s) (i.e., generated by reverse lookup component 207) that index return values—i.e., that map return values to trace section(s) in which the return value was observed. In some embodiments, to decrease index structure size, the reverse lookup data structures(s) may have a decreased granularity that maps ranges of return values (e.g., the low bits of a binary value) to trace section(s) in which a return value in the range was observed. As such, these reverse lookup data structures(s) identify which section(s) of the trace (if any) have (or would likely have), functions that returned E_FAIL (or something that looks like E_FAIL—such as a pointer to an address that matches the value of E_FAIL—depending on whether or not symbols were available during indexing). The evaluation component 1204 can then replay these identified section(s) to find any function invocations that returned E_FAIL. This may include the evaluation component 1204 determining which function certain replayed instructions belong to (e.g., using symbols, export tables from libraries, and the like), and if the type of the return value of the function is of the proper type.

By causing nodes that can rely on indexed data (i.e., node group 1303b) to be evaluated first, the inspection component 1203 has trimmed the search space for evaluating query 1301 from the entire trace, down to only the segments identified by the reverse lookup data structures(s) as having encountered E_FAIL (or something that looks like it). For example, for a trace of mere seconds of execution time, a query on an uncommon return value (which may frequently be the case) may require the evaluation component 1204 to replay just a handful of trace sections (often single digits) when evaluating nodes that rely on indexed data first, versus having to replay the entire trace (often tens of thousands of segments). As such, by evaluating nodes that can rely on indexed data first, the inspection component 1203 can reduce the time necessary to evaluate, process, and respond to a query by many orders of magnitude, as well as reducing the amount of processing resources (e.g., processor time, memory, etc.) by many orders of magnitude as well. In many cases this can mean the difference between taking milliseconds to seconds to process a query and return a result set (i.e., in many cases being perceived as immediate by a user), verses taking hours to days.

FIG. 13B shows a more complicated example 1304 of a sample query 1305 that has two condition. In particular, query 1305 returns all calls to HeapAlloc and that also allocate twenty bytes. Like query 1301, query 1305 specifies a collection of function invocations in the trace being queried against (i.e., "Trace. Functions"), and places a condition (i.e., "Where ( . . . )") on that collection. This condition is also expressed as a lambda expression, which specifies an input parameter (i.e., a given function invocation "f") on the left side of the lambda operator, and an expression to be evaluated on the right side of the lambda operator. This time, however, the expression (f.Name=="HeapAlloc" && f.ThirdParameter==20) is based on two conditions—whether the name of the invoked function is "HeapAlloc," and whether the third parameter of the invocation is 20). Thus, the lambda expression evaluates true if both of these conditions are true for the invocation, and evaluates false otherwise.

FIG. 13B also depicts an example tree data structure 1306 comprising a possible structural representation of query 1305. As before, the inspection component 1203 can identify that the type of f inside the lambda function a function invocation, and that the query is thus accessing the properties of function name and third input parameter of functions.

In order to evaluate tree data structure 1306, the inspection component 1203 could take a naïve approach of iterating over functions and, for each of them, checking their name and third parameter. However, the name of a function is identified by a program's symbols, which translate that name into an address (i.e., the address of the function's first instruction), so the inspection component 1203 can instead start by determining a memory address corresponding to HeapAlloc. Thus, whenever this address is executed it is known that HeapAlloc was called. Accordingly, the inspection component 1203 can determine if an appropriate index structure for identifying HeapAlloc by the address of its first instruction. For example, an index structure may index the memory addresses of the instructions that have been executed, or an index structure may index the addresses of a jump target address for each section.

For example, the indexed trace file(s) 109b may include reverse lookup data structures(s) that index execution memory addresses—i.e., that map memory addresses to trace section(s) that executed code from that address. In some embodiments, to decrease index structure size, the reverse lookup data structures(s) may have decreased granularity that maps ranges of memory addresses (16-byte, 32-byte, 64-byte, kilobyte, megabyte, etc.) to trace section (s) that executed code from an address the range. As such, these reverse lookup data structures(s) identify which section(s) of the trace (if any) have (or would likely have) executed code from memory ranges that overlap with memory addresses of functions. The evaluation component 1204 can therefore determine which trace section(s) may have executed HeapAlloc (i.e., based on its starting memory address), and can replay these identified section(s). During replay of each identified trace section, the evaluation component 1204 can identify each invocation of HeapAlloc (if any) by its starting memory address, and whether the third parameter was 20 during that invocation.

It may be that the reverse lookup component 207 also indexed the values of input parameters. Thus, the indexed trace file(s) 109b may also include reverse lookup data structures(s) that map input parameters to trace section(s) in which the input parameter was observed. Like structures indexing return values, reverse lookup data structures(s) indexing input parameters may have a decreased granularity that maps ranges of input values (e.g., the low bits of a binary value) to trace section(s) in which an input value in the range was observed. In some embodiments, reverse lookup data structures(s) could go even further to index the location of the input parameter (e.g., first input parameter, second input parameter, etc.).

When there exists reverse lookup data structures(s) that index execution memory addresses, as well as reverse lookup data structures(s) that index the values of input parameters, the evaluation component 1204 can build two lists of trace sections from the structures: a first list of trace sections in which the function HeapAlloc was (or may have been) invoked (i.e., based on evaluating node group 1306a), and a second list of trace sections in which an input parameter of 20 was (or may have been) observed (i.e., based on evaluating node group 1306b). If the location of the input parameter was also indexed, the second list may more specifically identify trace sections in which the third input parameter was (or may have been) 20. The evaluation component 1204 can then intersect these two lists to develop a third list of trace sections in which HeapAlloc was (or may have been) invoked where an input parameter (or the third input parameter) was (or may have been) 20 at the time of invocation. In many cases this third list will contain a (potentially significantly) fewer number trace section(s) than those identified in the first and second lists. The evaluation component 1204 can then replay only the trace section(s) in the third list, and find each invocation of HeapAlloc in which the third parameter was 20 during that invocation.

As yet another example 1307, FIG. 13C shows three different conceptually equivalent sample queries (1308a, 1308b, and 1308c), that each returns all calls to malloc that have no matching call to free. As will be recognized by those of skill in the art, these are truly powerful queries that can help developers to quickly find the locations of potential "memory leaks" in code. FIG. 13C also depicts an example tree data structure 1309 comprising a possible structural representation of query 1308b. Query 1308b specifies a collection of function invocations (i.e., "Trace. Functions") placing a pairing condition (i.e., "NotPaired( . . . )") that performs a pairing between two collections of function invocation objects, in time order, to return the un-paired objects (though alternate operations like "Paired( . . . )" could return paired objects instead). In particular, the NotPaired condition takes three expressions: 'f=>f.Name=="malloc",' 'g=>g.Name=="free",' and 'f.ReturnValue==g.FirstParameter.'

To process query 1308b, the inspection component 1203 may initially cause the first and second expressions (i.e., node groups 1309a and 1309b) to be evaluated by the evaluation component 1204. Similar to the evaluation of query 1305 of FIG. 13B, this evaluation may utilize reverse lookup data structures(s) that index execution memory addresses to search for function invocations of malloc and free, in order to develop a collection of malloc function invocation objects and a collection of free invocation objects. Then, the inspection component 1203 can cause the evaluation component 1204 to evaluate the third expression (i.e., node group 1309c). This pairs each malloc object with the earliest free object that happens after the malloc that meets the specified condition (i.e., that the return value of the malloc object is the input parameter of the free object). This results in a collection of malloc objects with no matching free objects—which would correspond to potential memory leaks. It will be recognized by those skilled in the art that, in order to determine if any memory leaks actually exist, the lifetime of the malloc invocation objects in this collection could be analyzed to identify any that are no longer active.

Note that the evaluation of the third expression may utilize reverse lookup data structures(s) that index return values (e.g., similar to query 1301 of FIG. 1 and reverse lookup data structures(s) that index input parameters (e.g., similar to query 1305 of FIG. 13B). As such, with each evaluation, the evaluation component 1204 may utilize reverse lookup data structures(s) to significantly reduce the number of trace sections that need to be replayed in order to evaluate and respond to the query.

In some embodiments, when determining an order in which to evaluate the elements of the data structure, the inspection component 1203 may assign a value to one or more of these elements/nodes. The value represents an estimated cost of evaluating that element/node with the evaluation component 1204. This cost may account for factors such as (i) whether or not the element/node can be evaluated with index data (e.g., one or more reverse lookup data structures); (ii) if reverse lookup data structure(s) can be used, an estimated amount of trace search space reduction that can be achieved through its/their use (e.g., based on the value being evaluated, and based on telemetry or statistical metadata associated with the data structure(s) such as metadata representing a distribution of values in the data structure(s)); (iii) an estimated number of trace sections that will need to be replayed in order to evaluate the element/node; (iv) whether and/or how distributable evaluation of the element/node can be; etc. In some embodiments may assign cost based on how much search space is estimated to be reduced vs. the estimated amount processing will takes to do the reduction.

In some embodiments, the query language/syntax may support aliasing in order to simplify queries. In particular, a single alias may be used to represent a plurality of code concepts, such as functions, libraries, etc. For example, in many programming contexts there may exist many libraries/functions that allocate memory. Thus, rather than conducting multiple queries using each function/library that allocates memory, these libraries/functions can be referenced with a single alias. Then, a single query that uses the alias will operate on each of the aliased functions/libraries.

To illustrate, suppose that an alias (e.g., "Alloc") is defined to reference the functions HeapAlloc, new, and malloc, and that another alias (e.g., "Release") is defined to reference the functions HeapFree, delete, and free. Then, a single query for all the Alloc's that don't have a matching Release will match each of these functions, instead of needing to use three different queries (i.e., one for HeapAlloc/HeapFree, one for new/delete, and one of malloc/free). Note that matching different functions (e.g., malloc's to free's) may require matching a combination of the return values and the parameters to each of the calls. As such, aliasing may include mapping the parameters and return values between the original function and the alias (as well as potentially any constant). For example:

HeapAlloc(heap, flags, size):=return value=>maps to
=>Alloc(heap, size, "HeapFamily"):=return value
malloc(size):=return value=>maps to =>Alloc("C runtime", size, "C family"):=return value
HeapFree(heap, flags, address)=>maps to =>Release(heap, address, "HeapFamily")
free(address)=>maps to =>Release("C runtime", address, "C family")

Figure 14:
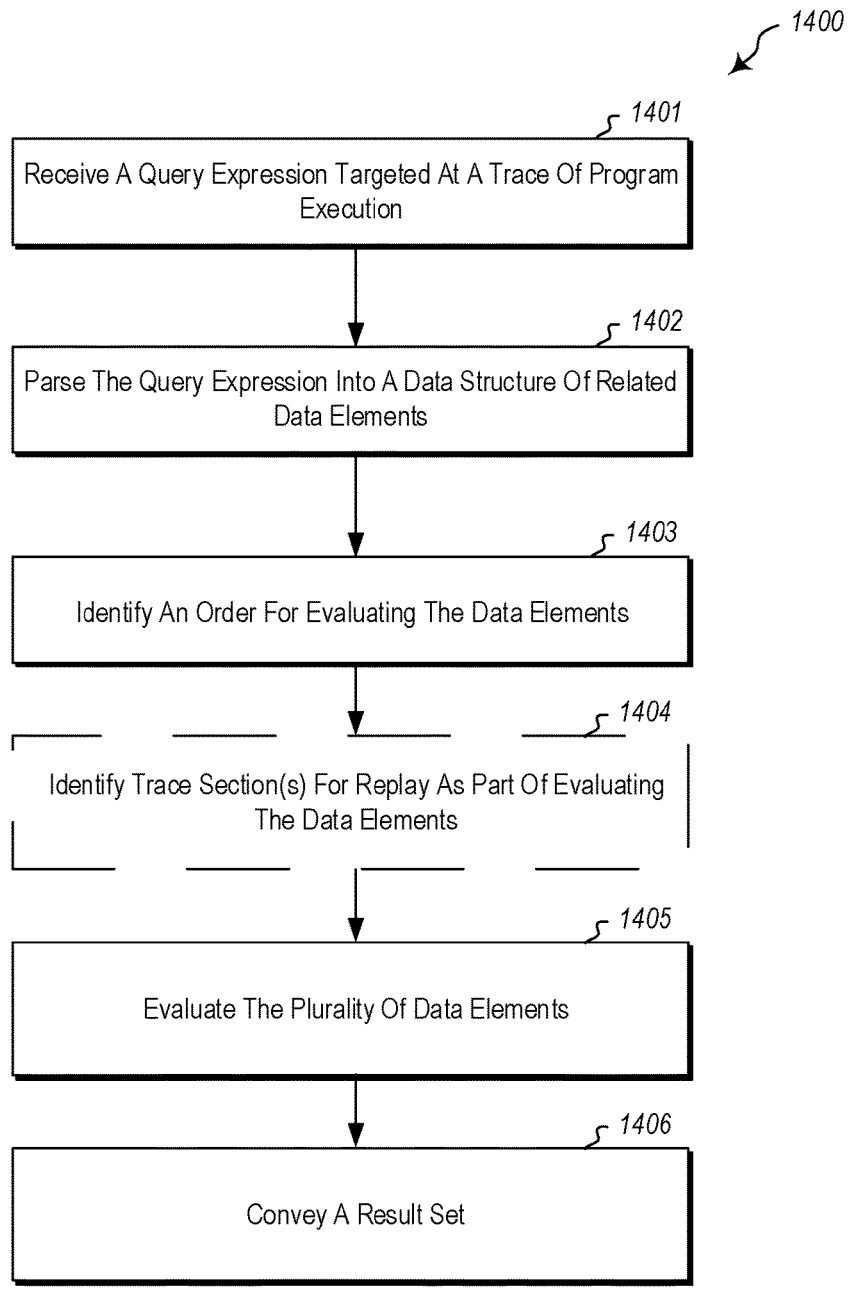
FIG. 14 illustrates a flowchart of an example method for performing a query over a trace of program execution.

In view of the foregoing, FIG. 14 illustrates an example of a method 1400 for performing a query over a trace of program execution. Method 1400 is described in view of FIGS. 1-13C. While method 1400 is presented as a series of acts, it will be appreciated that the particular number and ordering of the acts shown is only example of performing a query over a trace of program execution consistent to the embodiments herein.

As depicted, method 1400 includes an act 1401 of receiving a query expression targeted at a trace of program execution. In some embodiments, act 1401 comprises receiving a query expression including one or more concepts and one or more operations which operate on the one or more concepts, the query expression being targeted at least a portion of a trace of program execution. For example, the input component 1201 can receive a query (e.g., query 1301, 1305, or 1308a-c of FIGS. 13A-13C) targeted against a trace file 109 (e.g., original trace file 109a or indexed trace file 109b). The query can include operations (e.g., pairing, joining, etc.) on programming concepts (e.g., functions, modules, stacks, variables, return values, function parameters, data types, events, processes, etc.).

Method 1400 also includes an act 1402 of parsing the query expression into a data structure of related data elements. In some embodiments, act 1402 comprises building a data structure representing the query expression, the data structure having a plurality of data elements representing the one or more operations and the one or more concepts. For example, the parsing component 1202 can parse the query expression to build a data structure from the query expression, such as data structures 1302, 1303, 1306, or 1309 of FIGS. 13A-13C that comprise tree structures having a plurality of related nodes.

Method 1400 also includes an act 1403 of identifying an order for evaluating the data elements. In some embodiments, act 1403 comprises, based on the data structure, identifying an order for evaluating the plurality of data elements. For example, the inspection component 1203 can identify an ordering for evaluating the data elements (e.g., nodes) of the data structure.

In some embodiments, that target trace data streams may be indexed with at least one reverse lookup data structure. For example, as discussed in connection with FIGS. 10 and 11, an indexed trace could include reverse lookup data structures indexing return values, input parameters, memory addresses accessed, etc. to the trace sections that may have encountered those values. When these indexed structures are available, identifying the order for evaluating the plurality of data elements may comprise identifying at least one data element/node that can be evaluated based on a reverse lookup data structure, and ordering that data element/node based on the presence of the reverse lookup data structure. For example, the inspection component 1203 could assign a data element/node a weight based on the presence of the reverse lookup data structure, to order it prior to nodes that cannot be evaluated with reverse lookup data structures. As illustrated in connection with the examples of FIGS. 13A-13C, presence of reverse lookup data structures can enable the inspection component 1203 to order evaluation of the elements/nodes in a manner that narrows the search space within the target trace data.

Method 1400 may also include an act 1404 of identifying trace section(s) for replay as part of evaluating the data elements. In some embodiments, act 1404 comprises, based on the data structure, identifying one or more sections of one or more trace data streams of the trace, the one or more sections for replay as part of evaluating the one or more of the plurality of data elements. For example, the inspection component 1203 and/or the evaluation component 1204 can determine, for at least one of the plurality of data elements (e.g., a node), which section(s) of the trace need to be replayed in order to evaluate the data element/node. For example, portions of a trace may need to be replayed to identify functions executed, their return values, their input parameters, etc. in order to evaluate a node. Depending on the ordering identified by the inspection component 1203, and the presence of reverse lookup data structures, the number of trace sections evaluated may be far less than the entire target trace data.

Note that in some circumstances the inspection component 1203 may determine, based on reverse lookup data structures, that there are no trace sections to be replayed in order to evaluate the query. This could happen, for example, if there would be no "hits" on the data being queried for. In these circumstances, the relevant reverse lookup data structure(s) may lack any entries that overlap with the value(s) (e.g., memory addresses, return values, etc.) being looked for as part of the query. As such, act 1404 is displayed in broken lines.

Method 1400 also includes an act 1405 of evaluating the plurality of data elements. In some embodiments, act 1405 comprises causing the plurality of data elements to be evaluated. For example, the evaluation component 1204 can evaluate the plurality of data elements/nodes in the order determined by the inspection component 1203 to develop a result set. This may include using the replay component 160b to replay trace section(s) identified in act 1404 (if any). While this evaluation could be performed locally at computer system 101, in some embodiments the evaluation may also include distributing one or more of the plurality of sections to one or more other computer systems for replay and/or distributing different subsets of plurality of data elements of the data structure to one or more other computer systems for evaluation. In these situations, the evaluation results received from these other computer systems can be merged into the result set by the evaluation component 1204.

Method 1400 also includes an act 1406 of conveying a result set. In some embodiments, act 1406 comprises, based on the evaluation, conveying at least a portion of a result set for consumption. For example, the output component 1205 can output a result set built based on evaluation of the data structure by the evaluation component 1204 to another component (e.g., for filtering or other further processing), or for display at a display device. While act 1406 may include conveying a full result set, in some embodiments act 1406 includes conveying only a partial result set. For example, the output component 1205 may begin conveying results to another component and/or to a display prior to completion of the evaluation of the data structure by the evaluation component 1204. As such, the output component 1205 can facilitate iterative queries, where a software component and/or a user can submit a subsequent query based on partial results from a prior partially evaluated query.

If there were no trace sections identified in act 1404 (e.g., because there would be no "hits" on the data being queried for), in act 1406 the output component 1205 could convey an empty result set, or some other indication that there are no results to the query. Accordingly, in these circumstances, use of reverse lookup data structures to evaluate queries has eliminated the need to replay trace sections entirely, drastically reducing the time it takes to determine that the query evaluates to an empty result set—versus potentially taking hours, days, or more, if the entire trace were to be replayed.

In connection with the foregoing general discussion of queries, embodiments include queries that directly expose the concept of resource/object lifetime—that is, queries that operate directly on resource lifetime, such as queries based on resource creation time, scope, events that affect memory allocations and file handles, etc. While foregoing examples discussed some queries that can be used to indirectly find potential memory leaks (e.g., by finding calls to malloc that have no matching call to free), these embodiments go even further by facilitating queries that directly operate on objects representing events (and attributes of those events) and that include conditions and/or functions that operate on those event objects.

To illustrate this concept, FIGS. 15A and 15B illustrate some examples of queries that operate on object representing events and that return results based on resource lifetime. While the syntax of these examples resembles Structured Query Language (SQL), this is for simplicity in description only, and those of ordinary skill in the art will recognize that a variety of syntax forms could be used.

FIG. 15A illustrates a first example 1500 of a series of queries (i.e., queries 1501-1503) that are usable to find potential memory leaks. Each of these queries includes a data object representing a plurality of events (memory events, in this case) identified in the trace, and also include conditions and/or functions that operate on that object, and that are based on resource lifetime.

Initially, example 1500 includes a first query 1501 that operates on a data object (MemoryEvents) that represents a plurality of memory events identified in a trace file 109 (e.g., based on indexing data created by the index component 106c). For example, these events could correspond to events that occurred during execution of application 108, such as function calls, module loads, exceptions, etc. that affect memory resources. Each memory event in MemoryEvents can be associated with a variety of attributes (e.g., key/value pairs, tuples, etc.), such as an event identifier attribute (e.g., ID), an attribute (e.g., Value) storing a memory address or handle to a corresponding resource, one or more attributes (e.g., Time) storing time stamps (which could correspond, for example, to a time of resource creation, deletion, modification, etc.), an attribute (e.g., Event) storing a type of the event (such as, for example, created, deleted, copied, moved, renamed, etc.), and the like.

As shown, query 1501 includes conditions that operate on events in MemoryEvents, including one that performs a selection based on event type (i.e., Event='deleted'). As will be recognized by one of ordinary skill in the art, query 1501 builds a data object (CandidateIDs) that includes the identifiers (ID) of all events in MemoryEvents that do not have the type attribute "Event='deleted'"—i.e., those events that may have potentially leaked.

Query 1502 operates on the CandidateIDs object that was created by query 1501. Query 1502 introduces another concept that can operate on an event data object: a function (Lifetime( . . . )) that analyzes the lifetime of a resource associated with an event. The Lifetime( . . . ) function may be implemented by the lifetime analysis component 1207 of the query component 1200. In particular, query 1502 passes to Lifetime( . . . ) all events in MemoryEvents that correspond to an event identifier from CandidateIDs (i.e., all events that may have potentially leaked). Lifetime( . . . ) takes these events, and, using the lifetime analysis component 1207, performs an analysis of the event as is occurs in the trace file 109. In doing so, the lifetime analysis component 1207 may initiate a replay of one or more portions of the trace file 109 (e.g., using the replay component 106b), to observe how a resource corresponding to an event is used over time. For example, the lifetime analysis component 1207 may identify where a resource is allocated (e.g., stack or heap), if the resource falls out of scope during execution of the traced entity (e.g., a stack-based resource that falls out of scope may not leak, but a heap-based resource that falls out of scope may have leaked), if the resource is passed to a non-traced entity such as the kernel or some other untraced thread, etc. Based on the outcome this analysis, the lifetime analysis component 1207 may, when appropriate, associate events with event types such as 'orphaned' (i.e., Lifetime( . . . ) definitely knows that the resource was leaked) or 'forgotten' (i.e., Lifetime( . . . ) cannot reliably determine if a resource was leaked because it was passed to a non-traced entity). As depicted, query 1502 places events matching the CandidateIDs into LifetimeResults, including those that Lifetime( . . . ) has associated with events such as 'orphaned' or 'forgotten'.

Query 1503 then operates on LifetimeResults (again, an object containing memory events), and applies a condition that selects any event(s) that have been associated with the event type 'orphaned' (i.e., those known to have leaked). Query 1503 also returns a report of the creation time (i.e., based on the value of Time) of leaked (orphaned) resources, and their last reference (i.e., contained in Value—such as a memory address or handle). Thus, by evaluating queries 1501-1503, the query component 1200 generates a report of events that are known to have caused a leak.

FIG. 15A also includes query 1504, which introduces the concept of normalization. Referring back to FIG. 12, the query component 1200 includes a normalization component 1206 which converts discrete sets of information identified in a trace file 109 (e.g., function calls, module loads, exceptions, etc.) to a corresponding event selected from a standard set of events that have their own set of event-specific parameters (e.g., created, copied, moved, deleted, etc.). The normalization component 1206 enables queries to be expressed using this standard set of events, regardless of the APIs and memory management models of the underlying code that has been traced. Thus, for example, regardless of how memory is managed by the traced code (e.g., reference counting, iUnknown, garbage collection, etc.), the management of resources can be presented using a standard interface.

As shown in query 1504, the normalization component 1206 can present one or more normalization functions (e.g., Normalize ( . . . )) that converts a list of API calls identified in the trace file 109 (e.g., TTD_Calls) into the normalized set of events (e.g., TTD_MemoryApis). Thus, in this example, TTD_Calls represents APIs provided by the code being traced, the operating system upon which the code executes, and/or the software development kit (SDK) that was used; TTD_MemoryApis, on the other hand, defines mappings between these APIs and the normalized set of events. After evaluating query 1504, MemoryEvents contains memory events that occurred in the trace, but are expressed using the normalized set of events from TTD_MemoryApis. It will be appreciated that in example 1500 query 1504 may be evaluated prior to queries 1501-1503, in order to build the MemoryEvents object relied on (directly or indirectly) by queries 1501-1503.

In some embodiments, the normalization component 1206 can be extendable (e.g., by a user) with new mappings between the standard set of events and new APIs. Thus, the normalization component 1206 enables additional resource types to be consumed by importing a new "normalizer" and/or a new list that transforms particular behavior of a resource into the set of standardized events. Similarly, the lifetime analysis component 1207 may also be user-extendable to understand and evaluate the lifetime of new types of resources. In addition, some embodiments cache and/or index the results of executing a normalization function during a query. For example, in connection with executing query 1504, the normalization component 1206 could retain the contents of MemoryEvents in system memory (e.g., as runtime query component data 106d') or in a file stored in the data store 104. Additionally or alternatively, the index component 106c could store the contents of MemoryEvents in an appropriate trace data stream in an indexed trace file 109b.

FIG. 15B illustrates a second example 1505 of another series of queries (1506-1508) that are usable to identify the range of a specified resource's lifetime. Initially, query 1506 calls the Normalize( . . . ) function, which converts kernel events (TTD_KernelHandleApis) into events selected from the standard set of events (TTD_MemoryApis), storing them into KernelEvents. Then, using a specific Value (e.g., memory address/handle), query 1507 returns an identifier of a candidate event (storing that identifier in HandleID). Since addresses/handles can be reused over time, this query introduces a time component—to select an event having the requested Value, but which is closest to the current time (e.g., the "current time" of a specified point in the trace). Here, an object containing kernel events (KernelEvents) is operated on by lifetime-related conditions comprising (i) a desired memory address/handle (i.e., Value=0x1234), (ii) a type of the event (i.e., Event='created'), and (iii) a time of the event (i.e., Time <=curent_time). After getting the identifier (HandleID) from query 1507, query 1508 operates on KernelEvents to compute its lifespan (i.e., min time and max time).

FIGS. 15A and 15B provide only a few examples of queries that operate on resource lifetime, but they are not exhaustive. In some embodiments, the debugger 106 includes predefined queries (such as these) that can be used as examples for creating new queries, and that can be evaluated directly or that can be used as building blocks in one or more query toolchains. Accordingly, the embodiments herein provide a mechanism whereby a user can construct a flexible and extensible array of queries to facilitate lifetime analysis for a variety of scenarios.

As one example, queries in accordance with the disclosure herein may operate as part of a toolchain that provides taint analysis. Such a toolchain would be usable to analyze the code paths that rely on untrusted input, including analyzing the data structures used by that code (and which may store untrusted data). This analysis could include analyzing how far these code paths extend, and/or how long data structures storing untrusted data exist, prior to either (i) the code relying on untrusted input reaching a "dead end" (and/or the data structures being destroyed), or (ii) the untrusted data being verified. For example, queries in accordance with the disclosure herein can be used to identify events associated with code/data structures that rely on untrusted data, and perform lifetime analysis based on those events.

Some embodiments may produce query results formatted in a "relational" manner, such as by presenting relationships between data objects (e.g., one or more tables comprising data objects/resources) and life references to those data objects (e.g., one or more tables comprising life references). This can enable a user to perform additional queries based on the results, in order to iteratively refine the results.

Some embodiments apply data mining techniques to query results. For example, data mining may comprise performing statistical analysis on query results to determine various statistics, such as distributions concerning such things as the size of various memory allocations, the times of memory allocations, where allocations occur (e.g., stack, heap, specific memory address ranges, etc.), which component (e.g., function, module, etc.) performs allocations, etc. In many situations, these statistics could be presented with a time component.

Other embodiments apply machine learning techniques to query results. For example, machine learning could be accomplished though classification algorithms that classify different events into families based on the attributes associated with the events. Examples of such classification algorithms are discussed in connection with FIGS. 18A and 18B. Machine learning can help to filter results, such as by surfacing events that are outliers (e.g., allocations of unusual size, unusually frequent allocations, etc.).

Figure 16:
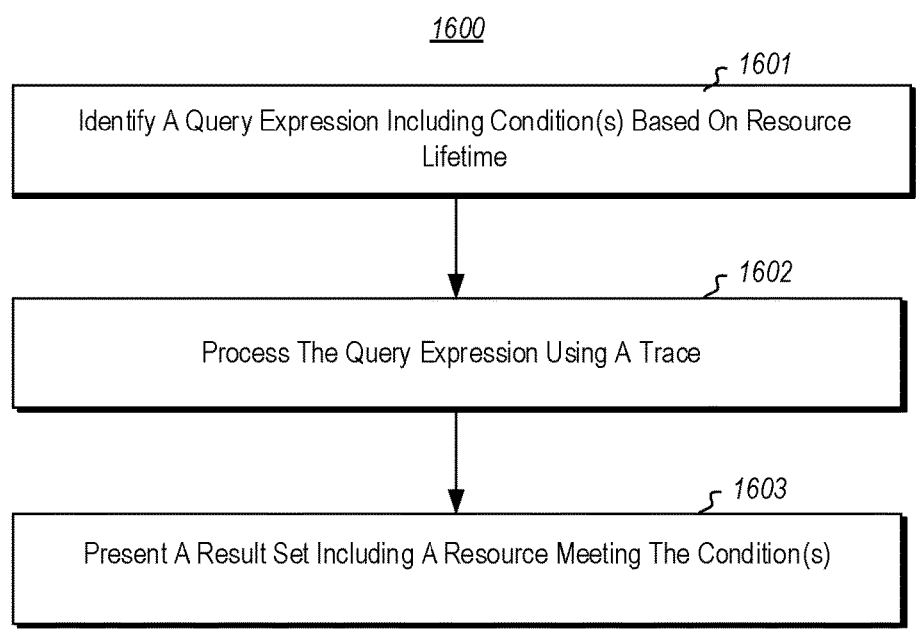
FIG. 16 illustrates a flowchart of an example method for querying resource lifetime using a trace of program execution.

In view of the foregoing, FIG. 16 illustrates an example of a method 1600 for querying resource lifetime using a trace of program execution. Method 1600 is described in view of FIGS. 1-15B. While method 1600 is presented as a series of acts, it will be appreciated that the particular number and ordering of the acts shown is only example of performing a query based on resource lifetime consistent to the embodiments herein.

As depicted, method 1600 includes an act 1601 of identifying a query expression including condition(s) based on resource lifetime. In some embodiments, act 1601 comprises identifying a query expression targeted at least a portion of the trace of program execution, the query expression specifying at least: (i) a data object representing a plurality of events identified in the trace, each event associated with one or more attributes relating to resource lifetime, and (ii) one or more conditions matching the one attributes relating to resource lifetime. For example, the parsing component 1202 can receive/identify a query that is based on lifetime, such as those that were discussed in connection with FIGS. 15A and 15B.

In some embodiments, the attributes for at least one of the plurality of events could include at least one of a handle, a memory address, one or more time stamps, or an event type. Examples of event types include created, copied, moved, deleted, orphaned, or forgotten. As discussed, a query may also include one or more lifetime analysis functions. As such, act 1601 could include identifying a query expression that also specifies one or more functions that analyze resource lifetime associated with one or more of the plurality of events.

Method 1600 also includes an act 1602 of processing the query expression using a trace. In some embodiments, act 1602 comprises, in response to receiving the query expression, processing the query expression based at least on an analysis of an identified subset of the trace. For example, the inspection component 1203 can build a structural representation of the query, including narrowing a search space needed to evaluate the query, and the evaluation component 1204 can evaluate it, including replaying portions of the trace file 109 as necessary.

Part of processing the query may include executing a normalization function (normalization component 1206) to convert events identified in the trace to a standardized set of events. Thus act 1602 could include normalizing one or more API calls identified in the trace into a corresponding event selected from a standard set of events. Part of processing the query may also include executing a lifetime analysis function (lifetime analysis component 1207) to perform a lifetime analysis based on an event. In some embodiments, the normalization function and/or the lifetime analysis function could be user-supplied.

Method 1600 also includes an act 1603 of presenting a result set including a resource meeting the condition(s). In some embodiments, act 1603 comprises, based on processing the query expression, presenting a result data set that includes or identifies at least one of the plurality of events that meets the one or more conditions. For example, the output component 1205 an output a result set based on the query. As discussed, the result set could be presented in a relational manner (e.g., showing relationships between events/resources and life references). As also discussed, the result set could be used as the basis for machine learning and/or statistical analysis.

Accordingly, some of the embodiments herein perform structured queries over trace files, which return a result set to the user. Queries may leverage indexed trace files, including reverse lookup data structures in order to greatly narrow the search space of trace data to be replayed in order to respond to the query. In doing so, many orders of magnitude of processing resources use can be avoided, and the time spent evaluating a query can be drastically decreased. Additionally, embodiments perform queries over trace files that are based on resource/object lifetime. Thus, a query may include a data object that includes events, and in which this data object is operated on by conditions relating to lifetime and/or functions that perform a lifetime analysis.

In addition to (or as an alternative to) queries, some embodiments provide inquiries in the form of a search (e.g., using search component 106e). In general, a search expression includes one or more search criteria, targeted against one or more traces of program execution. The result set returned after evaluating the search comprise ranked set(s) of program code entities that are related to the one or more search terms. The result set is identified based on an analysis of the target trace(s) and/or associated index data. In particular, the results of the search are constructed based on machine learning, which ranks the set of entities based on their estimated relevance. In some embodiments, relevance is based on a rarity of the occurrence of an entity, which surfaces rare occurrences and/or outliers. As such, a search is usable to identify infrequent code execution conditions, which often correspond to programming bugs, anomalous or invalid input, race conditions, etc.

Figure 17:
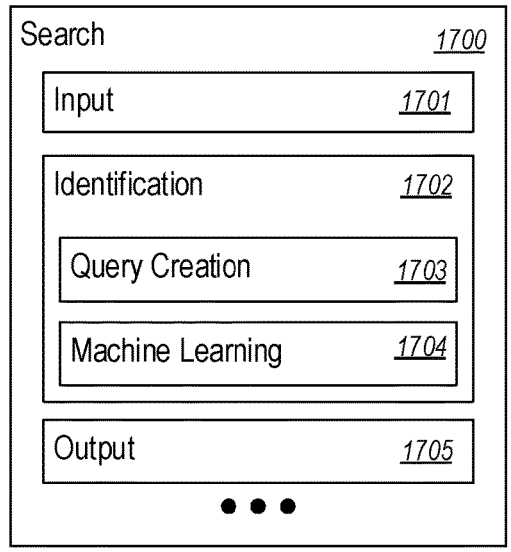
FIG. 17 illustrates an example of a search component.

FIG. 17 illustrates an example 1700 of a search component (e.g., corresponding to search component 106e of FIG. 1). As depicted, search component 1700 includes a number of sub-components, such as, for example, an input component 1701, an identification component 1702, a query creation component 1703, a machine learning component 1704, and/or an output component 1705. The depicted identity and arrangement of sub-components 1701-1705 are merely one example as an aide in description, and one of ordinary skill in the art will recognize that the particular identity and number of sub-components of the search component 1700 can vary greatly based on implementation (e.g., as indicated by the ellipses).

In general, the input component 1701 receives a search expression that is to be performed against an indexed trace file 109b. For example, a search expression may be received based on user input at a user interface of debugger 106, or from some other software component. A search expression includes one or more search criteria. Unlike a query expression, which is structured as operations that operate on concepts, a search expression is generally more freeform, and may even be natural language. As such, the one or more search criteria may be expressed in a more informal manner than query terms. For example, a search expression may be something along the lines of "what functions that caused an exception?," "which invocations of function <name> were unusual?," "information on function <name>," "function <name>," "were was <error code> encountered?," "where did <data structure> change?," and the like.

The identification component 1702 identifies different families of code entity invocations identified in the indexed trace file 109b that are usable to form a result set for the search criteria. Each family identifies invocations that are related to each other, as determined by machine learning (i.e., using the machine learning component 1704). For example, for a search expression with search criteria naming function, one family could group patterns of invocations of the function that caused an exception, another family could group patterns of invocations of the function that returned a first return value or a first family of related return values, and yet another family could group patterns of invocations of the function that returned a second return value or a second family of related return values. The identification component 1702 can also identify a ranking among these families. For example, the families may, in some embodiments, be ranked according to the frequency with which the invocations they identify occurred during execution. Thus, in these embodiments, families of less frequent (i.e., rare) invocations may be ranked higher than families of more frequent (i.e., common) invocations.

The identification component 1702 may, in some embodiments, identify families of code entity invocations that were already calculated at the time that the search expression was received. For example, these families may have been calculated as part of a prior search and stored in the indexed trace file 109b. In another example, these families may have been calculated as part of a prior indexing operation on the original trace file 109, and stored in the indexed trace file 109b.

In other embodiments, however, the identification component 1702 may cause one or more of the families to be calculated after receipt of the search expression. Thus, FIG. 17 depicts that the identification component 1702 can include a query creation component 1702 and a machine learning component 1704. The query creation component 1703 forms one or more query expressions based on the search expression, and then performs one or more queries based on these query expression(s) using the query component 106d/1200. For example, the query creation component 1703 may parse the one or more search criteria to identify and/or infer one or more concepts and/or one or more operations that would be relevant to the one or more search criteria. The query creation component 1703 can then arrange these concepts/operations into one or more query expressions, which are processed by the query component 106d/1200 to form one or more query result sets. The result set(s) include at least the identity of a plurality of invocations of entities, such as functions and/or sub-entities of functions, which may be relevant to the one or more search criteria.

After the query creation component 1703 creates and evaluates the one or more queries, the machine learning component 1704 applies one or more machine learning algorithms to the query's result set in order to calculate at least one of the plurality of families. As mentioned earlier, each family identifies invocations that are related to each other. Thus, the machine learning component 1704 can use the invocations as input to one or more machine learning algorithms in order to group or classify these invocations into different families of invocations that share a common behavior. This examples of this are provided in connection with FIGS. 18A and 18B.

The particular machine learning algorithm(s) used can vary depending on implementation goals. However, two classes of machine learning algorithms that may be useful are cluster analysis algorithms and anomaly detection algorithms. Cluster analysis refers to classes of machine learning algorithms that group a set of objects in such a way that objects in the same group, or "cluster," are more similar to each other (in at least one way) than those in other clusters. Anomaly detection, on the other hand, refers to classes of machine learning algorithms that identify items in a dataset that do not conform to an expected pattern or other items in the dataset.

In some embodiments, the machine learning component 1704 may use supervised machine learning, in which the machine learning algorithm(s) are supplied with a training dataset. For example, a training dataset could include the identity of desirable types of families, along with example invocations that should be classified under each family. A training dataset could be derived in a variety of manners, such as a manually curated dataset, or a dataset based on telemetry from prior debugging sessions, coding activity, etc. Telemetry could for example, be derived from coding or debugging activity of "trusted" users (e.g., based on which families the trusted users interacted with most). Some embodiments may enable integration of the debugger 106 with version control systems, bug tracking system, team servers, etc. Thus, usage data on these systems may be usable as telemetry data. Additionally, if such integration is enabled, some embodiments may link traces with records in these systems (e.g., work items) for ease of accessibility.

In other embodiments, the machine learning component 1704 may operate unsupervised, in which it performs its analysis without training data. Thus, the machine learning component 1704 may, itself, determine common types of families and the patterns of invocations that belong to those families. In either embodiment, classification models developed by the machine learning algorithm(s) may be refined based on user feedback and/or analysis of how users interact the search result set (e.g., which results the user interacts with).

The output component 1705 returns a ranked result set for the search expression. For example, the output component 1705 may return a ranked result set for display at a user interface of debugger 106, or for further processing by some other software component. The ranked result set returned by the output component 1705 is ordered by a relevance that is determined based, at least in part, on the ranking among the plurality of families. For example, the ranked result set may include one or more of the invocations that are listed in the highest ranked family, followed by one or more of the invocations that are listed in the next highest ranked family, and so on. When the families are ranked based on rarity, this has the effect of returning a ranked result set in which the results are ordered based on rarity, with the more rare invocations being ranked first.

This is useful because, when debugging, a developer is typically most interested in conditions that occurred rarely during the execution—i.e., the outliers—since they commonly correspond to programming errors or anomalous execution conditions. As such, embodiments operate to automatically rank the families based, for example, on the frequency of execution of code identified by the category.

The output component 1705 may present additional data, in addition to a ranked result set. For example, the output component 1705 may present information such as number of the plurality of families, one or more differences between at least two of the plurality of families (e.g., difference between the invocations identified by the families), an example code invocation within at least one of the plurality of families, and the like.

Figure 18A:
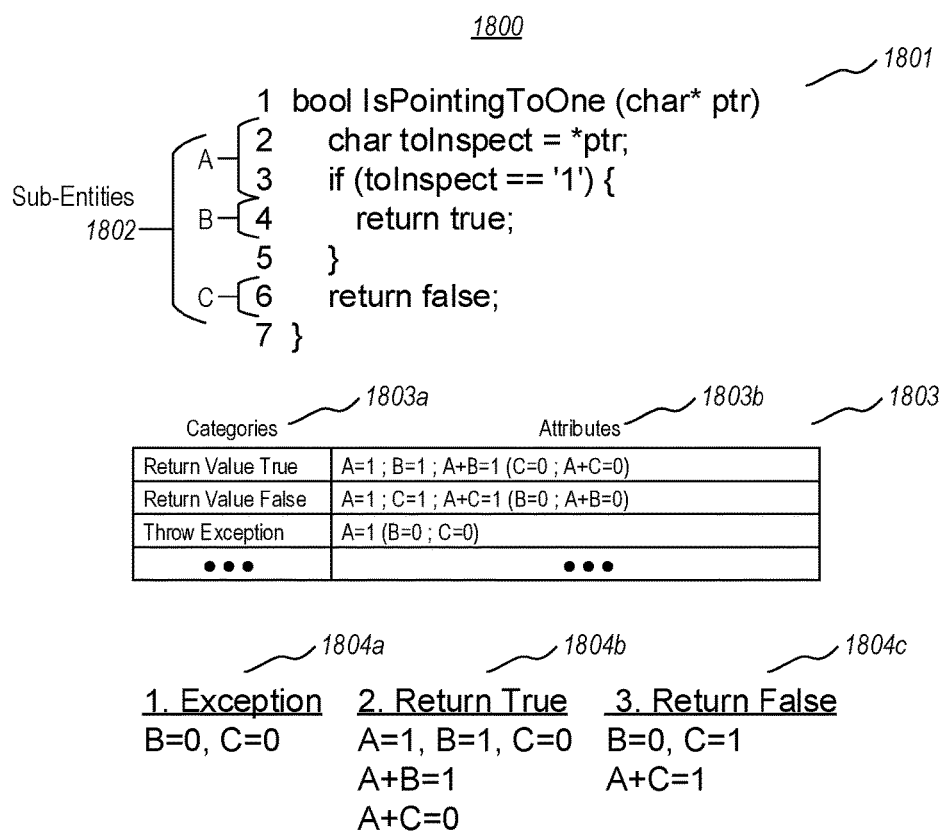
FIGS. 18A and 18B illustrate examples of machine learning that is applicable to processing searches.
Figure 18B:
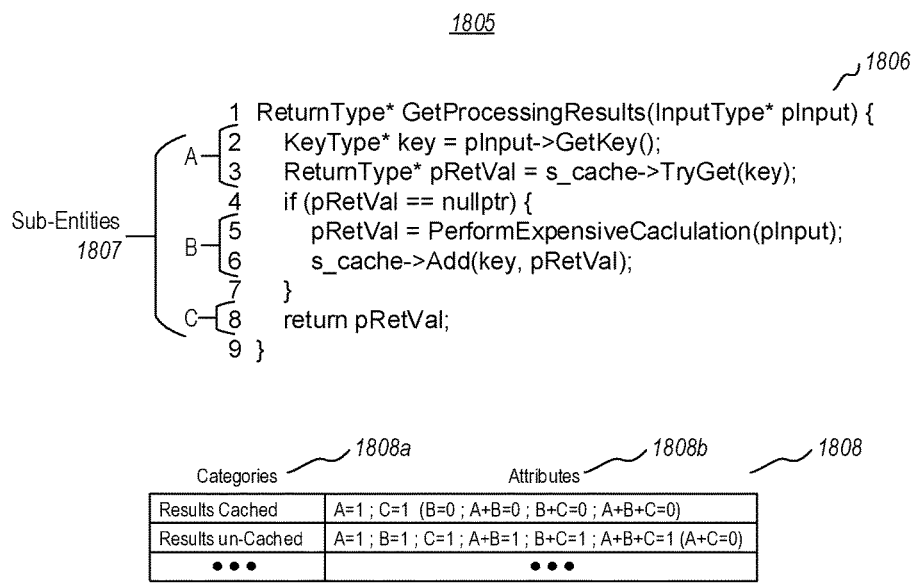

FIGS. 18A and 18B illustrate some concrete examples of machine learning that is applicable to processing searches. In particular, 18A and 18B illustrate examples of classifying executed code entities that are related to each other into different families. As discussed above, these families are usable to return ranked result sets in response to one or more searches.

FIG. 18A provides one example 1800 of machine learning that may be applied based on an entity comprising a simple function 1801, IsPointingToOne( . . . ). Function 1801 may be a section of code that is (or may later be) the subject of a search expression, or that may be identified as being relevant to a search expression (e.g., based on a query by the query creation component 1703). Note that while, for simplicity in description, function 1801 shown in a higher-level programming language, in some embodiments it may be preferable for the search component 1700 to operate more granularly at the level lower-level assembly language/processor instructions.

As will be recognized by those skilled in the art, function 1801 receives as an input parameter a pointer (ptr) to a character, and it returns a Boolean—true if the character's value is one, or false if the character's value is anything other than one. In particular, at line 2 function 1801 dereferences ptr to obtain the character's value, storing that value in the variable toInspect, and then at line 3 it determines if the value of toInspect is equal to one. If so, function 1801 returns true at line 4, or it otherwise returns false at line 6.

Invocations of function 1801 are analyzed (e.g., by the machine learning component 1704) to determine different families of its invocations share the same or similar characteristics that may be of interest in relation to execution of function 1801 (and particularly as they relate to debugging). Thus, invocations of function 1801 can be grouped according to these families.

As mentioned above, machine learning can be trained with training datasets. Thus, a user may possibly supply the identity of desired categories of families as part of training datasets, though they can also be identified by using unsupervised machine learning. For example, some categories of families—shown in the first column 1803a of table 1803—may include those invocations that returned true, those invocations that returned false, and those invocations that threw an exception (i.e., due to a failure to dereference ptr at line 2).

It will be recognized by those skilled in the art that after executing function 1801 a great number of times (e.g., tens, hundreds, thousands, or more)—and depending on the environment in which function 1801 executes—one likely pattern of the invocations of function 1801 may be that the majority of the invocations returned false (i.e., ptr pointed to something other than one), that most of the remainder of the invocations returned true (i.e., ptr pointed to one), and that a small set of the remainder of the invocations threw an exception (i.e., ptr could not be dereferenced since it pointed to an invalid memory location, an inaccessible memory location, etc.).

There are of course other categories of families that may be used to group related function invocations (as indicated generally by the ellipses in table 1803). These may include, for example, a return value type, the direct values of input parameters (e.g., particular addresses/address ranges to which ptr points), the indirect values of input parameters (e.g., the particular values/ranges of values of the characters that ptr references), input parameter types, the values of any global variables (which may, for example, affect the value of ptr and/or the locations it references based on code other than function 1801), the types of exceptions thrown, the number of instructions executed during the invocation of function 1801, the count of branches taken and/or not taken for each decision point (e.g., the number of times the "if" path is taken at line 3; other types of counts could include the number of times an "else" path is taken, the number of iterations of a loop, etc.), the number of times each sub-entity (block or sub-function) is executed, data structures changed, etc.

In some embodiments, classifying related invocations of entities (e.g., function 1801) into families comprises dividing those entities into sub-entities (e.g., blocks or sub-functions), and analyzing patterns of invocations of those sub-entities. For example, when operating at the level of processor instructions, sub-entities could comprise "basic blocks"—which are known to those of skill in the art as chunks of instructions that are an execution unit (i.e., in which all or none of the instructions in the block executes, exceptions aside). These sub-entities can be viewed as "virtual" functions, or being separate functions that are invoked by the larger entity (e.g., function 1801). Thus, the families can, in some embodiments, group not only invocations of the overall entity, but also related invocations of sub-entities (or sequences of invocations of sub-entities).

For example, referring to function 1801, FIG. 18A illustrates three possible sub-entities 1802 (i.e., blocks A, B, and C). Block A includes lines 2 and 3 (which dereference pt r and determine if the dereferenced value equals one), block B includes line 4 (which returns true), and block C includes line 6 (which returns false). Note that if the search component 1700 component was operating at the level of processor instructions, rather than lines of higher-level source code, each block could include many individual instructions.

The machine learning component 1704 can analyze different invocations of function 1801, including invocations of its sub-entities 1802, in order group these invocations into different families. Thus, input to machine learning algorithm(s) may be attributes/variables comprising whether or not sub-entities were invoked during invocation of function 1801. As indicated, the families in which invocations are grouped may be suggested by a human user (e.g., as part of a training dataset), or may be identified entirely by the machine learning component's 1704 own analysis.

For example, table 1803 shows mappings between possible categories of families, including "Return Value true," "Return Value false," and "Throw Exception" (column 1803a), and attributes values defined by sub-entities (A, B, and C) corresponding to those categories (column 1803b). In particular, the category "Return Value true" corresponds to attribute A=1 (i.e., block A is invoked once when function 1801 returns true), attribute B=1 (i.e., block B is invoked once when function 1801 returns true), and attribute A+B=1 (i.e., the sequence A+B is invoked once when function 1801 returns true). Attributes C=0 and A+C=0 indicate that block C and sequence A+C are not invoked when function 1801 returns true. Similarly, the category "Return Value false" corresponds to attributes A=1, C=1, and A+C=1 (and block B and the sequence A+B are not invoked when function 1801 returns false). The category "Throw Exception" corresponds to attribute A=1 (and blocks B and C are not invoked when function 1801 throws an exception, nor are any combinations of blocks invoked). Note that column 1803a is shown for clarity and ease in description, in order to introduce the concepts of grouping code entities into categories, and that identity of categories may, or may not, be known prior to a machine learning analysis based on the attributes in column 1803b.

When the attributes in column 1803b are supplied to one or more machine learning algorithm(s), those algorithm(s) identify set(s) of attribute(s) that go together in the same family. They can also identify one or more of the families, themselves, and/or group sets of attributes according to one or more predefined families. The algorithm(s) can also rank the families based on the frequency the occurrence of the set(s) of attributes in each family during execution.

Accordingly, FIG. 18A shows three families 1804a-1804c that each includes sets of attributes that go together, because they characterize invocations of function 1801 based on whether it returned true, whether it returned false, or whether it threw an exception. In particular, FIG. 18A shows a first family 1804a that includes one set of attributes (i.e., B=0, C=0) that characterize invocations in which function 1801 threw an exception, a second family 1804b that includes three sets of attributes (i.e., A=1, B=1, C=0; A+B=1; and A+C=0) that characterize invocations in which function 1801 returned true, and a third family 1804c that includes two sets of attributes (i.e., B=0, C=1 and A+C=1) that characterize invocations in which function 1801 returned false. Note that sets of attributes shown are examples only, and are not exhaustive. Additionally, there is some redundancy in the sets of attributes shown—for example, the sets in family 1804 could be merged to "B=1, C=0," and the sets in family 1804b could be merged on "B=0, C=1."

Note that in FIG. 18A the families 1804a-1804c have been sorted by rarity, in which invocations throwing exceptions are most rare and invocations returning false are most frequent. In particular, family 1804a is ranked first since the sets of values it identifies occurred least frequently during different invocations of function 1801, and family 1804c is ranked last since the sets of values it identifies occurred most frequently during different invocations of function 1801. This ranking may be based, at least in part, on replaying (i.e., by the replay component 106b) of instances of function 1801 as recorded by a trace, and identifying the frequency with which each sequence occurred during execution. Additionally or alternatively, this ranking may be based, at least in part, on reference to indexed data, such as reverse lookup data structures.

These ranked families 1804a-1804c can be used to form a result set for a search expression, such as a search expression specifically naming function 1801, a search expression requesting function invocation(s) that returned exceptions, etc. Additionally or alternatively, these ranked families 1804a-1804c can be stored as additional index data (e.g., as one or more data streams in the indexed trace file(s) 109b). This data could be stored in many ways, such data structure(s) keyed on entitie(s) invoked (e.g., an association keyed on invocations of an entity, that identifies corresponding families, and that is ranked based on the rarity of the invocation), data structure(s) keyed on category (e.g., an association keyed on family, that identifies corresponding sets of attributes, and that is ranked based on the rarity of the family), and the like.

FIG. 18B provides another example 1805 of machine learning that may be applied to a more complicated function 1806, GetProcessingResults( . . . ), that returns cached data, and which performs needed processing if the requested data is not in the cache. As will be recognized by those skilled in the art, function 1806 receives as an input parameter a pointer (pInput) to input of the type InputType, and it returns a pointer to data of the type ReturnType that results from processing on pInput by the function PerformExpensiveCalculation( . . . )—which is assumed in this example to be expensive enough to warrant caching the result. More particularly, function 1806 obtains a key from pInput at line 2. Then, at line 3 is obtains—based on the key—a pointer to cached processing data from cache s_cache (i.e., the results from a prior processing of pInput by PerformExpensiveCalculation( . . . )). At line 4 function 1806 checks if there was no cached processing data (i.e., the pointer obtained at line 3 is null). If so, it performs the processing at line 5 and adds it to s_cache at line 6. Then, at line 8, function 1806 returns the cached data (whether it already existed, or whether it was just added).

FIG. 18B also illustrates three possible sub-entities 1807 of function 1807 (i.e., blocks A, B, and C). Block A includes lines 2 and 3 (which obtain a key from pInput and obtain a pointer to that key in s_cache), block B includes lines 5 and 6 (which calls PerformExpensiveCalculation( . . . ) on pInput and caches the result), and block C includes line 8 (which returns a pointer to the cached result).

In addition, while there are a vast array of categories of families that could be used in connection with grouping invocations of GetProcessingResults( . . . ), FIG. 18B shows in the first column 1808a of table 1808 that two possible categories are whether the results were cached or un-cached. Table 1808 also shows in the second column 1808b that invocations that returned cached results have the attributes A=1, C=1, and A+C=1 (i.e., block A and block C are invoked one time each, and sequence A+C is invoked once). Block B and the sequences A+B, B+C, and A+B+C are not invoked. Invocations that returned un-cached results have the attributes A=1, B=1, C=1, A+B=1, B+C=1, and A+B+C=1 (i.e., blocks A, B, and C are invoked one time each, and sequences A+B, B+C, and A+B+C are each invoked once). The sequence A+C is not invoked.

Similar to FIG. 16A, the data in table 1808 (e.g., the attributes in column 1808b) can be used as input to one or more machine learning algorithm(s) in order to generate ranked families, including, for example, a family identifying set(s) of attributes characterizing invocations of function 1806 that returned a cached result directly, and a family identifying set(s) of attributes characterizing invocations of function 1806 that returned an un-cached result. These families can be ranked according to the frequency of the occurrence each family's set(s) of attributes.

Figure 19:
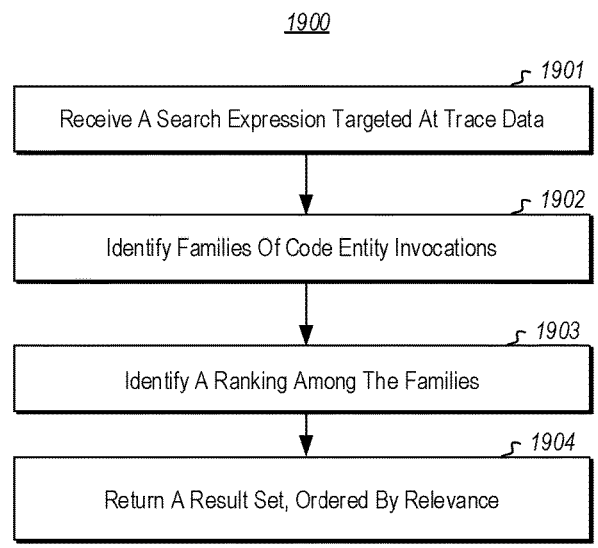
FIG. 19 illustrates a flowchart of an example method for performing a search over a trace of program execution.

In view of the foregoing, FIG. 19 illustrates an example of a method 1900 for performing a search over a trace of program execution. Method 1900 is described in view of FIGS. 1-18B. While method 1900 is presented as a series of acts, it will be appreciated that the particular number and ordering of the acts shown is only example of performing a search over a trace of program execution consistent to the embodiments herein.

As depicted, method 1900 includes an act 1901 of receiving a search expression targeted at trace data. In some embodiments, act 1901 comprises receiving a search expression including one or more search criteria, the search expression being targeted at one or more trace data streams storing a trace of program execution. For example, the input component 1701 can receive a search expression that is targeted against indexed trace file 109b. As discussed, the search expression may be expressed in a freeform manner, such as natural language.

Method 1900 also includes an act 1902 of identifying families of code entity invocations. In some embodiments, act 1902 comprises, based on the one or more search criteria, identifying a plurality of families of code entity invocations, each family identifying a plurality of code entity invocations that are related to each other, the plurality of code entity invocations being identified based on the one or more trace data streams. For example, the identification component 1702 can identify a plurality of different families of code entity invocations identified in the indexed trace file 109b that are usable to form a result set for the search criteria.

In some situations, identifying the plurality of families may include identifying at least one family from indexed data. For example, the identification component 1702 may identify one or more of the families that were calculated as part of processing a prior search, or as part of an indexing pass that generated the indexed trace file 109b.

In other situations, identifying the plurality of families may include calculating one or more of the families. In these situations, the identification component 1702 employs the query creation component 1702 and the machine learning component 1704. In particular, the identification component 1702 causes the query creation component to construct at least one query expression based at least on the one or more search criteria, and then perform that query (or queries) over the one or more trace data streams to obtain a set of query results. The identification component 1702 can then identify a set of attributes describing code entity invocations in the query results, and provide these attributes to the machine learning component 1704 t, which utilizes machine learning techniques to group related code entity invocations identified by the set of attributes into one or more families.

Method 1900 also includes an act 1903 of identifying a ranking among the families. In some embodiments, act 1903 comprises identifying a ranking among the plurality of families of code entity invocations. For example, the identification component can rank the families based on one or more ranking criteria. As discussed one ranking criterion that may be useful to debugging is the frequency of the occurrence of the invocations grouped into each family.

Method 1900 also includes an act 1904 of returning a result set, ordered by relevance. In some embodiments, act 1904 comprises, based at least on the identified ranking among the plurality of families of code entity invocations, returning a set of code entity invocations determined to meet the one or more search criteria, wherein the set of code entity invocations is ordered by a relevance determined based at least on the ranking among the plurality of families. For example, the output component 1705 can return a result set that is ordered by a relevance that is determined based, at least in part, on the ranking among the plurality of families by the identification component 1702. For example, the ranked result set may include one or more of the invocations that are listed in the highest ranked family, followed by one or more of the invocations that are listed in the next highest ranked family, and so on.

Accordingly, some of the embodiments herein perform searches over trace files, which return a ranked result set to the user, ordered by relevance. Searches are conducted based on families of related code entity invocations. Searches may leverage indexed trace files for these families, and/or may use queries and machine learning to construct these families. Search then relies on a ranking of these families of related code entity invocations in order to build the ranked result set. When ranking is based on frequency of the occurrence of code entity invocations, search can help surface the rare occurrences, which is frequently useful in code debugging contexts.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for querying resource lifetime using a trace of program execution that enables replay of a prior execution of the program, the method comprising:
    normalizing one or more application programming interface (API) calls identified in the trace of program execution into a corresponding event selected from a standard set of events;
    identifying a query expression targeted at least a portion of the trace of program execution, the query expression specifying at least:
        (i) a data object representing a plurality of events identified in the trace, each event associated with one or more attributes relating to resource lifetime, at least one of the plurality of events comprising at least one of the normalized one or more API calls, and
        (ii) one or more conditions matching the one attributes relating to resource lifetime;
    in response to identifying the query expression, processing the query expression based at least on an analysis of an identified subset of the trace, processing the query expression including replaying one or more portions of the prior execution of the program using the identified subset of the trace; and
    based on processing the query expression, presenting a result data set that includes or identifies at least one of the plurality of events that meets the one or more conditions.

2. The method of claim 1, wherein the query expression also specifies one or more functions that analyze resource lifetime associated with one or more of the plurality of events.

3. The method of claim 1, wherein, for at least one of the plurality of events, the one or more attributes relating to resource lifetime include at least one of a handle, a memory address, one or more time stamps, or event type.

4. The method of claim 1, wherein the one or more attributes relating to resource lifetime include event type, and wherein the event type comprises at least one of created, copied, moved, deleted, orphaned, or forgotten.

5. The method of claim 1, wherein normalizing the one or more API calls identified in the trace comprises executing a user-supplied normalizing function.

6. A computer system, comprising:
    one or more processors; and
    one or more hardware computer-readable storage media having stored thereon computer-executable instructions that are executable by the one or more processors to cause the computer system to query resource lifetime using a trace of program execution that enables replay of a prior execution of the program, the computer-executable instructions including instructions that are executable to cause the computer system to perform at least the following:
    normalize one or more application programming interface (API) calls identified in the trace of program execution into a corresponding event selected from a standard set of events;
    identify a query expression targeted at least a portion of the trace of program execution, the query expression specifying at least:
        (i) a data object representing a plurality of events identified in the trace, each event associated with one or more attributes relating to resource lifetime, at least one of the plurality of events comprising at least one of the normalized one or more API calls, and
        (ii) one or more conditions matching the one attributes relating to resource lifetime;
    in response to identifying the query expression, process the query expression based at least on an analysis of an identified subset of the trace, processing the query expression including replaying one or more portions of the prior execution of the program using the identified subset of the trace; and
    based on processing the query expression, present a result data set that includes or identifies at least one of the plurality of events that meets the one or more conditions.

7. The computer system of claim 6, wherein the query expression also specifies one or more functions that analyze resource lifetime associated with one or more of the plurality of events.

8. The computer system of claim 6, wherein, for at least one of the plurality of events, the one or more attributes relating to resource lifetime include at least one of a handle, a memory address, one or more time stamps, or event type.

9. The computer system of claim 8, wherein the one or more attributes relating to resource lifetime include event type, and wherein the event type comprises at least one of created, copied, moved, deleted, orphaned, or forgotten.

10. The computer system of claim 6, wherein normalizing the one or more API calls identified in the trace comprises executing a user-supplied normalizing function.

11. The computer system of claim 6, wherein the at least one of the plurality of events identifies a resource that has a live reference after a specified time in the trace.

12. The computer system of claim 11, wherein the result data set identifies at least one relationship between the at least one of the plurality of events and the live reference.

13. The computer system of claim 6, the computer-executable instructions also including instructions that are executable to cause the computer system to apply a machine learning algorithm to the result data set.

14. The computer system of claim 13, wherein the result data set identifies at least one result that is an outlier, based on having applied the machine learning algorithm to the result data set.

15. The computer system of claim 6, wherein the least one of the plurality of events corresponds to receipt of untrusted input by the program during execution, and wherein the result data set is presented as part of a taint analysis.

16. A computer program product comprising one or more hardware storage devices having stored thereon computer-executable instructions that are executable by one or more processors to cause a computer system to query resource lifetime using a trace of program execution that enables replay of a prior execution of the program, the computer-executable instructions including instructions that are executable to cause the computer system to perform at least the following:
    normalize one or more application programming interface (API) calls identified in the trace of program execution into a corresponding event selected from a standard set of events;
    identify a query expression targeted at least a portion of the trace of program execution, the query expression specifying at least:
        (i) a data object representing a plurality of events identified in the trace, each event associated with one or more attributes relating to resource lifetime, at least one of the plurality of events comprising at least one of the normalized one or more API calls, and
        (ii) one or more conditions matching the one attributes relating to resource lifetime;
    in response to identifying the query expression, process the query expression based at least on an analysis of an identified subset of the trace, processing the query expression including replaying one or more portions of the prior execution of the program using the identified subset of the trace; and
    based on processing the query expression, present a result data set that includes or identifies at least one of the plurality of events that meets the one or more conditions.

* * * * *